US012812588B2

(12) United States Patent
Dutta et al.

(10) Patent No.: US 12,812,588 B2
(45) Date of Patent: Nov. 24, 2026

(54) POSITION ESTIMATION BASED ON NON-RECIPROCITY SOURCE INFORMATION

(71) Applicant: QUALCOMM Incorporated, San Diego, CA (US)

(72) Inventors: Sourjya Dutta, San Diego, CA (US); Navid Abedini, Basking Ridge, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 18/513,035

(22) Filed: Nov. 17, 2023

(65) Prior Publication Data

US 2025/0168802 A1 May 22, 2025

(51) Int. Cl.

| | |
|---|---|
| ***H04W 64/00*** | (2009.01) |
| ***H04B 17/318*** | (2015.01) |
| ***H04L 5/00*** | (2006.01) |
| ***H04W 24/10*** | (2009.01) |

(52) U.S. Cl.

CPC .......... *H04W 64/00* (2013.01); *H04B 17/328* (2023.05); *H04L 5/0051* (2013.01); *H04W 24/10* (2013.01)

(58) Field of Classification Search

None

See application file for complete search history.

(56) References Cited

U.S. PATENT DOCUMENTS

| | | | | |
|---|---|---|---|---|
| 2019/0159155 A1* | 5/2019 | Abedini | ............ | H04W 56/0045 |
| 2019/0159156 A1* | 5/2019 | Abedini | ............ | H04W 56/0045 |
| 2019/0191399 A1* | 6/2019 | Islam | .................. | H04W 56/005 |

FOREIGN PATENT DOCUMENTS

| | | |
|---|---|---|
| WO | WO-2023019041 | 2/2023 |

OTHER PUBLICATIONS

International Search Report and Written Opinion—PCT/US2024/055336—ISA/EPO—Feb. 20, 2025.

* cited by examiner

*Primary Examiner* — Adolf Dsouza

(74) *Attorney, Agent, or Firm* — Thien T. Nguyen

(57) ABSTRACT

A position estimation entity receives measurement reports that indicate a non-reciprocity condition between link directions (e.g., as part of a multi-round trip time (RTT) position estimation session). The position estimation entity transmits request(s) to retrieve non-reciprocity source information, which may be used in position estimation derivation (e.g., to correct for error due to the non-reciprocity). The request(s) may be transmitted to a target UE and/or a wireless node involved in the position estimation session (e.g., serving gNB or TRP, another UE, etc.).

40 Claims, 27 Drawing Sheets

1500

NW controlled fixed RID

1700

1800

1900

POSITION ESTIMATION BASED ON NON-RECIPROCITY SOURCE INFORMATION

BACKGROUND OF THE DISCLOSURE

1. Field of the Disclosure

Aspects of the disclosure relate generally to wireless technologies.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a position estimation entity includes receiving a first measurement report associated with a position estimation procedure of a user equipment (UE), the first measurement report comprising measurement information associated with one or more measurements of a first positioning reference signal (PRS) communicated on a first link direction from a wireless node to a user equipment (UE); receiving a second measurement report associated with the position estimation procedure of the UE, the second measurement report comprising measurement information associated with one or more measurements of a second PRS communicated on a second link direction from the UE to the wireless node; determining a non-reciprocity condition between the first link direction and the second link direction; transmitting at least one additional location information request that requests non-reciprocity source information associated with the first link direction, the second link direction, or both, in response to the determination of the non-reciprocity condition; receiving at least one response comprising the non-reciprocity source information in response to the at least one additional location information request; and deriving a position estimate of the UE based on the first measurement report, the second measurement report, and the non-reciprocity source information of the at least one response.

In an aspect, a method of operating a user equipment (UE) includes performing one or more measurements associated with a first positioning reference signal (PRS) communicated on a first link direction from a wireless node to the UE; transmitting a second PRS on a second link direction to at least one wireless node; transmitting a measurement report associated with a position estimation procedure of the UE to a position estimation entity, the measurement report comprising measurement information associated with the one or more measurements of the first PRS; receiving, from the position estimation entity, an additional location information request that requests non-reciprocity source information associated with the first link direction, the second link direction, or both; determining whether any non-reciprocity source information associated with the first link direction, the second link direction, or both, is available in response to the additional location information request; and transmitting a response to the additional location information request based on the determination.

In an aspect, a method of operating a wireless node includes transmitting a first positioning reference signal (PRS) to a user equipment (UE) on a first link direction from the wireless node to the UE; performing one or more measurements associated with a second PRS communicated on a second link direction from the UE to the wireless node; transmitting a measurement report associated with a position estimation procedure of the UE to a position estimation entity, the measurement report comprising measurement information associated with the one or more measurements of the second PRS; receiving, from the position estimation entity, an additional location information request that requests non-reciprocity source information associated with the first link direction, the second link direction, or both; determining whether any non-reciprocity source information associated with the first link direction, the second link direction, or both, is available in response to the additional location information request; and transmitting a response to the additional location information request based on the determination.

In an aspect, a position estimation entity includes one or more memories; one or more transceivers; and one or more processors communicatively coupled to the one or more memories and the one or more transceivers, the one or more processors, either alone or in combination, configured to: receive, via the one or more transceivers, a first measurement report associated with a position estimation procedure of a user equipment (UE), the first measurement report comprising measurement information associated with one or more measurements of a first positioning reference signal (PRS) communicated on a first link direction from a wireless node to a user equipment (UE); receive, via the one or more transceivers, a second measurement report associated with the position estimation procedure of the UE, the second measurement report comprising measurement information associated with one or more measurements of a second PRS communicated on a second link direction from the UE to the wireless node; determine a non-reciprocity condition between the first link direction and the second link direction; transmit, via the one or more transceivers, at least one additional location information request that requests non-reciprocity source information associated with the first link direction, the second link direction, or both, in response to the determination of the non-reciprocity condition; receive, via the one or more transceivers, at least one response comprising the non-reciprocity source information in response to the at least one additional location information request; and derive a position estimate of the UE based on the first measurement report, the second measurement report, and the non-reciprocity source information of the at least one response.

In an aspect, a user equipment (UE) includes one or more memories; one or more transceivers; and one or more processors communicatively coupled to the one or more memories and the one or more transceivers, the one or more processors, either alone or in combination, configured to: perform one or more measurements associated with a first positioning reference signal (PRS) communicated on a first link direction from a wireless node to the UE; transmit, via the one or more transceivers, a second PRS on a second link direction to at least one wireless node; transmit, via the one or more transceivers, a measurement report associated with a position estimation procedure of the UE to a position estimation entity, the measurement report comprising measurement information associated with the one or more measurements of the first PRS; receive, via the one or more transceivers, from the position estimation entity, an additional location information request that requests non-reciprocity source information associated with the first link direction, the second link direction, or both; determine whether any non-reciprocity source information associated with the first link direction, the second link direction, or both, is available in response to the additional location information request; and transmit, via the one or more transceivers, a response to the additional location information request based on the determination.

In an aspect, a wireless node includes one or more memories; one or more transceivers; and one or more processors communicatively coupled to the one or more memories and the one or more transceivers, the one or more processors, either alone or in combination, configured to: transmit, via the one or more transceivers, a first positioning reference signal (PRS) to a user equipment (UE) on a first link direction from the wireless node to the UE; perform one or more measurements associated with a second PRS communicated on a second link direction from the UE to the wireless node; transmit, via the one or more transceivers, a measurement report associated with a position estimation procedure of the UE to a position estimation entity, the measurement report comprising measurement information associated with the one or more measurements of the second PRS; receive, via the one or more transceivers, from the position estimation entity, an additional location information request that requests non-reciprocity source information associated with the first link direction, the second link direction, or both; determine whether any non-reciprocity source information associated with the first link direction, the second link direction, or both, is available in response to the additional location information request; and transmit, via the one or more transceivers, a response to the additional location information request based on the determination.

In an aspect, a position estimation entity includes means for receiving a first measurement report associated with a position estimation procedure of a user equipment (UE), the first measurement report comprising measurement information associated with one or more measurements of a first positioning reference signal (PRS) communicated on a first link direction from a wireless node to a user equipment (UE); means for receiving a second measurement report associated with the position estimation procedure of the UE, the second measurement report comprising measurement information associated with one or more measurements of a second PRS communicated on a second link direction from the UE to the wireless node; means for determining a non-reciprocity condition between the first link direction and the second link direction; means for transmitting at least one additional location information request that requests non-reciprocity source information associated with the first link direction, the second link direction, or both, in response to the determination of the non-reciprocity condition; means for receiving at least one response comprising the non-reciprocity source information in response to the at least one additional location information request; and means for deriving a position estimate of the UE based on the first measurement report, the second measurement report, and the non-reciprocity source information of the at least one response.

In an aspect, a user equipment (UE) includes means for performing one or more measurements associated with a first positioning reference signal (PRS) communicated on a first link direction from a wireless node to the UE; means for transmitting a second PRS on a second link direction to at least one wireless node; means for transmitting a measurement report associated with a position estimation procedure of the UE to a position estimation entity, the measurement report comprising measurement information associated with the one or more measurements of the first PRS; means for receiving, from the position estimation entity, an additional location information request that requests non-reciprocity source information associated with the first link direction, the second link direction, or both; means for determining whether any non-reciprocity source information associated with the first link direction, the second link direction, or both, is available in response to the additional location information request; and means for transmitting a response to the additional location information request based on the determination.

In an aspect, a wireless node includes means for transmitting a first positioning reference signal (PRS) to a user equipment (UE) on a first link direction from the wireless node to the UE; means for performing one or more measurements associated with a second PRS communicated on a second link direction from the UE to the wireless node; means for transmitting a measurement report associated with a position estimation procedure of the UE to a position estimation entity, the measurement report comprising measurement information associated with the one or more measurements of the second PRS; means for receiving, from the position estimation entity, an additional location information request that requests non-reciprocity source information associated with the first link direction, the second link direction, or both; means for determining whether any non-reciprocity source information associated with the first link direction, the second link direction, or both, is available in response to the additional location information request; and means for transmitting a response to the additional location information request based on the determination.

In an aspect, a non-transitory computer-readable medium storing computer-executable instructions that, when executed by a position estimation entity, cause the position estimation entity to: receive a first measurement report associated with a position estimation procedure of a user equipment (UE), the first measurement report comprising measurement information associated with one or more measurements of a first positioning reference signal (PRS) communicated on a first link direction from a wireless node to a user equipment (UE); receive a second measurement report associated with the position estimation procedure of the UE, the second measurement report comprising measurement information associated with one or more measurements of a second PRS communicated on a second link direction from the UE to the wireless node; determine a non-reciprocity condition between the first link direction and the second link direction; transmit at least one additional location information request that requests non-reciprocity source information associated with the first link direction, the second link direction, or both, in response to the determination of the non-reciprocity condition; receive at least one response comprising the non-reciprocity source information in response to the at least one additional location information request; and derive a position estimate of the UE based on the first measurement report, the second measurement report, and the non-reciprocity source information of the at least one response.

In an aspect, a non-transitory computer-readable medium storing computer-executable instructions that, when executed by a user equipment (UE), cause the UE to: perform one or more measurements associated with a first positioning reference signal (PRS) communicated on a first link direction from a wireless node to the UE; transmit a second PRS on a second link direction to at least one wireless node; transmit a measurement report associated with a position estimation procedure of the UE to a position estimation entity, the measurement report comprising measurement information associated with the one or more measurements of the first PRS; receive, from the position estimation entity, an additional location information request that requests non-reciprocity source information associated with the first link direction, the second link direction, or both; determine whether any non-reciprocity source information associated with the first link direction, the second link direction, or both, is available in response to the additional location information request; and transmit a response to the additional location information request based on the determination.

In an aspect, a non-transitory computer-readable medium storing computer-executable instructions that, when executed by a wireless node, cause the wireless node to: transmit a first positioning reference signal (PRS) to a user equipment (UE) on a first link direction from the wireless node to the UE; perform one or more measurements associated with a second PRS communicated on a second link direction from the UE to the wireless node; transmit a measurement report associated with a position estimation procedure of the UE to a position estimation entity, the measurement report comprising measurement information associated with the one or more measurements of the second PRS; receive, from the position estimation entity, an additional location information request that requests non-reciprocity source information associated with the first link direction, the second link direction, or both; determine whether any non-reciprocity source information associated with the first link direction, the second link direction, or both, is available in response to the additional location information request; and transmit a response to the additional location information request based on the determination.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
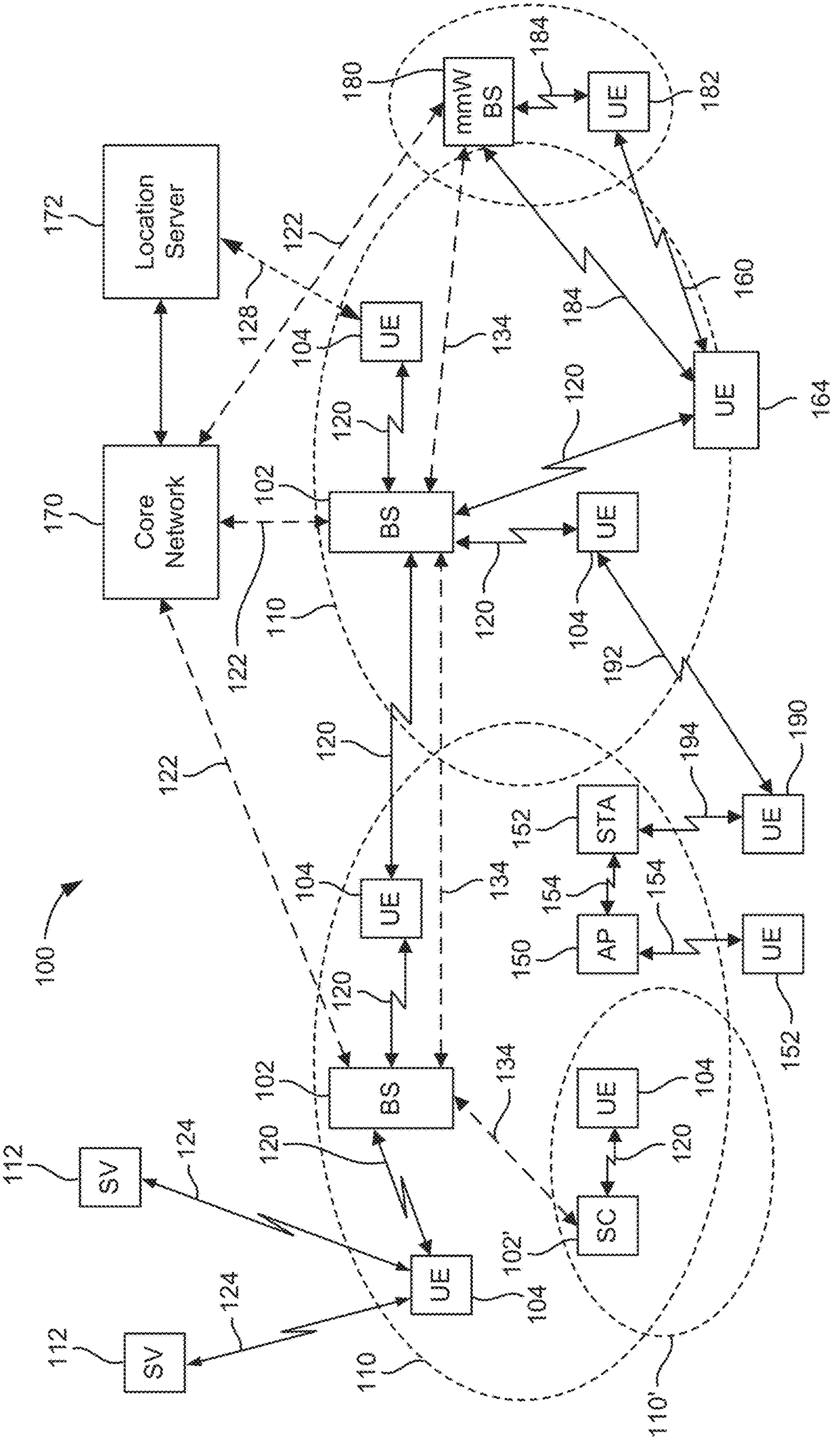
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to position estimation based on non-reciprocity source information. In some designs, non-reciprocity in uplink (UL) and downlink (DL) link directions may affect multi-round trip time (RTT) position estimation. For example, in some designs, multi-RTT positioning depends on both the DL positioning reference signal (PRS) measurement as well as an UL PRS (or UL SRS) measurement on a given transmission reception point (TRP). The position measurement may consider the first distinguishable sample of the transmitted RS. When reconfigurable intelligent device (RID) is used for signal boosting, the first distinguishable sample of the RS may or may not be the one through a direct path. In some designs, the LMF may take into account of this factor (i.e., the RID delay) when performing multi-RTT based positioning. Otherwise, the position will have considerable error. Generally, error of 10 ns or more may be introduced due to the combined effect of the increased path length and the RID delay. This may lead to a positioning error in the range of 1-10 meters.

Particular aspects of the subject matter described in this disclosure can be implemented to realize one or more of the following potential advantages. Aspects of the disclosure are directed to position estimation based on non-reciprocity source information. In some designs, non-reciprocity source information may be associated with one or more RIDs that reflect or relay PRS to/from a target UE. In some designs, knowledge of non-reciprocity source information may facilitate a position estimation entity to factor (e.g., offset) delay(s) attributable to one or more non-reciprocity sources that reflect/relay the PRS. Such aspects may provide various technical advantages, in particular, improved position estimation accuracy.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
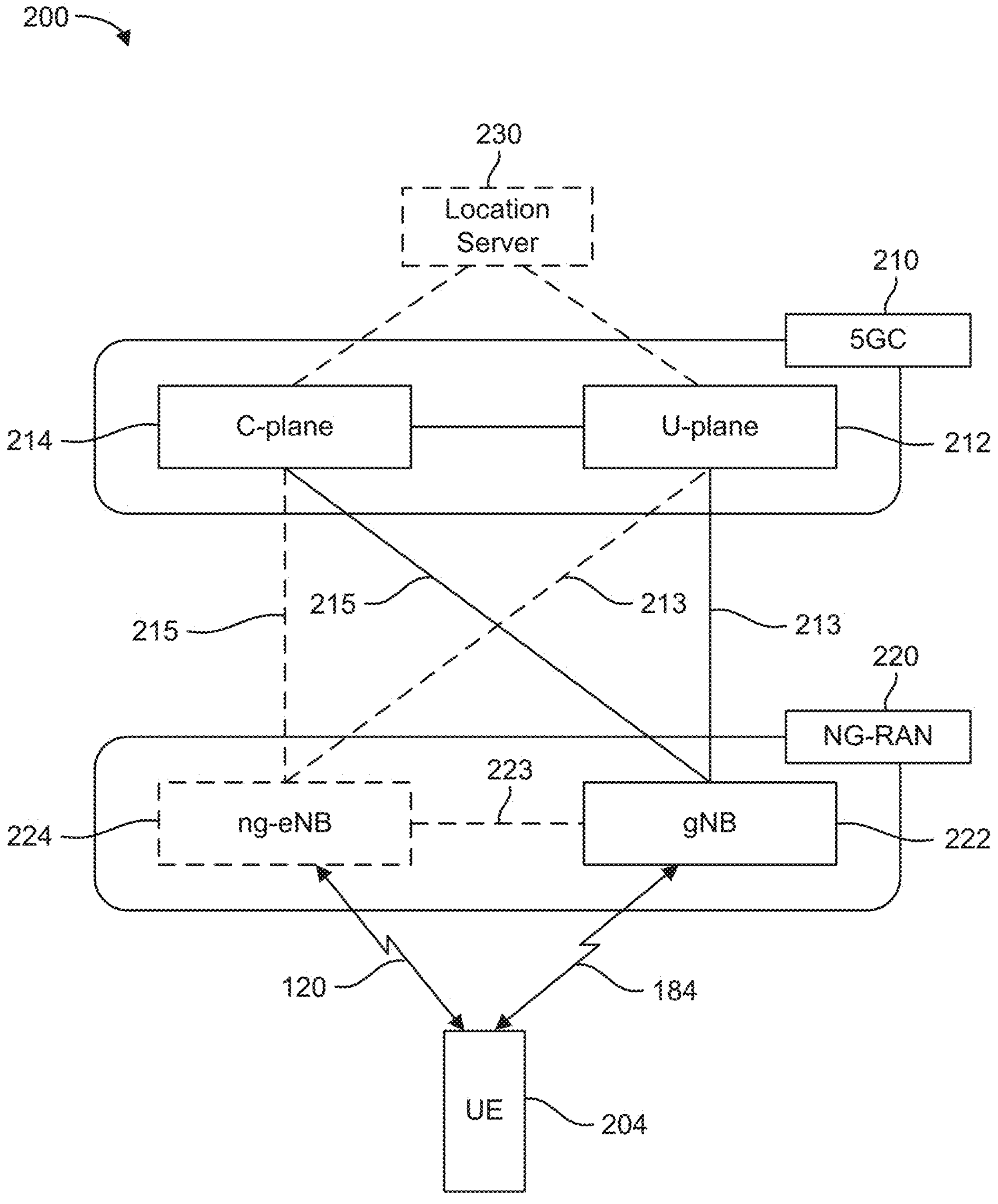
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
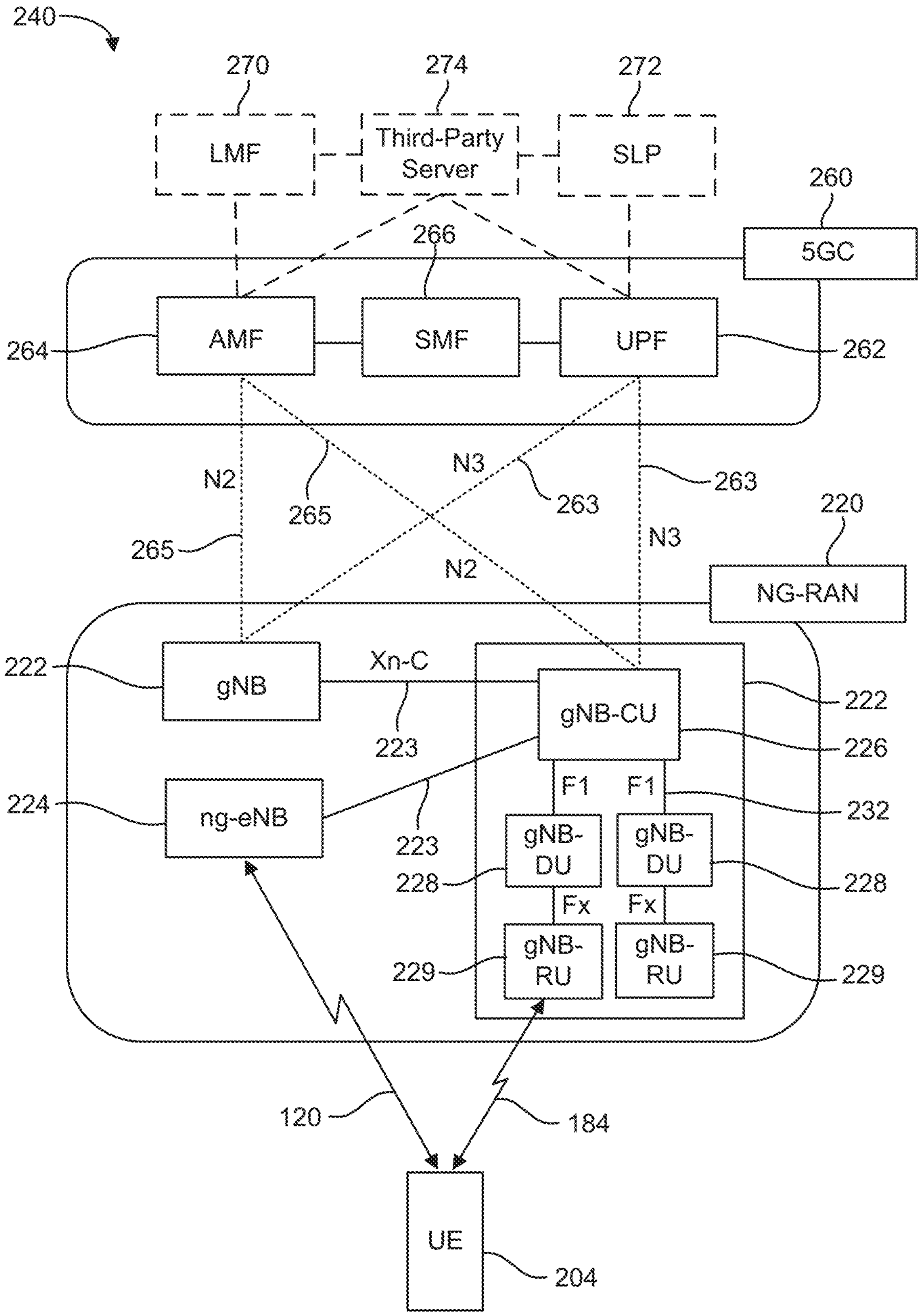

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, AP, TRP, cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
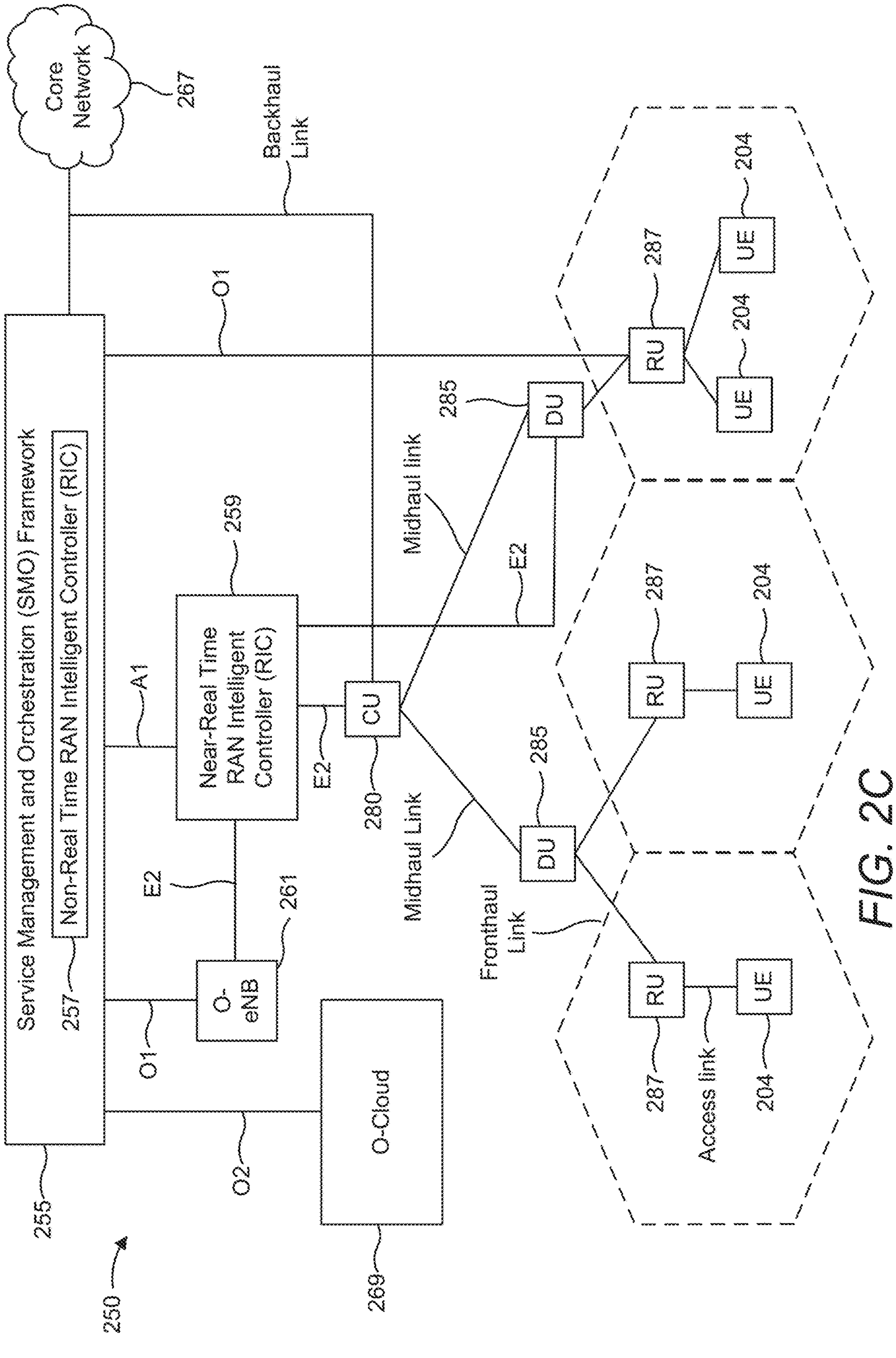

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
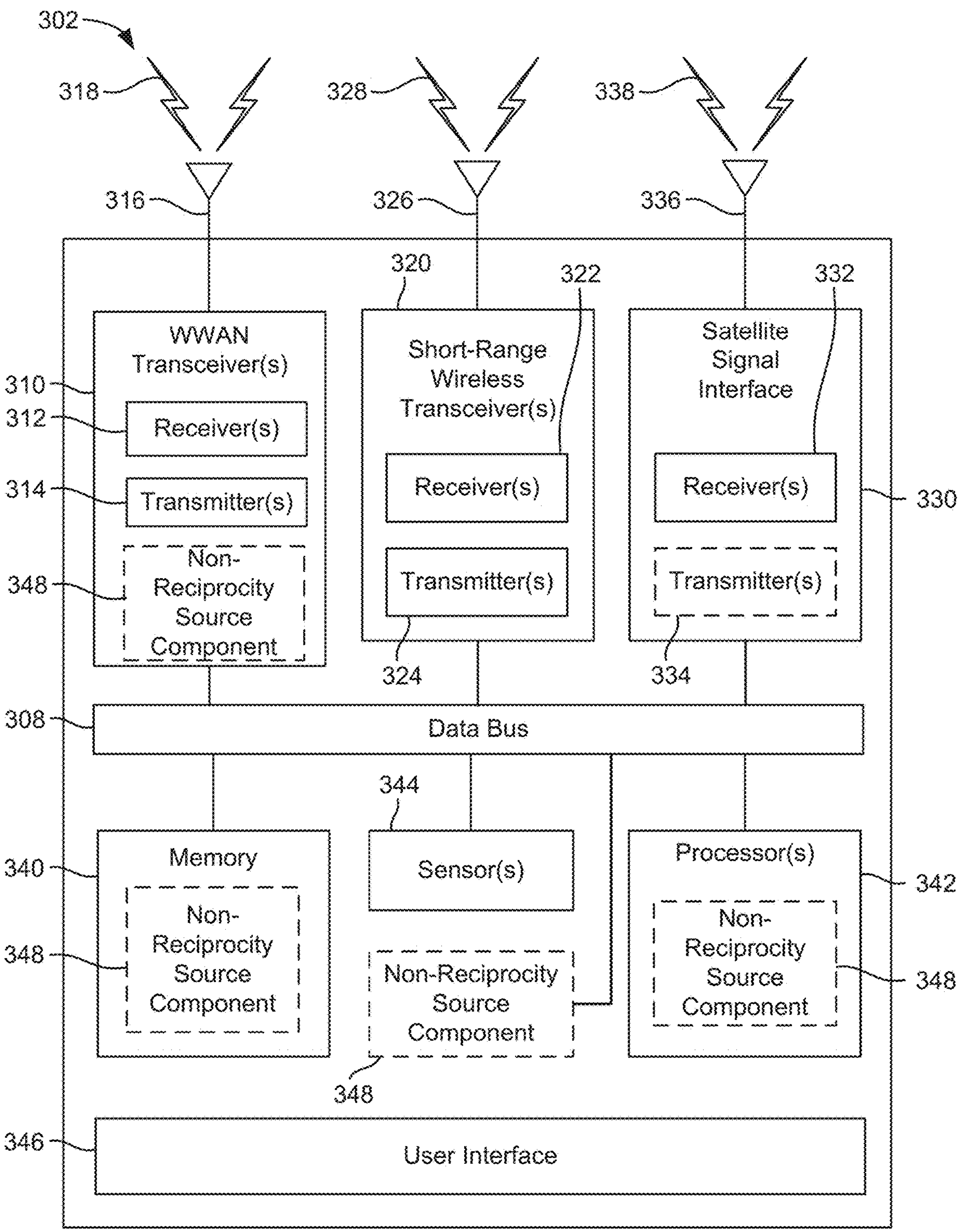
FIGS. 3A, 3B, and 3C are simplified block diagrams of several sample aspects of components that may be employed in a user equipment (UE), a base station, and a network entity, respectively, and configured to support communications as taught herein.
Figure 3B:
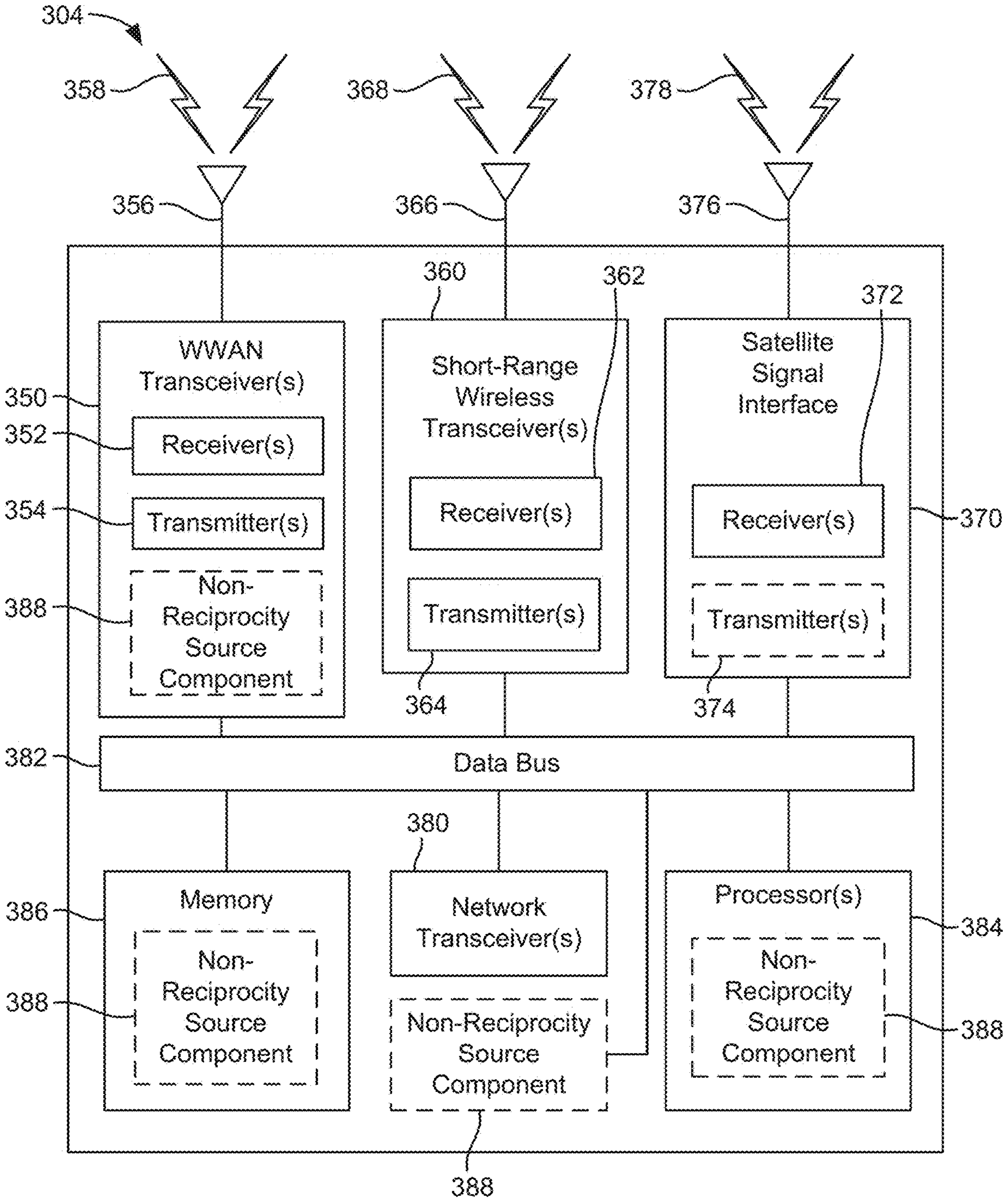
Figure 3C:
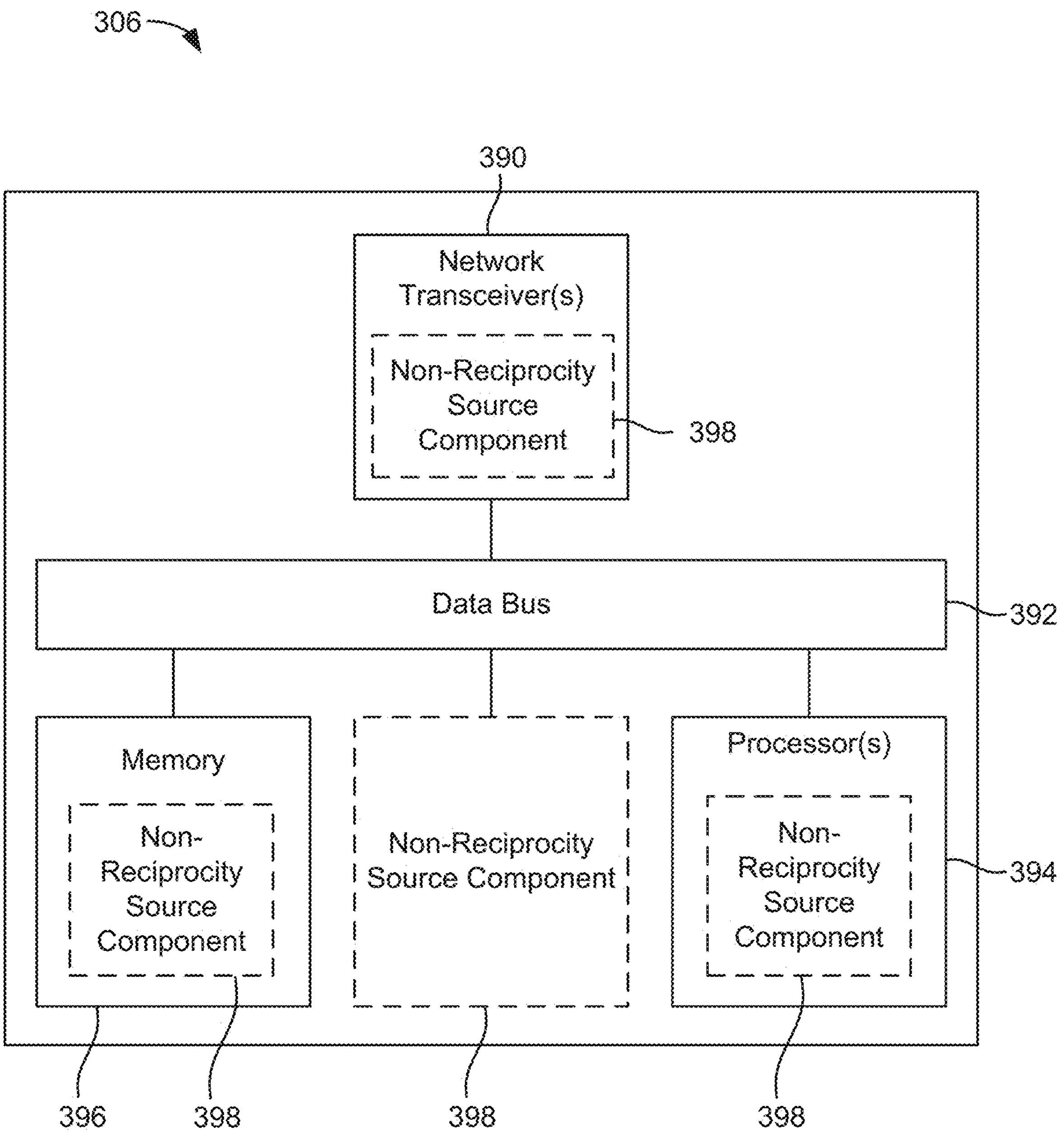

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal interfaces 330 and 370, which each include one or more satellite signal receivers 332 and 372, respectively, and may optionally include one or more satellite signal transmitters 334 and 374, respectively. In some cases, the base station 304 may be a terrestrial base station that may communicate with space vehicles (e.g., space vehicles 112) via the satellite signal interface 370. In other cases, the base station 304 may be a space vehicle (or other non-terrestrial entity) that uses the satellite signal interface 370 to communicate with terrestrial networks and/or other space vehicles.

The satellite signal receivers 332 and 372 may be connected to one or more antennas 336 and 376, respectively, and may provide means for receiving and/or measuring satellite positioning/communication signals 338 and 378, respectively. Where the satellite signal receiver(s) 332 and 372 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS) signals, etc. Where the satellite signal receiver(s) 332 and 372 are non-terrestrial network (NTN) receivers, the satellite positioning/communication signals 338 and 378 may be communication signals (e.g., carrying control and/or user data) originating from a 5G network. The satellite signal receiver (s) 332 and 372 may comprise any suitable hardware and/or software for receiving and processing satellite positioning/communication signals 338 and 378, respectively. The satellite signal receiver(s) 332 and 372 may request information and operations as appropriate from the other systems, and, at least in some cases, perform calculations to determine locations of the UE 302 and the base station 304, respectively, using measurements obtained by any suitable satellite positioning system algorithm.

The optional satellite signal transmitter(s) 334 and 374, when present, may be connected to the one or more antennas 336 and 376, respectively, and may provide means for transmitting satellite positioning/communication signals 338 and 378, respectively. Where the satellite signal transmitter(s) 374 are satellite positioning system transmitters, the satellite positioning/communication signals 378 may be GPS signals, GLONASS® signals, Galileo signals, Beidou signals, NAVIC, QZSS signals, etc. Where the satellite signal transmitter(s) 334 and 374 are NTN transmitters, the satellite positioning/communication signals 338 and 378 may be communication signals (e.g., carrying control and/or user data) originating from a 5G network. The satellite signal transmitter(s) 334 and 374 may comprise any suitable hardware and/or software for transmitting satellite positioning/communication signals 338 and 378, respectively. The satellite signal transmitter(s) 334 and 374 may request information and operations as appropriate from the other systems.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 342, 384, and 394, respectively, for providing functionality relating to, for example, wireless communication, and for providing other processing functionality. The processors 342, 384, and 394 may therefore provide means for processing, such as means for determining, means for calculating, means for receiving, means for transmitting, means for indicating, etc. In an aspect, the processors 342, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include non-reciprocity source component 348, 388, and 398, respectively. The non-reciprocity source component 348, 388, and 398 may be hardware circuits that are part of or coupled to the processors 342, 384, and 394, respectively, that, when executed, cause the UE 302, the base station 304, and the network entity 306 to perform the functionality described herein. In other aspects, the non-reciprocity source component 348, 388, and 398 may be external to the processors 342, 384, and 394 (e.g., part of a modem processing system, integrated with another processing system, etc.). Alternatively, the non-reciprocity source component 348, 388, and 398 may be memory modules stored in the memories 340, 386, and 396, respectively, that, when executed by the processors 342, 384, and 394 (or a modem processing system, another processing system, etc.), cause the UE 302, the base station 304, and the network entity 306 to perform the functionality described herein. FIG. 3A illustrates possible locations of the non-reciprocity source component 348, which may be, for example, part of the one or more WWAN transceivers 310, the memory 340, the one or more processors 342, or any combination thereof, or may be a standalone component. FIG. 3B illustrates possible locations of the non-reciprocity source component 388, which may be, for example, part of the one or more WWAN transceivers 350, the memory 386, the one or more processors 384, or any combination thereof, or may be a standalone component. FIG. 3C illustrates possible locations of the non-reciprocity source component 398, which may be, for example, part of the one or more network transceivers 390, the memory 396, the one or more processors 394, or any combination thereof, or may be a standalone component.

The UE 302 may include one or more sensors 344 coupled to the one or more processors 342 to provide means for sensing or detecting movement and/or orientation information that is independent of motion data derived from signals received by the one or more WWAN transceivers 310, the one or more short-range wireless transceivers 320, and/or the satellite signal interface 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 342. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 342, which implements Layer-3 (L3) and Layer-2 (L2) functionality.

In the downlink, the one or more processors 342 provides demultiplexing between transport and logical channels, packet reassembly, deciphering, header decompression, and control signal processing to recover IP packets from the core network. The one or more processors 342 are also responsible for error detection.

Similar to the functionality described in connection with the downlink transmission by the base station 304, the one or more processors 342 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal interface 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal interface 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 308, 382, and 392, respectively. In an aspect, the data buses 308, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 308, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 342, 384, 394, the transceivers 310, 320, 350, and 360, the memories 340, 386, and 396, the non-reciprocity source component 348, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Figure 4:
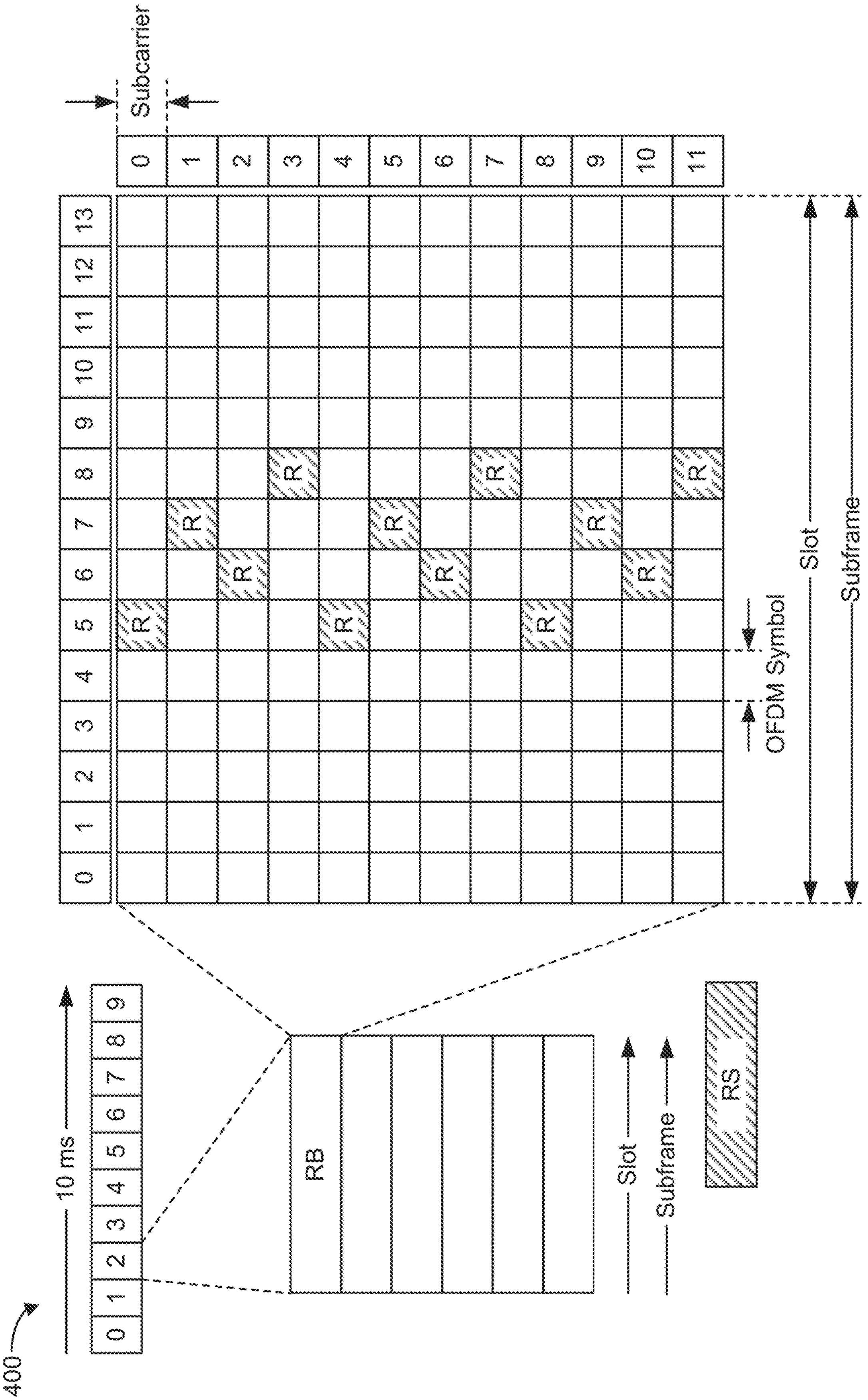
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (u), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from 2^μ*{4, 5, 8, 10, 16, 20, 32, 40, 64, 80, 160, 320, 640, 1280, 2560, 5120, 10240} slots, with u=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

In an aspect, the reference signal carried on the REs labeled "R" in FIG. 4 may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 4, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 4); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS may be available for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. These features may be configured through RRC higher layer signaling (and potentially triggered or activated through a MAC control element (MAC-CE) or downlink control information (DCI)).

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre)configured to occupy fewer than the 14 symbols of a slot.

Sidelink resources are configured at the radio resource control (RRC) layer. The RRC configuration can be by pre-configuration (e.g., preloaded on the UE) or configuration (e.g., from a serving base station).

Figure 5A:
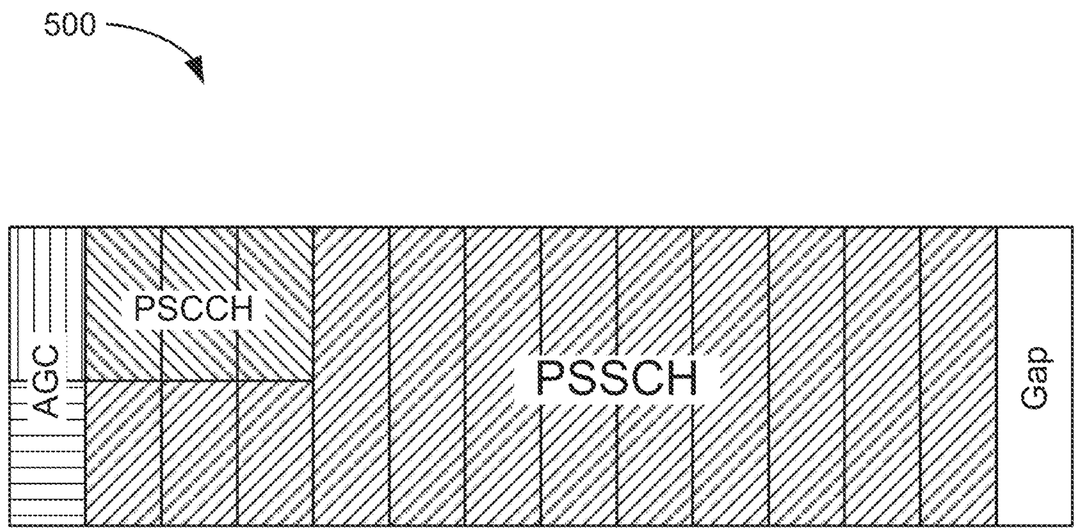
FIGS. 5A and 5B are diagrams of example sidelink slot structures with and without feedback resources, according to aspects of the disclosure.

NR sidelinks support hybrid automatic repeat request (HARQ) retransmission. FIG. 5A is a diagram 500 of an example slot structure without feedback resources, according to aspects of the disclosure. In the example of FIG. 5A, time is represented horizontally and frequency is represented vertically. In the time domain, the length of each block is one orthogonal frequency division multiplexing (OFDM) symbol, and the 14 symbols make up a slot. In the frequency domain, the height of each block is one sub-channel. Currently, the (pre)configured sub-channel size can be selected from the set of {10, 15, 20, 25, 50, 75, 100} physical resource blocks (PRBs).

For a sidelink slot, the first symbol is a repetition of the preceding symbol and is used for automatic gain control (AGC) setting. This is illustrated in FIG. 5A by the vertical and horizontal hashing. As shown in FIG. 5A, for sidelink, the physical sidelink control channel (PSCCH) and the physical sidelink shared channel (PSSCH) are transmitted in the same slot. Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user data for the UE. In the example of FIG. 5A, the PSCCH occupies half the bandwidth of the sub-channel and only three symbols. Finally, a gap symbol is present after the PSSCH.

Figure 5B:
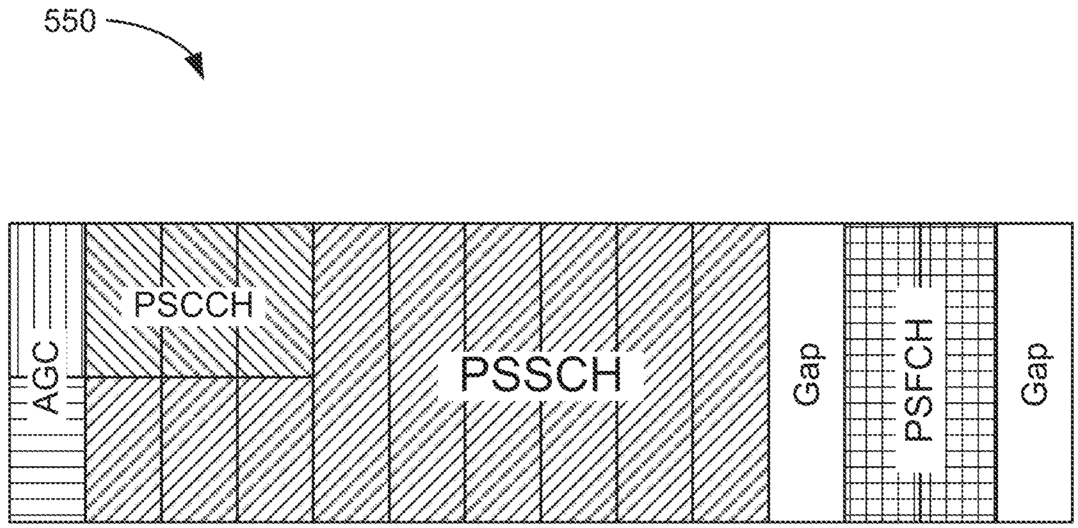

FIG. 5B is a diagram 550 of an example slot structure with feedback resources, according to aspects of the disclosure. In the example of FIG. 5B, time is represented horizontally and frequency is represented vertically. In the time domain, the length of each block is one OFDM symbol, and the 14 symbols make up a slot. In the frequency domain, the height of each block is one sub-channel.

The slot structure illustrated in FIG. 5B is similar to the slot structure illustrated in FIG. 5A, except that the slot structure illustrated in FIG. 5B includes feedback resources. Specifically, two symbols at the end of the slot have been dedicated to the physical sidelink feedback channel (PSFCH). The first PSFCH symbol is a repetition of the second PSFCH symbol for AGC setting. In addition to the gap symbol after the PSSCH, there is a gap symbol after the two PSFCH symbols. Currently, resources for the PSFCH can be configured with a periodicity selected from the set of {0, 1, 2, 4} slots.

The first 13 symbols of a slot in the time domain and the allocated subchannel(s) in the frequency domain form a sidelink resource pool. A sidelink resource pool may include resources for sidelink communication (transmission and/or reception), sidelink positioning (referred to as a resource pool for positioning (RP-P)), or both communication and positioning. A resource pool configured for both communication and positioning is referred to as a "shared" resource pool. In a shared resource pool, the RP-P is indicated by an offset, periodicity, number of consecutive symbols within a slot (e.g., as few as one symbol), and/or the bandwidth within a component carrier (or the bandwidth across multiple component carriers). In addition, the RP-P can be associated with a zone or a distance from a reference location.

A base station (or a UE, depending on the resource allocation mode) can assign, to another UE, one or more resource configurations from the RP-Ps. Additionally or alternatively, a UE (e.g., a relay or a remote UE) can request one or more RP-P configurations, and it can include in the request one or more of the following: (1) its location information (or zone identifier), (2) periodicity, (3) bandwidth, (4) offset, (5) number of symbols, and (6) whether a configuration with "low interference" is needed (which can be determined through an assigned quality of service (QOS) or priority).

A base station or a UE can configure/assign rate matching resources or RP-P for rate matching and/or muting to a sidelink UE such that when a collision exists between the assigned resources and another resource pool that contains data (PSSCH) and/or control (PSCCH), the sidelink UE is expected to rate match, mute, and/or puncture the data, DMRS, and/or CSI-RS within the colliding resources. This would enable orthogonalization between positioning and data transmissions for increased coverage of PRS signals.

Figure 6:
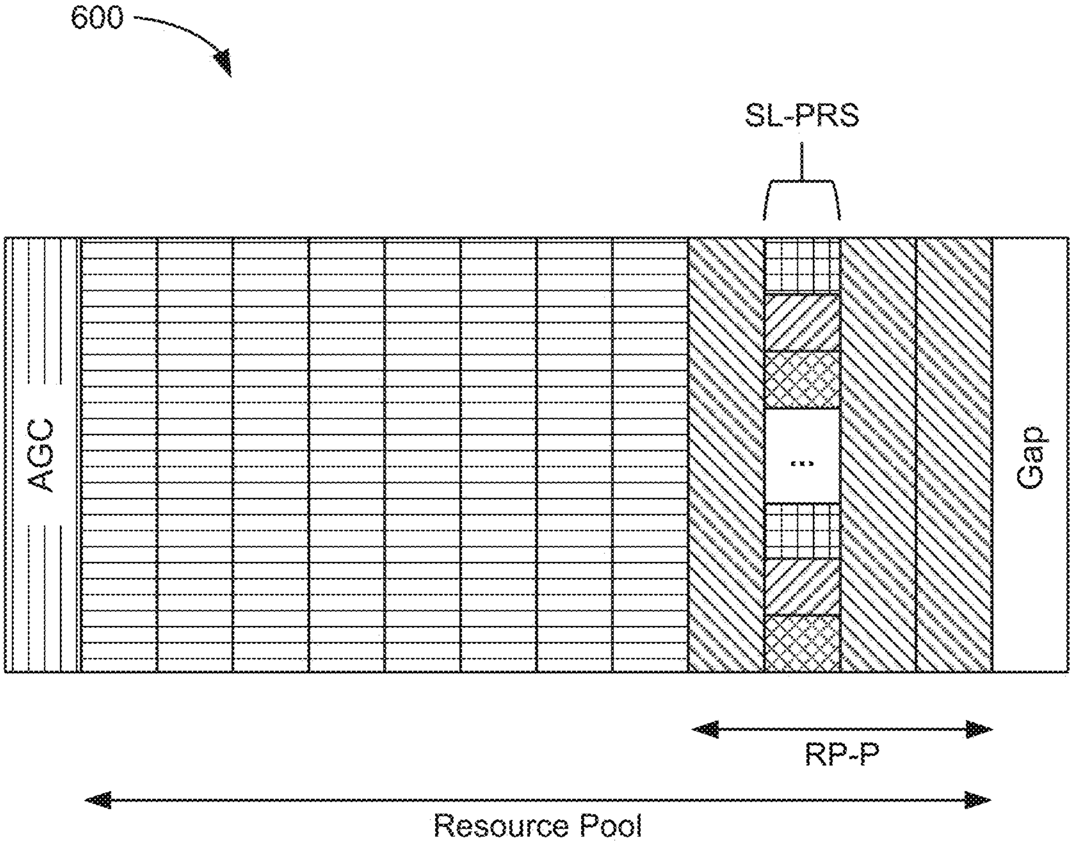
FIG. 6 is a diagram illustrating an example of a resource pool for positioning configured within a sidelink resource pool for communication, according to aspects of the disclosure.

FIG. 6 is a diagram 600 illustrating an example of a resource pool for positioning configured within a sidelink resource pool for communication (i.e., a shared resource pool), according to aspects of the disclosure. In the example of FIG. 6, time is represented horizontally and frequency is represented vertically. In the time domain, the length of each block is an orthogonal frequency division multiplexing (OFDM) symbol, and the 14 symbols make up a slot. In the frequency domain, the height of each block is a sub-channel.

In the example of FIG. 6, the entire slot (except for the first and last symbols) can be a resource pool for sidelink communication. That is, any of the symbols other than the first and last can be allocated for sidelink communication. However, an RP-P is allocated in the last four pre-gap symbols of the slot. As such, non-sidelink positioning data, such as user data (PSSCH), CSI-RS, and control information, can only be transmitted in the first eight post-AGC symbols and not in the last four pre-gap symbols to prevent a collision with the configured RP-P. The non-sidelink positioning data that would otherwise be transmitted in the last four pre-gap symbols can be punctured or muted, or the non-sidelink data that would normally span more than the eight post-AGC symbols can be rate matched to fit into the eight post-AGC symbols.

Sidelink positioning reference signals (SL-PRS) have been defined to enable sidelink positioning procedures among UEs. Like a downlink PRS (DL-PRS), an SL-PRS resource is composed of one or more resource elements (i.e., one OFDM symbol in the time domain and one subcarrier in the frequency domain). SL-PRS resources have been designed with a comb-based pattern to enable fast Fourier transform (FFT)-based processing at the receiver. SL-PRS resources are composed of unstaggered, or only partially staggered, resource elements in the frequency domain to provide small time of arrival (TOA) uncertainty and reduced overhead of each SL-PRS resource. SL-PRS may also be associated with specific RP-Ps (e.g., certain SL-PRS may be allocated in certain RP-Ps). SL-PRS have also been defined with intra-slot repetition (not shown in FIG. 6) to allow for combining gains (if needed). There may also be inter-UE coordination of RP-Ps to provide for dynamic SL-PRS and data multiplexing while minimizing SL-PRS collisions.

Figure 7:
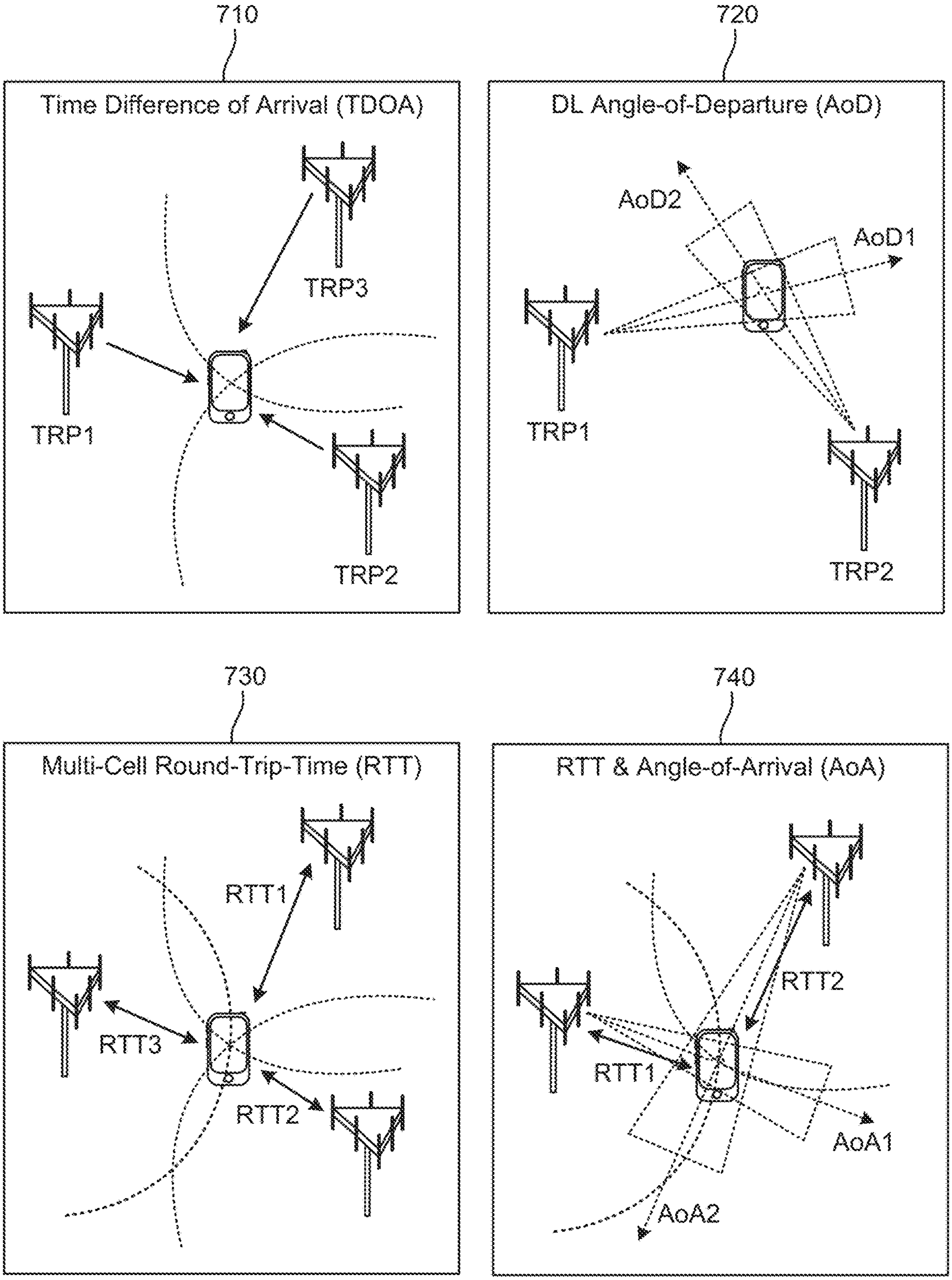
FIG. 7 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 7 illustrates examples of various positioning methods, according to aspects of the disclosure. In an OTDOA or DL-TDOA positioning procedure, illustrated by scenario 710, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 720, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 730, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 740.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 8A:
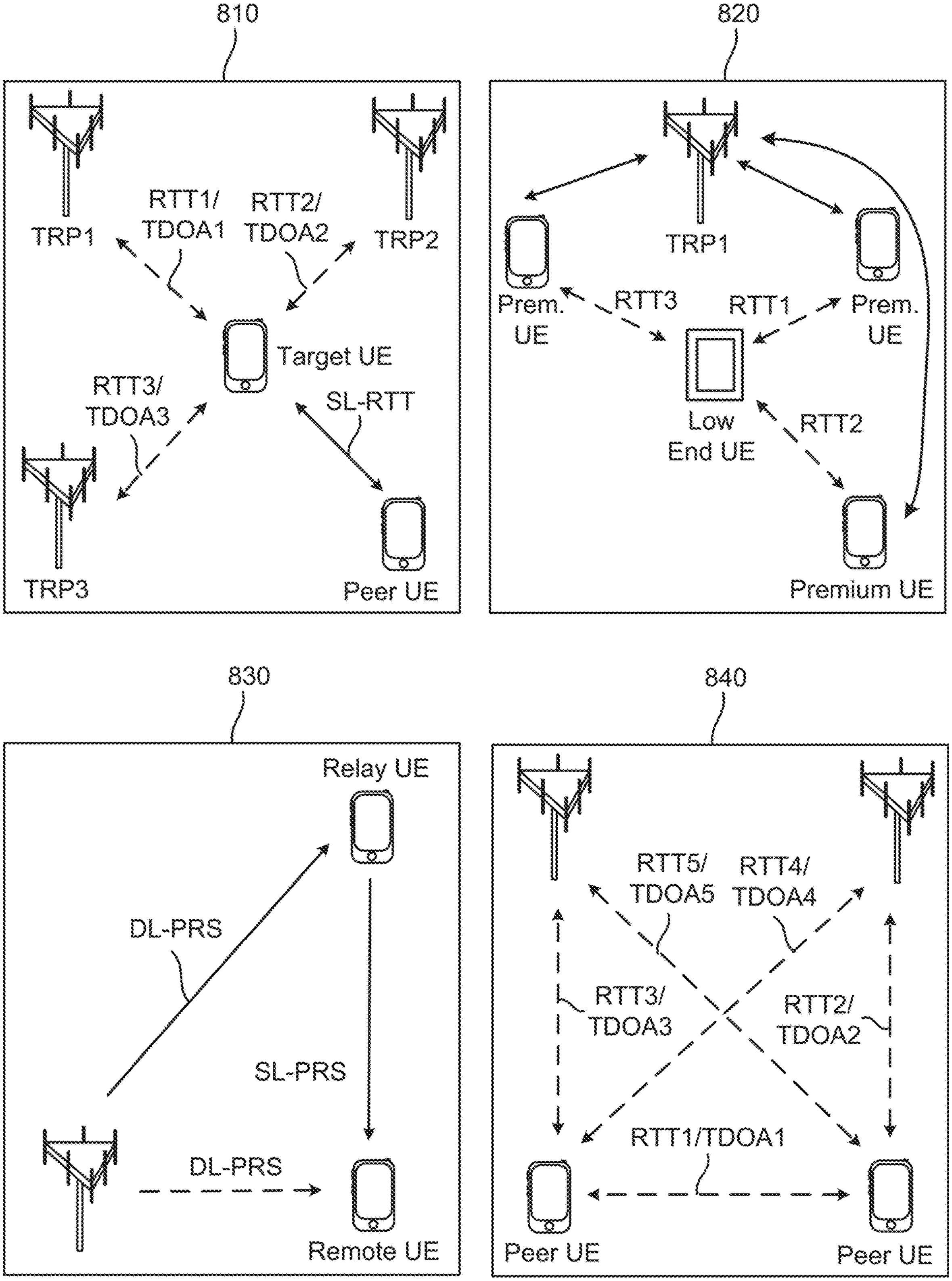
FIGS. 8A and 8B illustrate various scenarios of interest for sidelink-only or joint Uu and sidelink positioning, according to aspects of the disclosure.

NR supports, or enables, various sidelink positioning techniques. FIG. 8A illustrates various scenarios of interest for sidelink-only or joint Uu and sidelink positioning, according to aspects of the disclosure. In scenario 810, at least one peer UE with a known location can improve the Uu-based positioning (e.g., multi-cell round-trip-time (RTT), downlink time difference of arrival (DL-TDOA), etc.) of a target UE by providing an additional anchor (e.g., using sidelink RTT (SL-RTT)). In scenario 820, a low-end (e.g., reduced capacity, or "RedCap") target UE may obtain the assistance of premium UEs to determine its location using, e.g., sidelink positioning and ranging procedures with the premium UEs. Compared to the low-end UE, the premium UEs may have more capabilities, such as more sensors, a faster processor, more memory, more antenna elements, higher transmit power capability, access to additional frequency bands, or any combination thereof. In scenario 830, a relay UE (e.g., with a known location) participates in the positioning estimation of a remote UE without performing uplink positioning reference signal (PRS) transmission over the Uu interface. Scenario 840 illustrates the joint positioning of multiple UEs. Specifically, in scenario 840, two UEs with unknown positions can be jointly located in non-line-of-sight (NLOS) conditions by utilizing constraints from nearby UEs.

Figure 8B:
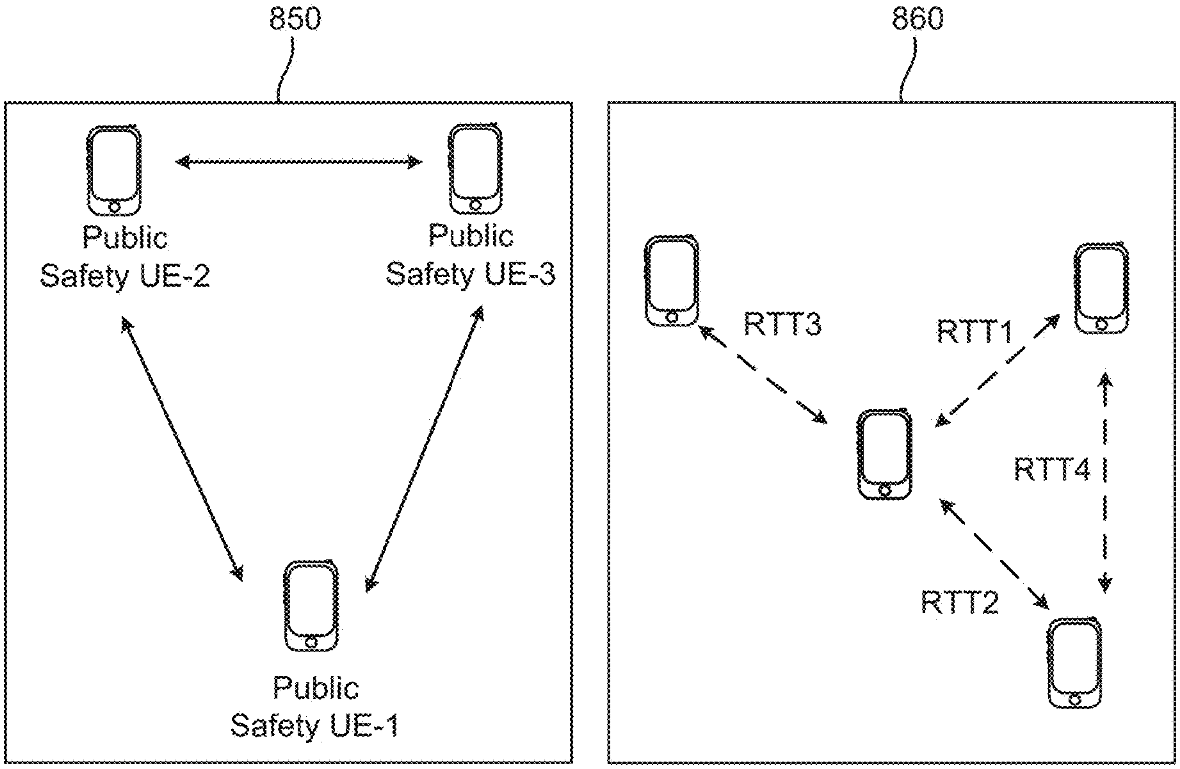

FIG. 8B illustrates additional scenarios of interest for sidelink-only or joint Uu and sidelink positioning, according to aspects of the disclosure. In scenario 850, UEs used for public safety (e.g., by police, firefighters, and/or the like) may perform peer-to-peer (P2P) positioning and ranging for public safety and other uses. For example, in scenario 850, the public safety UEs may be out of coverage of a network and determine a location or a relative distance and a relative position among the public safety UEs using sidelink positioning techniques. Similarly, scenario 860 shows multiple UEs that are out of coverage and determine a location or a relative distance and a relative position using sidelink positioning techniques, such as SL-RTT.

In NR, there may not be precise timing synchronization across the network. Instead, it may be sufficient to have coarse time-synchronization across base stations (e.g., within a cyclic prefix (CP) duration of the orthogonal frequency division multiplexing (OFDM) symbols). RTT-based methods generally only need coarse timing synchronization, and as such, are a preferred positioning method in NR.

Figure 9:
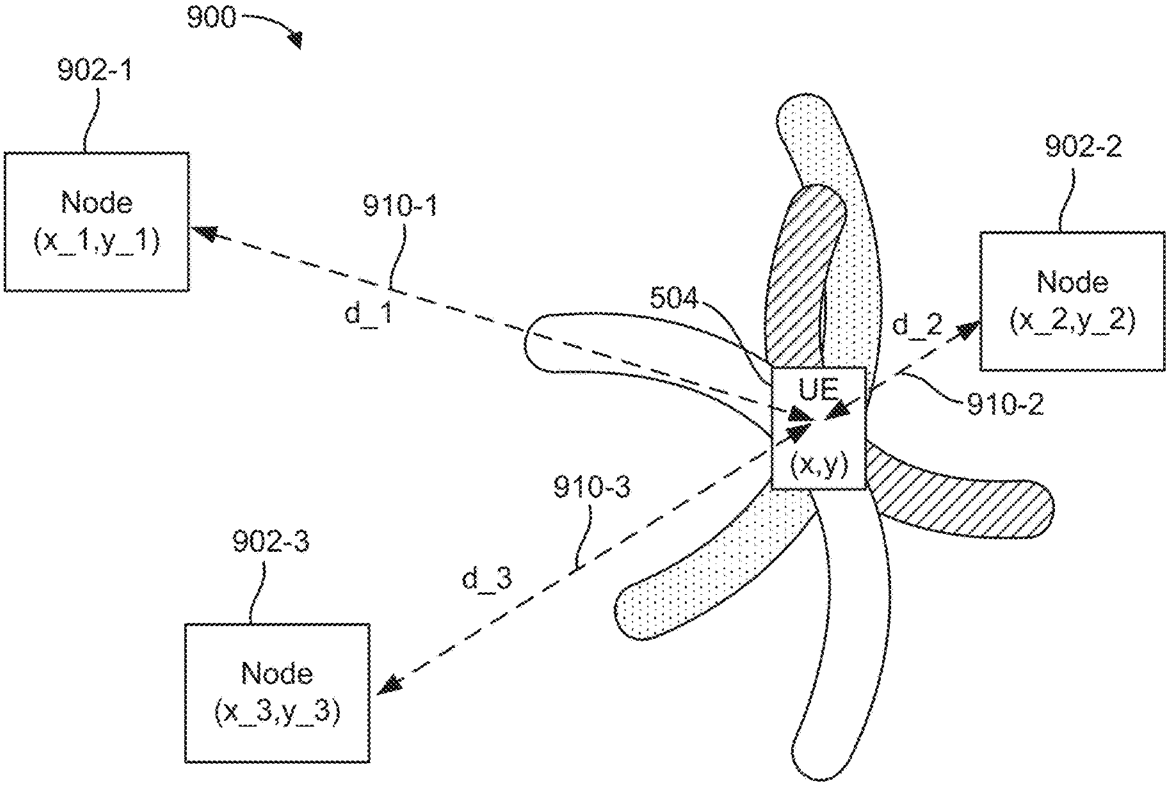
FIG. 9 is a diagram illustrating an example round-trip-time (RTT) procedure for determining a location of a UE, according to aspects of the disclosure.

FIG. 9 illustrates an example wireless communications system 900, according to aspects of the disclosure. In the example of FIG. 9, a UE 904 (e.g., any of the UEs described herein) is attempting to calculate an estimate of its location, or assist another entity (e.g., a base station or core network component, another UE, a location server, a third party application, etc.) to calculate an estimate of its location. The UE 904 may transmit and receive wireless signals to and from a plurality of network nodes (labeled "Node") 902-1, 902-2, and 902-3 (collectively, network nodes 902). The network nodes 902 may include one or more base stations (e.g., any of the base stations described herein), one or more reconfigurable intelligent displays (RIS), one or more positioning beacons, one or more UEs (e.g., connected over sidelinks), etc.

In a network-centric RTT positioning procedure the serving base station (e.g., one of network nodes 902) instructs the UE 904 to measure RTT measurement signals (e.g., PRS) from two or more neighboring network nodes 902 (and typically the serving base station, as at least three network nodes 902 are needed for a two-dimensional location estimate). The involved network nodes 902 transmit RTT measurement signals on low reuse resources (e.g., resources used by the network nodes 902 to transmit system information, where the network nodes 902 are base stations) allocated by the network (e.g., location server 230, LMF 270, SLP 272). The UE 904 records the arrival time (also referred to as the receive time, reception time, time of reception, or time of arrival) of each RTT measurement signal relative to the UE's 904 current downlink timing (e.g., as derived by the UE 904 from a downlink signal received from its serving base station), and transmits a common or individual RTT response signal (e.g., SRS) to the involved network nodes 902 on resources allocated by its serving base station. The UE 904, if it not the positioning entity, reports a UE reception-to-transmission (Rx-Tx) time difference measurement to the positioning entity. The UE Rx-Tx time difference measurement indicates the time difference between the arrival time of each RTT measurement signal at the UE 904 and the transmission time(s) of the RTT response signal(s). Each involved network node 902 also reports, to the positioning entity, a network node Rx-Tx time difference measurement (also referred to as a base station (BS) or gNB Rx-Tx time difference measurement), which indicates the difference between the transmission time of the RTT measurement signal and the reception time of the RTT response signal.

A UE-centric RTT positioning procedure is similar to the network-based procedure, except that the UE 904 transmits uplink RTT measurement signal(s) (e.g., on resources allocated by the serving base station). The uplink RTT measurement signal(s) are measured by multiple network nodes 902 in the neighborhood of the UE 904. Each involved network node 902 responds with a downlink RTT response signal and reports a network node Rx-Tx time difference measurement to the positioning entity. The network node Rx-Tx time difference measurement indicates the time difference between the arrival time of the RTT measurement signal at the network node 902 and the transmission time of the RTT response signal. The UE 904, if it is not the positioning entity, reports, for each network node 902, a UE Rx-Tx time difference measurement that indicates the difference between the transmission time of the RTT measurement signal and the reception time of the RTT response signal.

In order to determine the location (x, y) of the UE 904, the positioning entity needs to know the locations of the network nodes 902, which may be represented in a reference coordinate system as (x_k, y_y), where k=1, 2, 3 in the example of FIG. 9. Where the UE 904 is the positioning entity, a location server with knowledge of the network geometry (e.g., location server 230, LMF 270, SLP 272) may provide the locations of the involved network nodes 902 to the UE 904.

The positioning entity determines each distance 910 (d_k, where k=1, 2, 3) between the UE 904 and the respective network node 902 based on the UE Rx-Tx and network node Rx-Tx time difference measurements and the speed of light, as described further below with reference to FIG. 10. Specifically, in the example of FIG. 9, the distance 910-1 between the UE 904 and the network node 902-1 is d_1, the distance 910-2 between the UE 904 and the network node 902-2 is d_2, and the distance 910-3 between the UE 904 and the network node 902-3 is d_3. Once each distance 910 is determined, the positioning entity can solve for the location (x, y) of the UE 904 by using a variety of known geometric techniques, such as trilateration. From FIG. 9, it can be seen that the location of the UE 904 ideally lies at the common intersection of three semicircles, each semicircle being defined by radius dk and center (x_k, y_k), where k=1, 2, 3.

Figure 10:
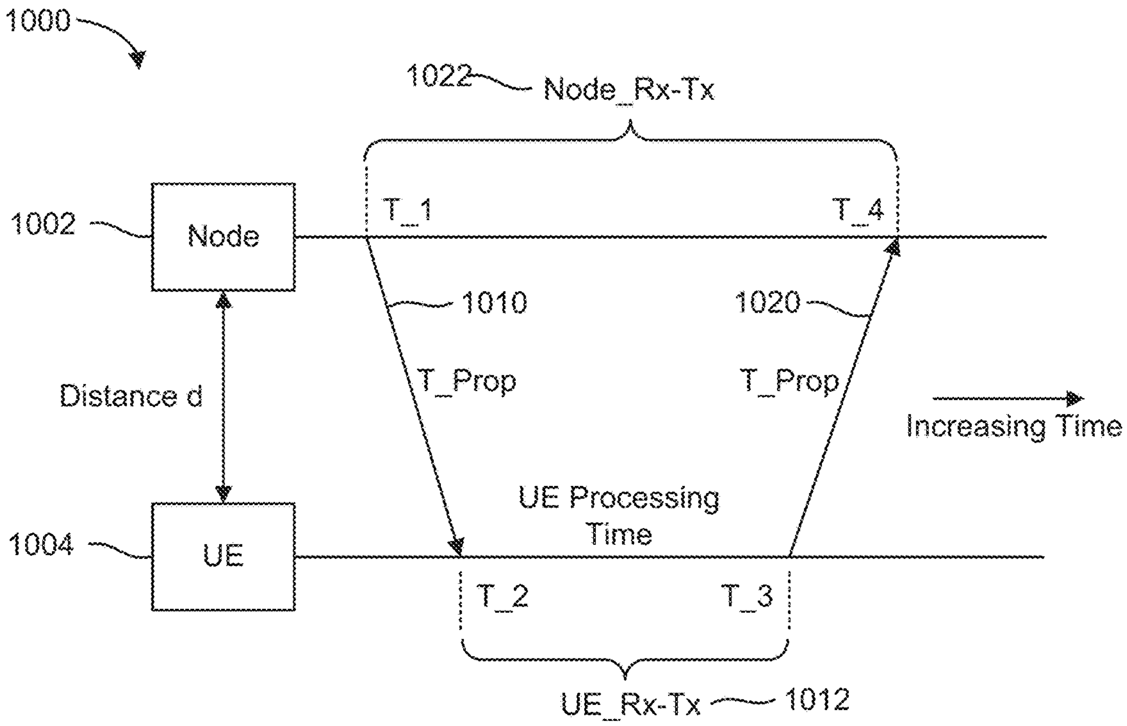
FIG. 10 is a diagram showing example timings of RTT measurement signals exchanged between a base station and a UE, according to aspects of the disclosure.

FIG. 10 is a diagram 1000 showing example timings of RTT measurement signals exchanged between a network node 1002 (labeled "Node") and a UE 1004, according to aspects of the disclosure. The UE 1004 may be any of the UEs described herein. The network node 1002 may be a base station (e.g., any of the base stations described herein), an RIS, a positioning beacon, another UE (e.g., connected over a sidelink), or the like.

In the example of FIG. 10, the network node 1002 (labeled "BS") sends an RTT measurement signal 1010 (e.g., PRS) to the UE 1004 at time T_1. The RTT measurement signal 1010 has some propagation delay T_Prop as it travels from the network node 1002 to the UE 1004. At time T_2 (the reception time of the RTT measurement signal 1010 at the UE 1004), the UE 1004 measures the RTT measurement signal 1010. After some UE processing time, the UE 1004 transmits an RTT response signal 1020 (e.g., SRS) at time T_3. After the propagation delay T_Prop, the network node 1002 measures the RTT response signal 1020 from the UE 1004 at time T_4 (the reception time of the RTT response signal 1020 at the network node 1002).

The UE 1004 reports the difference between time T_3 and time T_2 (i.e., the UE's 1004 Rx-Tx time difference measurement, shown as UE_Rx-Tx 1012) to the positioning entity. Similarly, the network node 1002 reports the difference between time T_4 and time T_1 (i.e., the network node's 1002 Rx-Tx time difference measurement, shown as Node_Rx-Tx 1022) to the positioning entity. Using these measurements and the known speed of light, the positioning entity can calculate the distance to the UE 1004 as d=½*c*(Node_Rx-Tx−UE_Rx-Tx)=½*c*(T_4−T_1)−½*c*(T_3−T_2), where c is the speed of light.

Based on the known location of the network node 1002 and the distance between the UE 1004 and the network node 1002 (and at least two other network nodes 1002), the positioning entity can calculate the location of the UE 1004. As shown in FIG. 9, the location of the UE 1004 lies at the common intersection of three semicircles, each semicircle being defined by a radius of the distance between the UE 1004 and a respective network node 1002.

In an aspect, the positioning entity may calculate the UE's 904/1004 location using a two-dimensional coordinate system; however, the aspects disclosed herein are not so limited, and may also be applicable to determining locations using a three-dimensional coordinate system, if the extra dimension is desired. Additionally, while FIG. 9 illustrates one UE 904 and three network nodes 902 and FIG. 10 illustrates one UE 1004 and one network node 1002, as will be appreciated, there may be more UEs 904/1004 and more network nodes 902/1002.

Figure 11:
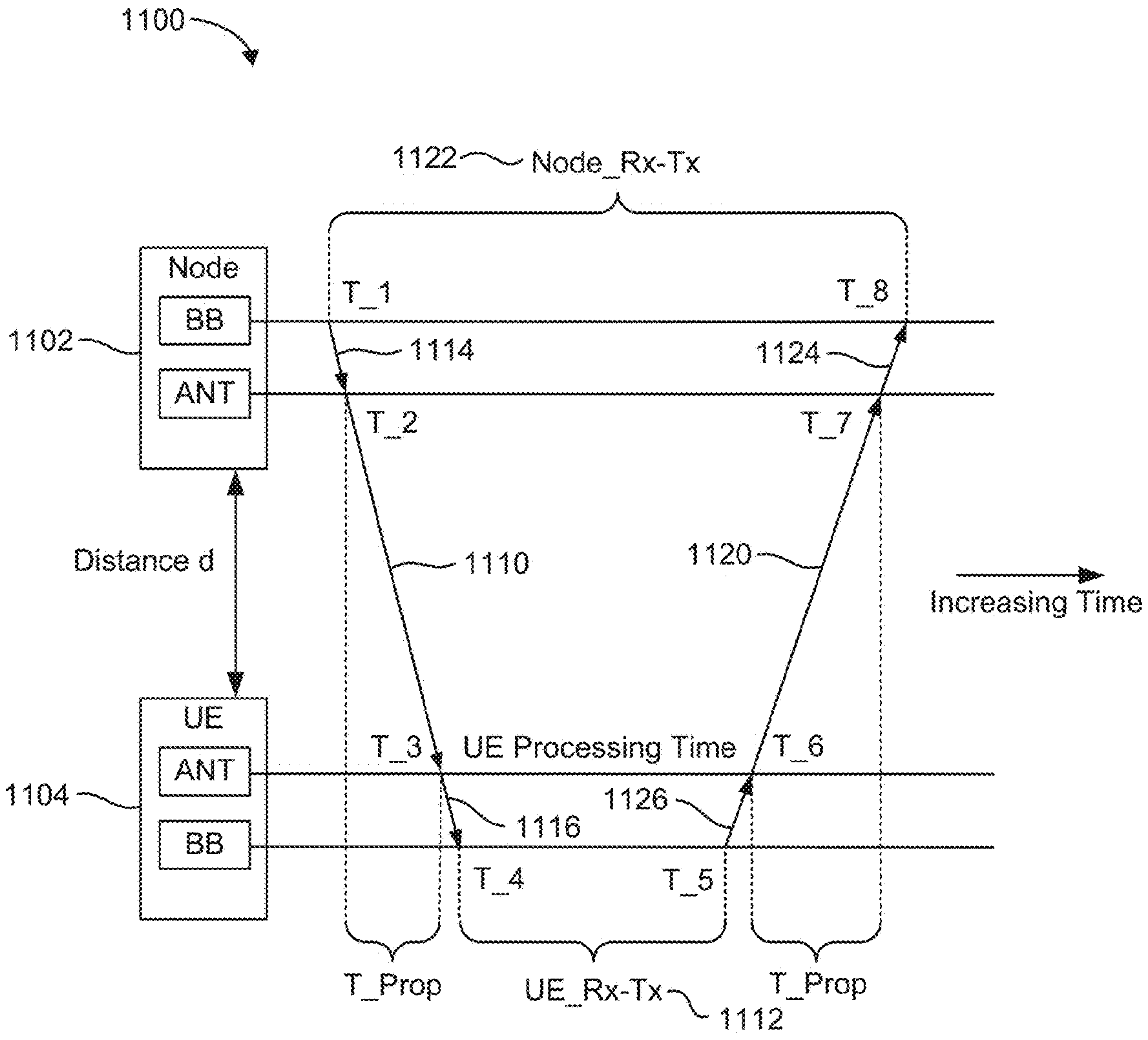
FIG. 11 is a diagram illustrating example timings of RTT measurement signals exchanged between a base station and a UE, according to aspects of the disclosure.

FIG. 11 is a diagram 1100 showing example timings of RTT measurement signals exchanged between a network node 1102 and a UE 1104, according to aspects of the disclosure. The diagram 1100 is similar to the diagram 1000, except that it includes processing delays that may occur at both the network node 1102 (labeled "Node") and the UE 1104 when transmitting and receiving the RTT measurement and response signals. The network node 1102 may be a base station (e.g., any of the base stations), an RIS (e.g., RIS 410), another UE (e.g., any of the UEs described herein), or other network node capable of performing an RTT positioning procedure. As a specific example, the network node 1102 and the UE 1104 may correspond to the base station 1002 and the UE 1004 in FIG. 10.

Referring now to potential processing delays, at the network node 1102, there is a transmission delay 1114 between the time T_1 that the network node's 1102 baseband (labeled "BB") generates the RTT measurement signal 1110 (e.g., a PRS) and the time T_2 that the network node's 1102 antenna(s) (labeled "Ant") transmit the RTT measurement signal 1110. At the UE 1104, there is a reception delay 1116 between the time T_3 that the UE's 604 antenna(s) (labeled "Ant") receive the RTT measurement signal 1110 and the time T_4 that the UE's 1104 baseband (labeled "BB") processes the RTT measurement signal 1110.

Similarly, for the RTT response signal 1120 (e.g., an SRS), there is a transmission delay 1126 between the time T_5 that the UE's 1104 baseband generates the RTT response signal 1120 and the time T_6 that the UE's 1104 antenna(s) transmit the RTT response signal 1120. At the network node 1102, there is a reception delay 1124 between the time T_7 that the network node's 1102 antenna(s) receive the RTT response signal 1120 and the time T_8 that the network node's 1102 baseband processes the RTT response signal 1120.

The difference between times T_2 and T_1 (i.e., transmission delay 1114) and times T_8 and T_7 (i.e., reception delay 1124) is referred to as the network node's 1102 "group delay." The difference between times T_4 and T_3 (i.e., reception delay 1116) and times T_6 and T_5 (i.e., transmission delay 1126) is referred to as the UE's 1104 "group delay." The group delay includes a hardware group delay, a group delay attributable to software/firmware, or both. More specifically, although software and/or firmware may contribute to group delay, the group delay is primarily due to internal hardware delays between the baseband and the antenna(s) of the network node 1102 and the UE 1104.

As shown in FIG. 11, because of the reception delay 1116 and the transmission delay 1126, the UE's 1104 Rx-Tx time difference measurement 1112 does not represent the difference between the actual reception time at time T_3 and the actual transmission time at time T_6. Similarly, because of the transmission delay 1114 and the reception delay 1124, the network node's 1102 Rx-Tx time difference measurement 1122 does not represent the difference between the actual transmission time at time T_2 and the actual reception time at time T_7. Thus, as shown, group delays, such as reception delays 1116 and 1124 and transmission delays 1114 and 1126, can contribute to timing errors and/or calibration errors that can impact RTT measurements, as well as other measurements, such as TDOA, RSTD, etc. This can in turn can impact positioning performance. For example, in some designs, a 10 ns error will introduce three meters of error in the final location estimate.

In some cases, the UE 1104 can calibrate its group delay and compensate for it so that the UE Rx-Tx time difference measurement 1112 reflects the actual reception and transmission times from its antenna(s). Alternatively, the UE 1104 can report its group delay to the positioning entity (if not the UE 1104), which can then subtract the group delay from the UE Rx-Tx time difference measurement 1112 when determining the final distance between the network node 1102 and the UE 1104. Similarly, the network node 1102 may be able to compensate for its group delay in the network node Rx-Tx time difference measurement 1122, or simply report the group delay to the positioning entity.

Wireless communication signals (e.g., radio frequency (RF) signals configured to carry orthogonal frequency division multiplexing (OFDM) symbols in accordance with a wireless communications standard, such as LTE, NR, etc.) transmitted between a UE and a base station can be used for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, such as Wi-Fi signals, etc. As a particular example, the wireless communication signals may be an OFDM waveform as utilized in LTE and NR. High-frequency communication signals, such as millimeter wave (mmW) RF signals, are especially beneficial to use as radar signals because the higher frequency provides, at least, more accurate range (distance) detection.

Possible use cases of RF sensing include health monitoring use cases, such as heartbeat detection, respiration rate monitoring, and the like, gesture recognition use cases, such as human activity recognition, keystroke detection, sign language recognition, and the like, contextual information acquisition use cases, such as location detection/tracking, direction finding, range estimation, and the like, and automotive radar use cases, such as smart cruise control, collision avoidance, and the like.

Figure 12A:
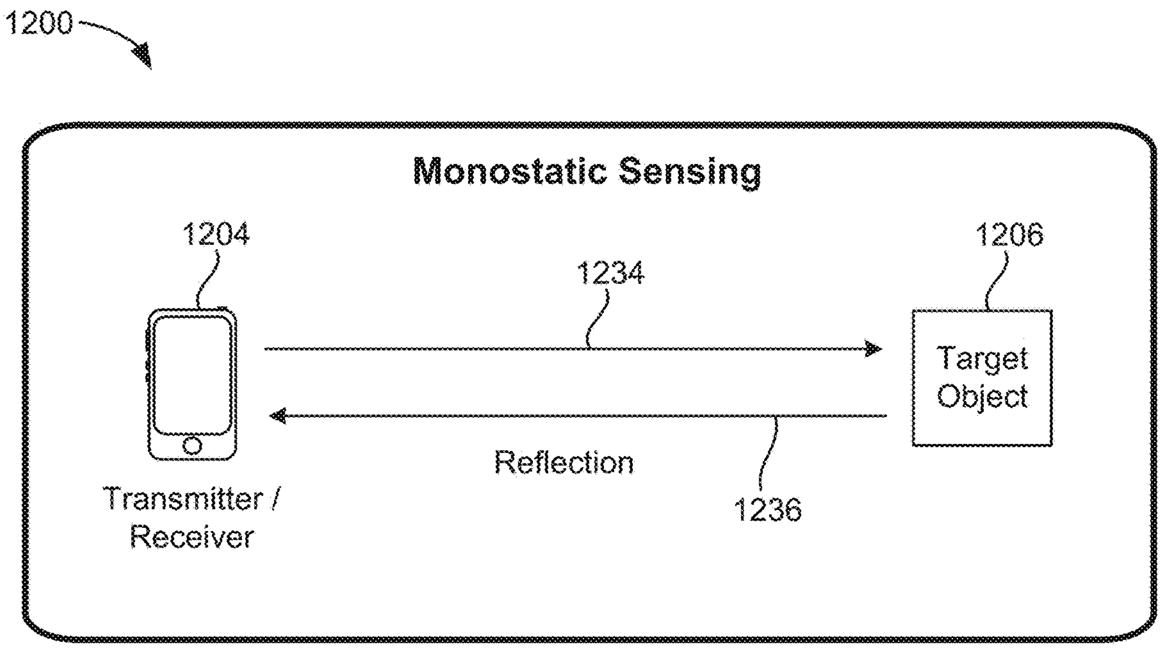
FIGS. 12A and 12B illustrate different types of radar.
Figure 12B:
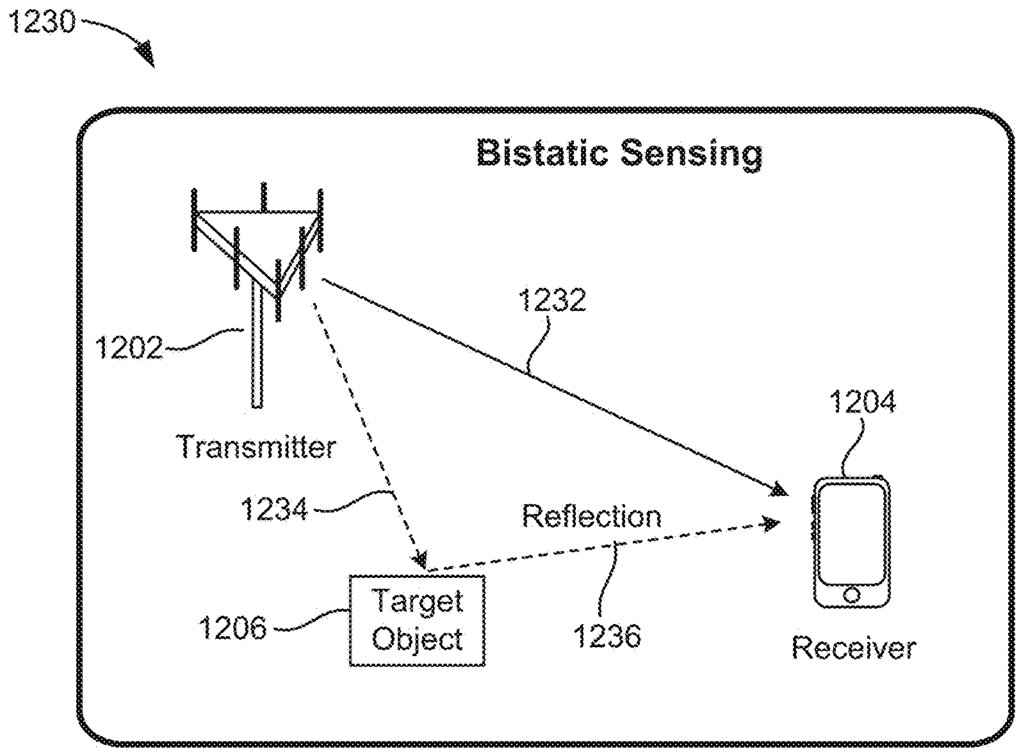

There are different types of sensing, including monostatic sensing (also referred to as "active sensing") and bistatic sensing (also referred to as "passive sensing"). FIGS. 12A and 12B illustrate these different types of sensing. Specifically, FIG. 12A is a diagram 1200 illustrating a monostatic sensing scenario and FIG. 12B is a diagram 1230 illustrating a bistatic sensing scenario. In FIG. 12A, the transmitter (Tx) and receiver (Rx) are co-located in the same sensing device 1204 (e.g., a UE). The sensing device 1204 transmits one or more RF sensing signals 1234 (e.g., uplink or sidelink positioning reference signals (PRS) where the sensing device 1204 is a UE), and some of the RF sensing signals 1234 reflect off a target object 1206. The sensing device 1204 can measure various properties (e.g., times of arrival (ToAs), angles of arrival (AoAs), phase shift, etc.) of the reflections 1236 of the RF sensing signals 1234 to determine characteristics of the target object 1206 (e.g., size, shape, speed, motion state, etc.).

In FIG. 12B, the transmitter (Tx) and receiver (Rx) are not co-located, that is, they are separate devices (e.g., a UE and a base station). Note that while FIG. 12B illustrates using a downlink RF signal as the RF sensing signal 1232, uplink RF signals or sidelink RF signals can also be used as RF sensing signals 1232. In a downlink scenario, as shown, the transmitter is a base station and the receiver is a UE, whereas in an uplink scenario, the transmitter is a UE and the receiver is a base station.

Referring to FIG. 12B in greater detail, the transmitter device 1202 transmits RF sensing signals 1232 and 1234 (e.g., positioning reference signals (PRS)) to the sensing device 1204, but some of the RF sensing signals 1234 reflect off a target object 1206. The sensing device 1204 (also referred to as the "sensing device") can measure the times of arrival (ToAs) of the RF sensing signals 1232 received directly from the transmitter device and the ToAs of the reflections 1236 of the RF sensing signals 1234 reflected from the target object 1206.

More specifically, as described above, a transmitter device (e.g., a base station) may transmit a single RF signal or multiple RF signals to a sensing device (e.g., a UE). However, the receiver may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 12B, the RF sensing signals 1232 followed the LOS path between the transmitter device 1202 and the sensing device 1204, and the RF sensing signals 1234 followed an NLOS path between the transmitter device 1202 and the sensing device 1204 due to reflecting off the target object 1206. The transmitter device 1202 may have transmitted multiple RF sensing signals 1232, 1234, some of which followed the LOS path and others of which followed the NLOS path. Alternatively, the transmitter device 1202 may have transmitted a single RF sensing signal in a broad enough beam that a portion of the RF sensing signal followed the LOS path (RF sensing signal 1232) and a portion of the RF sensing signal followed the NLOS path (RF sensing signal 1234).

Based on the ToA of the LOS path, the ToA of the NLOS path, and the speed of light, the sensing device 1204 can determine the distance to the target object(s). For example, the sensing device 1204 can calculate the distance to the target object as the difference between the ToA of the LOS path and the ToA of the NLOS path multiplied by the speed of light. In addition, if the sensing device 1204 is capable of receive beamforming, the sensing device 1204 may be able to determine the general direction to a target object as the direction (angle) of the receive beam on which the RF sensing signal following the NLOS path was received. That is, the sensing device 1204 may determine the direction to the target object as the angle of arrival (AoA) of the RF sensing signal, which is the angle of the receive beam used to receive the RF sensing signal. The sensing device 1204 may then optionally report this information to the transmitter device 1202, its serving base station, an application server associated with the core network, an external client, a third-party application, or some other sensing entity. Alternatively, the sensing device 1204 may report the ToA measurements to the transmitter device 1202, or other sensing entity (e.g., if the sensing device 1204 does not have the processing capability to perform the calculations itself), and the transmitter device 1202 may determine the distance and, optionally, the direction to the target object 1206.

Note that if the RF sensing signals are uplink RF signals transmitted by a UE to a base station, the base station would perform object detection based on the uplink RF signals just like the UE does based on the downlink RF signals.

Like conventional radar, wireless communication-based radar signal can be used to estimate the range (distance), velocity (Doppler), and angle (AoA) of a target object. However, the performance (e.g., resolution and maximum values of range, velocity, and angle) may depend on the design of the reference signal.

Figure 13:
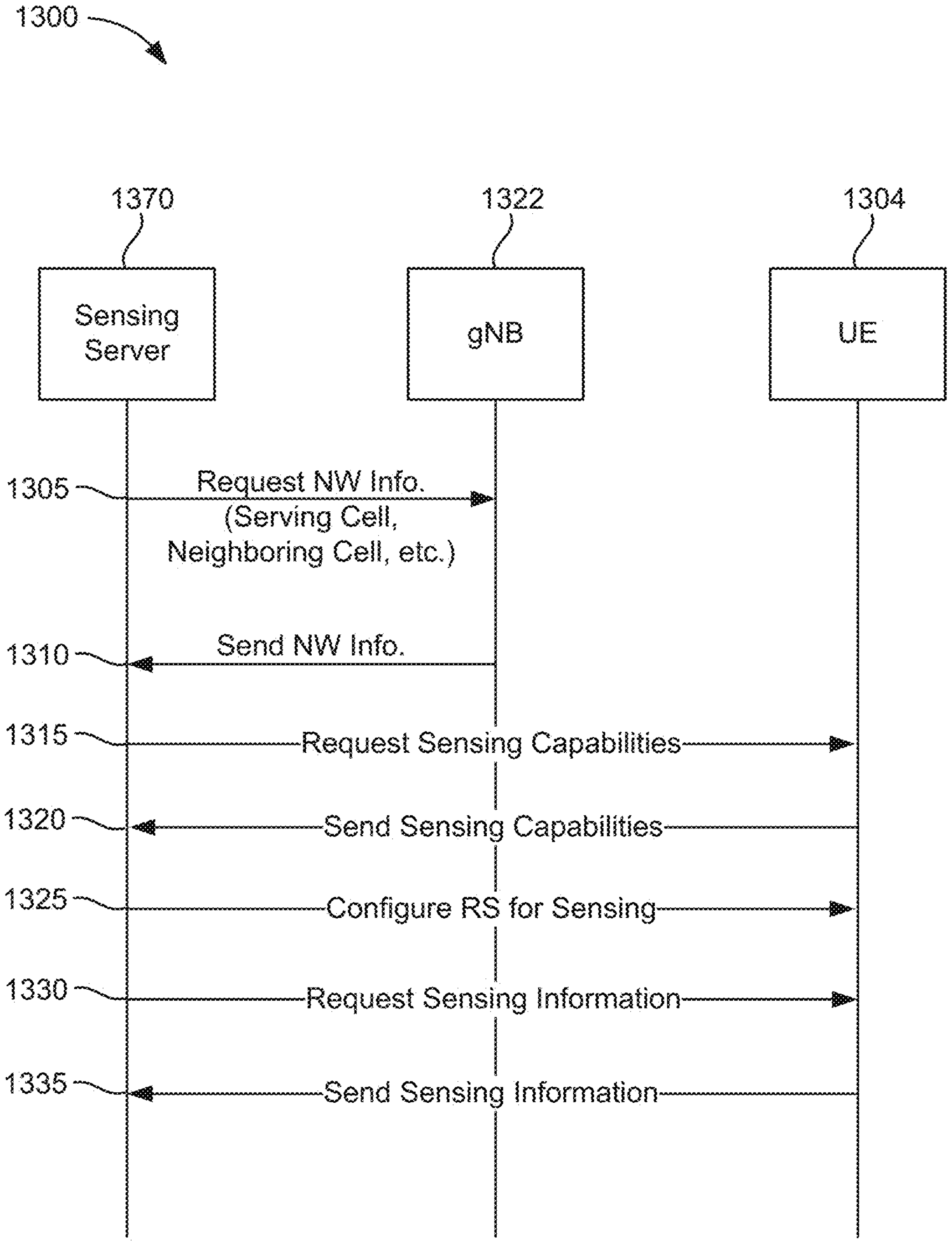
FIG. 13 illustrates an example call flow for a New Radio (NR)-based sensing procedure in which the network configures the sensing parameters, according to aspects of the disclosure.

FIG. 13 illustrates an example call flow 1300 for an NR-based sensing procedure (e.g., a bistatic sensing procedure) in which the network configures the sensing parameters, according to aspects of the disclosure. Although FIG. 13 illustrates a network-coordinated sensing procedure, the sensing procedure could be coordinated over sidelink channels.

At stage 1305, a sensing server 1370 (e.g., inside or outside the core network) sends a request for network (NW) information to a gNB 1322 (e.g., the serving gNB of a UE 1304). The request may be for a list of the UE's 1304 serving cell and any neighboring cells. At stage 1310, the gNB 1322 sends the requested information to the sensing server 1370. At stage 1315, the sensing server 1370 sends a request for sensing capabilities to the UE 1304. At stage 1320, the UE 1304 provides its sensing capabilities to the sensing server 1370.

At stage 1325, the sensing server 1370 sends a configuration to the UE 1304 indicating one or more reference signal (RS) resources that will be transmitted for sensing. The reference signal resources may be transmitted by the serving and/or neighboring cells identified at stage 1310. In some cases, the NR-based sensing procedure illustrated in FIG. 13 may be a sensing-only procedure or a joint communication and sensing (JCS) procedure. In the case of a sensing-only procedure, the reference signal resources may be reference signal resources specifically configured for sensing purposes. In the case of a JCS procedure, the reference signal resources may be reference signal resources for communication that can also be used for sensing purposes. Alternatively, the reference signal resources for sensing may be multiplexed (e.g., time-division multiplexed) with reference signal resources for communication. For example, the reference signal resources for communication may be an orthogonal frequency division multiplexing (OFDM) waveform, while the reference signal resources for sensing may be a frequency modulation continuous wave (FMCW) waveform.

At stage 1330, the sensing server 1370 sends a request for sensing information to the UE 1304. The UE 1304 then measures the transmitted reference signals and, at stage 1335, sends the measurements, or any sensing results determined from the measurements, to the sensing server 1370.

In an aspect, the communication between the UE 1304 and the sensing server 1370 may be via the LTE positioning protocol (LPP). The communication between the sensing server 1370 and the gNB may be via NR positioning protocol type A (NRPPa).

Figure 14:
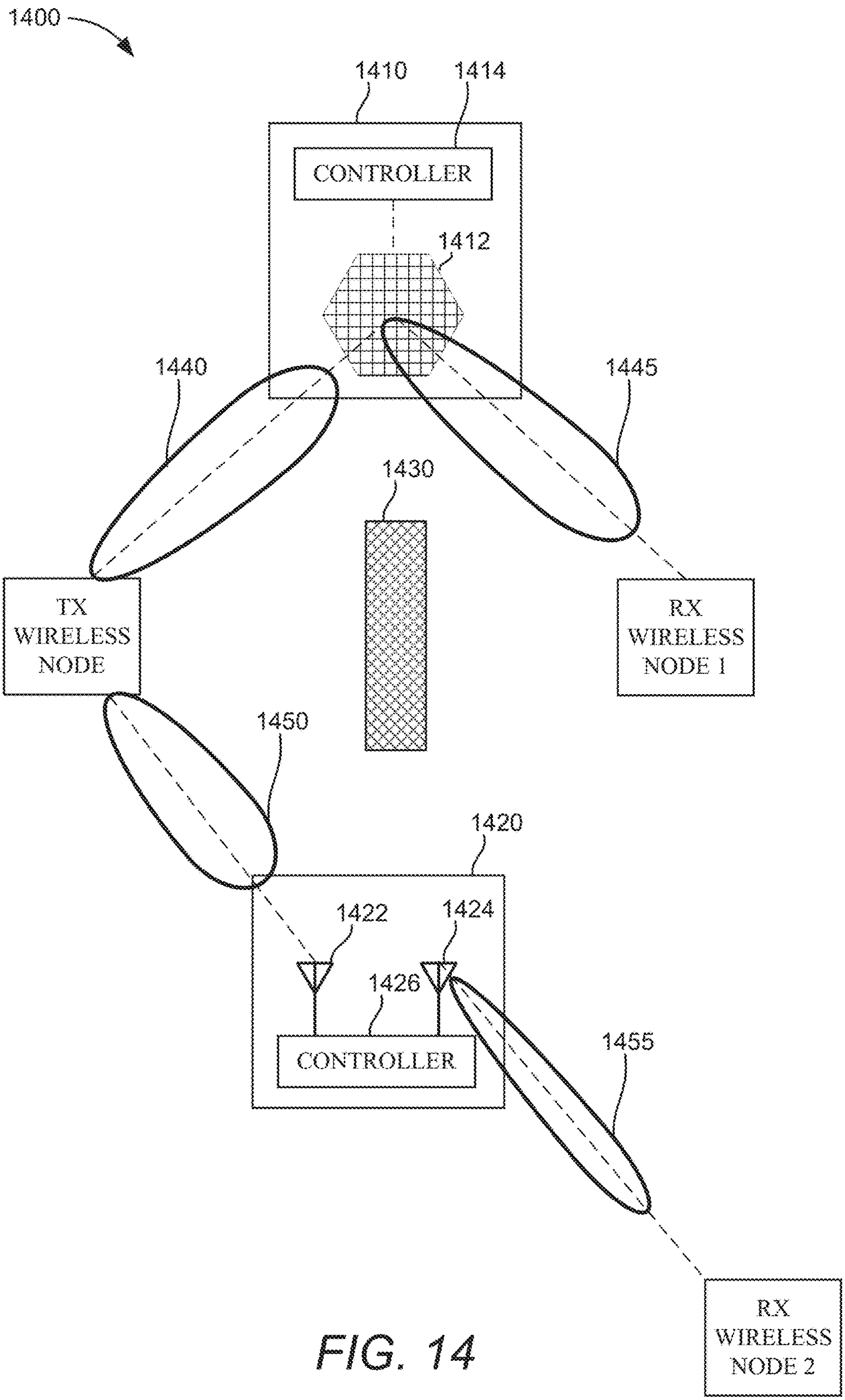
FIG. 14 illustrates an example system for wireless communication using reconfigurable intelligent devices (RIDs), according to aspects of the disclosure.

FIG. 14 illustrates an example system for wireless communication using reconfigurable intelligent devices (RIDs), according to aspects of the disclosure. In FIG. 14, RIDs 1410 and 1420 are depicted. RID 1410 corresponds to a reconfigurable intelligent surface (RIS), while RID 1420 corresponds to a repeater. While not illustrated in FIG. 14, a passive RID (i.e., without a controller) may also be deployed in some designs (e.g., a passive meta-surface that is opportunistically used by a transmitter in order to steer a reflection signal towards a receiver).

Referring to FIG. 14, RID 1410 (i.e., the RIS) includes a planar surface 1412 and a controller 1412. In some designs, the planar surface 1412 is a two-dimensional surface comprising a large number of low-cost, low-power, near-passive reflecting elements whose properties are reconfigurable (e.g., by software or control signals) rather than static. For example, by carefully tuning the phase shifts of the reflecting elements (e.g., using software or control signals), the scattering, absorption, reflection, and diffraction properties of an RIS can be changed over time. In that way, the electromagnetic (EM) properties of an RIS can be engineered to collect wireless signals from a transmitter (e.g., a base station, a UE, etc.) and passively beamform them towards a target receiver (e.g., another base station, another UE, etc.).

Referring to FIG. 14, RID 1420 (i.e., the repeater) includes receive (Rx) antenna 1422, transmit (Tx) antenna 1424 and a controller 1426. While not shown, in some designs, RID 1420 (i.e., the repeater) may include an amplifier to amplify a signal received by Tx antenna 1422 with some gain for transmission by Tx antenna 1424. In some designs, RID 1420 (i.e., the repeater) may help to extend the effective transmission range of a wireless node, such as a low-powered UE.

The goal of RID technology is to create smart radio environments, where the wireless propagation conditions are co-engineered with the physical layer signaling. This enhanced functionality of the system 1400 can provide technical benefits in a number of scenarios.

As a first example scenario, as shown in FIG. 14, a Tx wireless node is attempting to transmit a first signal to Rx wireless node 1, the transmission of which cannot be made directly (i.e., via a line-of-sight (LOS) beam) because Rx wireless node 1 is behind an obstacle 1430 (e.g., a building, a hill, or another type of obstacle). In this case, the Tx wireless node may transmit the first signal via a transmit beam 1440 to RID 1410 (i.e., the RIS), which reflects and/or beamforms the first signal towards Rx wireless node 1 via transmit beam 1445. As another example, the obstacle 1430 may create a "dead zone," that is, a geographic area in which the wireless signals from the Tx wireless node are too attenuated to be reliably detected by a UE within some area (e.g., where Rx wireless node 1 is located). In this scenario, RID 1410 (i.e., the RIS) may be to reflect wireless signals from the Tx wireless node into the dead zone in order to provide coverage to wireless node(s) that may be located there, including wireless node(s) about which the Tx wireless node is not aware.

As a second example scenario, as shown in FIG. 14, the Tx wireless node is further attempting to transmit a second signal to Rx wireless node 2, the transmission of which cannot be made directly because Rx wireless node 2 is too far away from the Tx wireless node. In this case, the Tx wireless node may transmit the second signal via a transmit beam 1450 to RID 1420 (i.e., the repeater), which repeats (e.g., amplifies and transmits) the first signal towards Rx wireless node 2 via transmit beam 1455.

Note that the Tx wireless node, Rx wireless node 1 and Rx wireless node 2 may correspond to any wireless node type (e.g., UE, gNB RU, RSU, anchor UE, server UE, etc.), and the respective signaling of the first and/or second signals may each correspond to uplink signal, downlink signal or sidelink signaling.

Referring to FIG. 14, in some designs, a RID operating as a RIS (e.g., a reconfigurable mirror) may be characterized as a RID operating in a first mode (referred to as "Mode 1"), and a RID operating as a repeater (e.g., operating as a receiver and transmitter, similar to the amplify and forward functionality of a relay node) may be characterized as operating in a second mode (referred to as "Mode 2"). Some RIDs may be designed to be able to operate in either Mode 1 or Mode 2, while other RIDs may be designed to operate only in either Mode 1 or Mode 2. Mode 1 RIDs (or RISs) are assumed to have a negligible hardware group delay, whereas Mode 2 RIDS (or repeaters) have a non-negligible hardware group delay due to being equipped with limited baseband processing capability. Because of their greater processing capability compared to Mode 1 RIDs, Mode 2 RIDs may, in some cases, be able to compute and report their transmission-to-reception (Tx-Rx) time difference measurements (i.e., the difference between the time a signal is reflected towards a UE and the time the signal is received back from the UE). In the example of FIG. 14, the RID 1410 is a Mode 1 RID and RID 1420 is a Mode 2 RID.

Referring to FIG. 14, in some designs, a RID may be "UE-controlled" or "network-controlled" (e.g., gNB-controlled). In case of a network-controlled RID, its respective controller is communicatively coupled to, and controlled by, a network component (e.g., a gNB, LMF, sensing server, etc.). In case of a UE-controlled RID, its respective controller is communicatively coupled to, and controlled by, a UE. In case of UE-controlled RIDs, the UE controlling the RID may change over time (e.g., especially if the UE is mobile).

Referring to FIG. 14, in some designs, a RID may be stationary or mobile. For example, a stationary RID may be attached to a fixture (e.g., a building, a pole, a billboard, etc.) while a mobile RID may be attached to a vehicle.

As noted above, any controllable device in the medium between a transmitter and a receiver that can improve link quality may be characterized as a RID. A passive RID is one which does not need any power or control, and may include a passive meta-surface installed on a window to get rid of O2I penetration loss. An active RID (or Mode 2 RID) may refer to repeaters, RIS, etc. Active RIDs may boost signal strength and/or steer the signals in a required direction based on some control. Active RIDs are controlled by a RID Controller (RID-C) which has communication capabilities. In some designs, the RID may be controlled by gNB, RSU, another UE, and so on. The RID-C may communicate with other communication nodes to determine the RID configuration.

Figure 15:
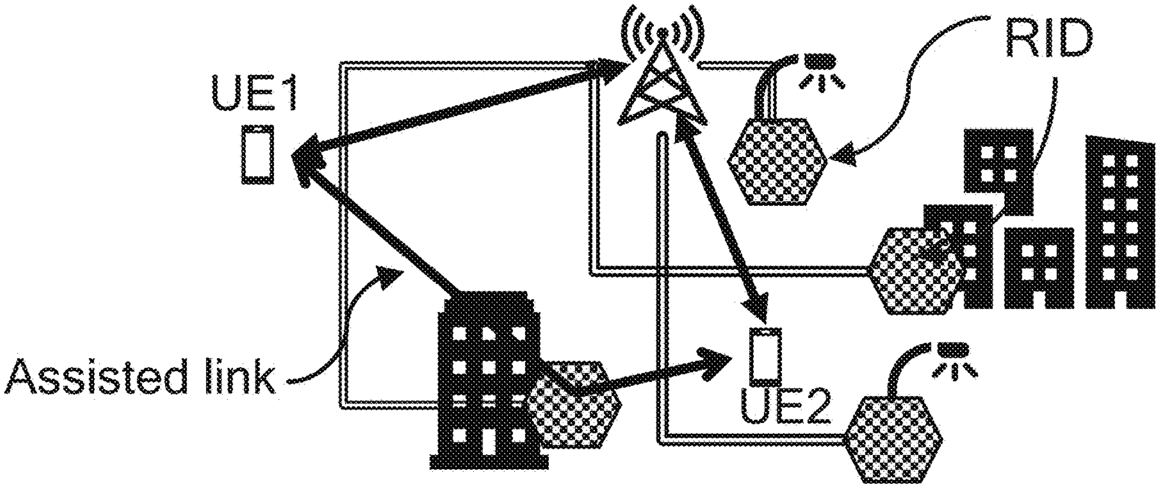
FIG. 15 illustrates a RID scheme, in accordance with aspects of the disclosure.

FIG. 15 illustrates a RID scheme 1500, in accordance with aspects of the disclosure. In FIG. 15, a network-controlled RID scheme is depicted, whereby fixed (or static) network-controlled RIDs are used by a central controller (in this case, gNB) to facilitate signaling between gNB and UEs 1 and 2.

Figure 16:
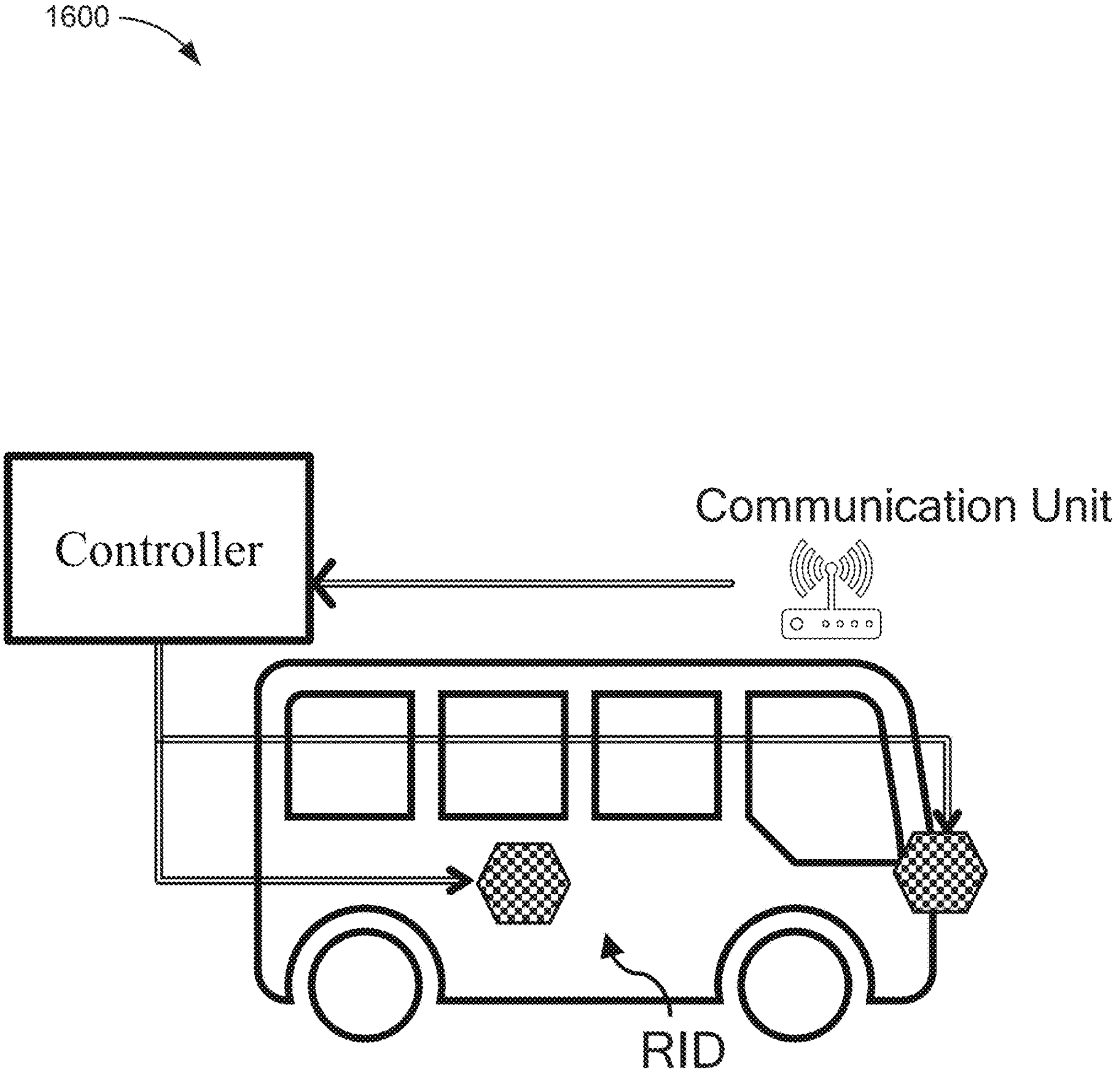
FIG. 16 illustrates a RID scheme, in accordance with aspects of the disclosure.

FIG. 16 illustrates a RID scheme 1600, in accordance with aspects of the disclosure. In FIG. 16, a mobile RID that is coupled to a vehicle is depicted. Here, the location of the mobile RID may change over time, and the varying location of the mobile RID may be factored into the signaling to/from the mobile RID.

In some designs, network-controlled RIDs are characterized as follows, e.g.:

There are multiple RIDs deployed by the operator

The RIDs are controlled by a network component, e.g., the gNB

The network component (e.g., gNB) can notify the UEs connected to (i.e., camped on) the network component about the presence of the RID The network component (e.g., gNB) can schedule access to the RID and control the property of the RID to benefit the transmission between the devices The network component (e.g., gNB) does this as the network component knows where the RIDs are and has a notion of the position and channel condition of the UEs connected to the RIDs Standards organization have studied NW controlled repeaters for 4G LTE→continues to study and specify signaling and procedures for 5G NR In some designs, UE-controlled RIDs (or UE-controllable RIDs, as such RIDs need not be controlled by UEs at all times) are characterized as follows, e.g.:

UE-controllable RIDs may not be controlled by a central/network entity.

For example, one or more UE-controllable RIDs may be mounted on large vehicles like buses, trucks, etc., with sidelink (SL) capability In another case, UE-controlled RIDs may be useful to SL users outside network coverage.

In such cases, UEs may discover the UE-controllable RIDs and use them (e.g., via SL links)

Figure 17:
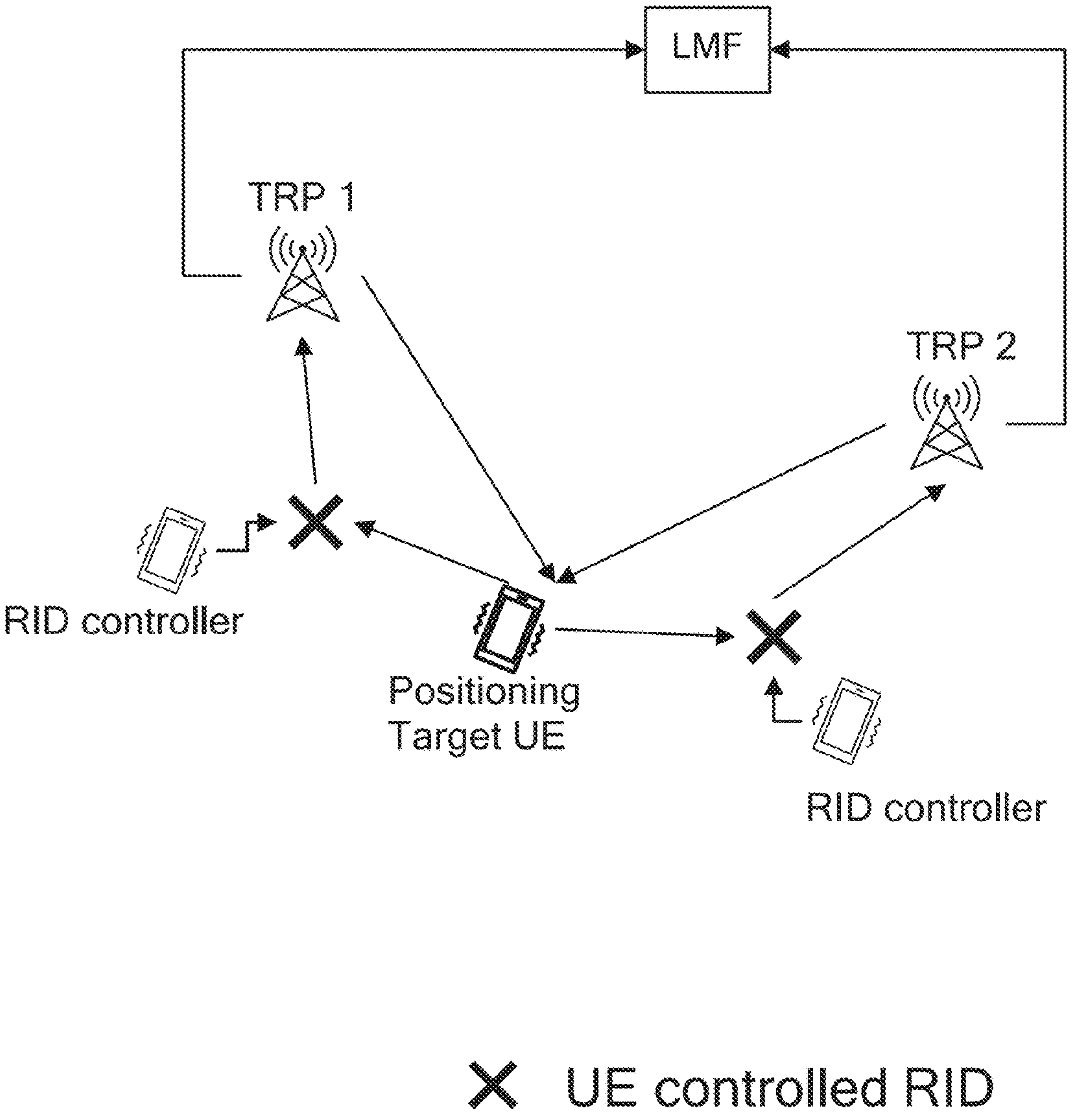
FIG. 17 illustrates a communications scheme, in accordance with aspects of the disclosure.

In some designs, UL and DL between a UE and a TRP may not necessarily be reciprocal when RIDs are present in the system, as depicted in FIG. 17.

FIG. 17 illustrates a communications scheme 1700, in accordance with aspects of the disclosure. In FIG. 17, a LMF, TRPs 1-2, a positioning target UE and two RID controllers for UE-control of respective RIDs are depicted. In FIG. 17, as an example, a DL signal may be received at the UE from a TRP without any assistance from RID but the UL signal may need to be boosted and/or redirected to close the UL link budget. Note that in some designs the transmit power on the DL can be higher than in the UL. In another case, the UL and the DL may be served with different RIDs. For example, if the optimal RID is only available on the DL slots and another RID is employed for the UL.

In some designs, non-reciprocity in UL and DL link directions may affect multi-RTT position estimation. For example, in some designs, multi-RTT positioning depends on both the DL PRS measurement as well as an UL SRS measurement on a given TRP. The position measurement may consider the first distinguishable sample of the transmitted RS. When RID is used for signal boosting, the first distinguishable sample of the RS may or may not be the one through a direct path.

Figure 18:
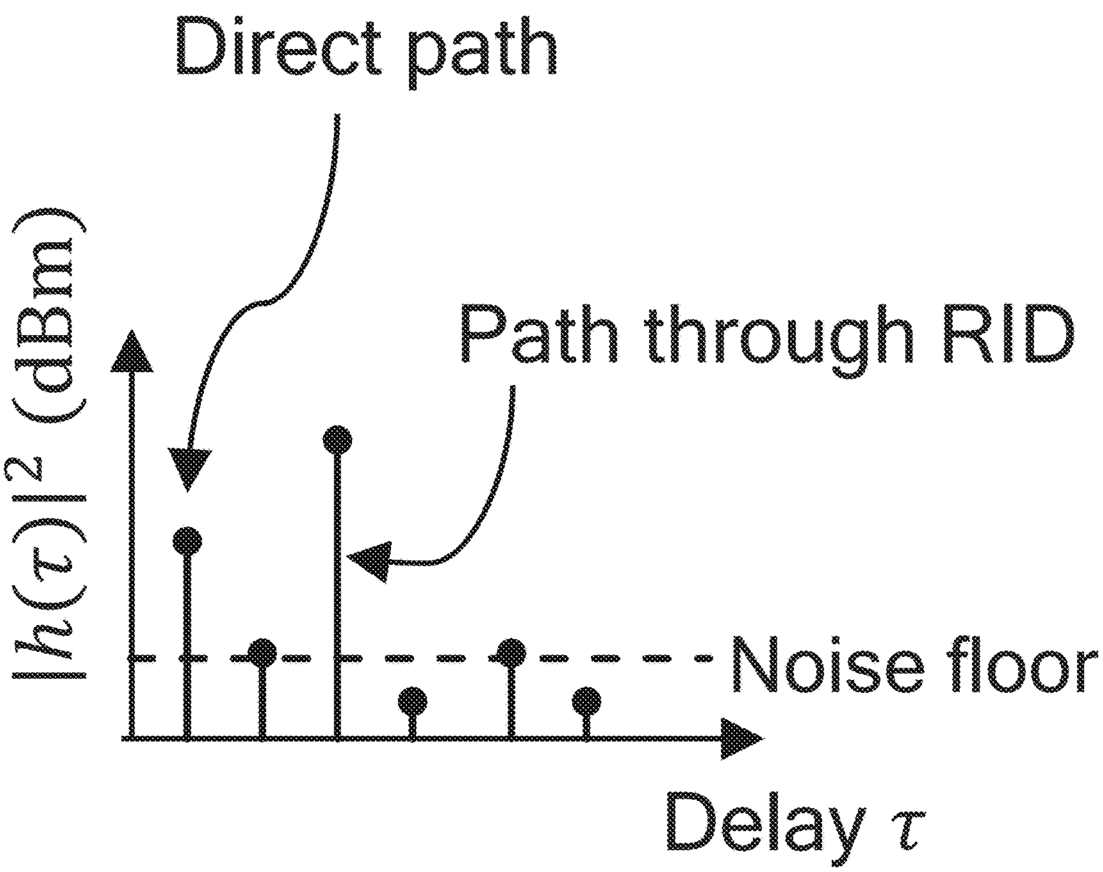
FIG. 18 illustrates samples associated with a multi-RTT scheme, in accordance with aspects of the disclosure.

FIG. 18 illustrates samples associated with a multi-RTT scheme 1800, in accordance with aspects of the disclosure. In FIG. 18, a direct (e.g., LOS or non-RID) path is above the noise floor and is thereby resolvable at the receiver. Hence, in this case, the direct path is identified by the receiver as the receive time of the PRS.

Figure 19:
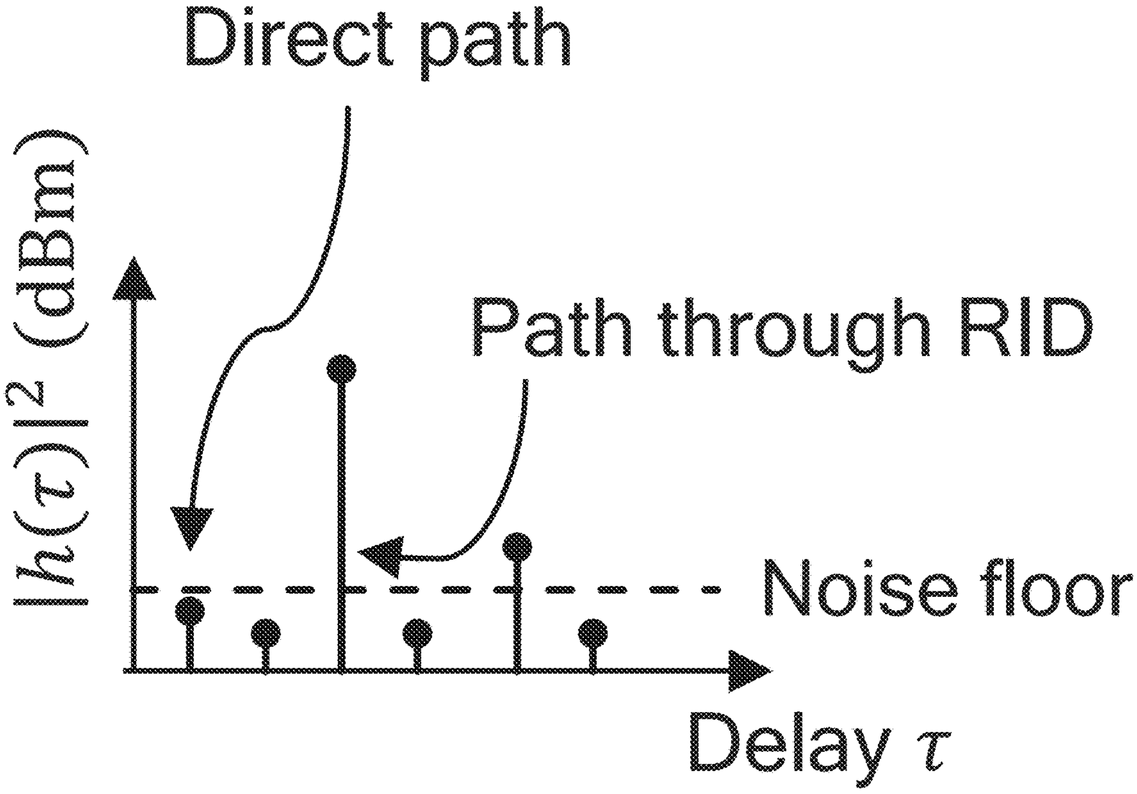
FIG. 19 illustrates samples associated with a multi-RTT scheme, in accordance with aspects of the disclosure.

FIG. 19 illustrates samples associated with a multi-RTT scheme 1900, in accordance with aspects of the disclosure. In FIG. 19, a direct (e.g., LOS or non-RID) path is below the noise floor and is thereby not resolvable at the receiver. Hence, in this case, the RID-boosted path (rather than the direct path) is identified by the receiver as the receive time of the PRS. In this case, positing based on the UL and/or DL timing difference may introduce significant errors as the first resolvable signal(s) pass through a RID located at a different location.

In some designs, with respect to non-reciprocity in beamformed access, for multi-RTT measurements, the gNB may indicate the spatial relationship between one or more DL RS and the UL RS to be transmitted for positioning. In such cases as well, the following may cause non-reciprocal UL-DL, e.g.:

- gNB/TRP beam is relatively broad for coverage but the RID uses narrower beams to boost both the DL and the UL, and/or.
- The UE and the RID are closely located and fall in the same gNB beam. UE can see the RID in the DL directly but uses the RID in the UL for link enhancement. In this case, the RID introduces additional group delays in the UL though the path delay may be relatively the same In some designs, the LMF may take into account of this factor (i.e., the RID delay) when performing multi-RTT based positioning. Otherwise, the position will have considerable error. Generally, error of 10 ns or more may be introduced due to the combined effect of the increased path length and the RID delay. This may lead to a positioning error in the range of 1-10 meters.

Aspects of the disclosure are directed to position estimation based on non-reciprocity source information. In some designs, non-reciprocity source information may be associated with one or more RIDs that reflect or relay PRS to/from a target UE. In some designs, knowledge of non-reciprocity source information may facilitate a position estimation entity to factor (e.g., offset) delay(s) attributable to one or more non-reciprocity sources that reflect/relay the PRS. Such aspects may provide various technical advantages, in particular, improved position estimation accuracy.

Figure 20:
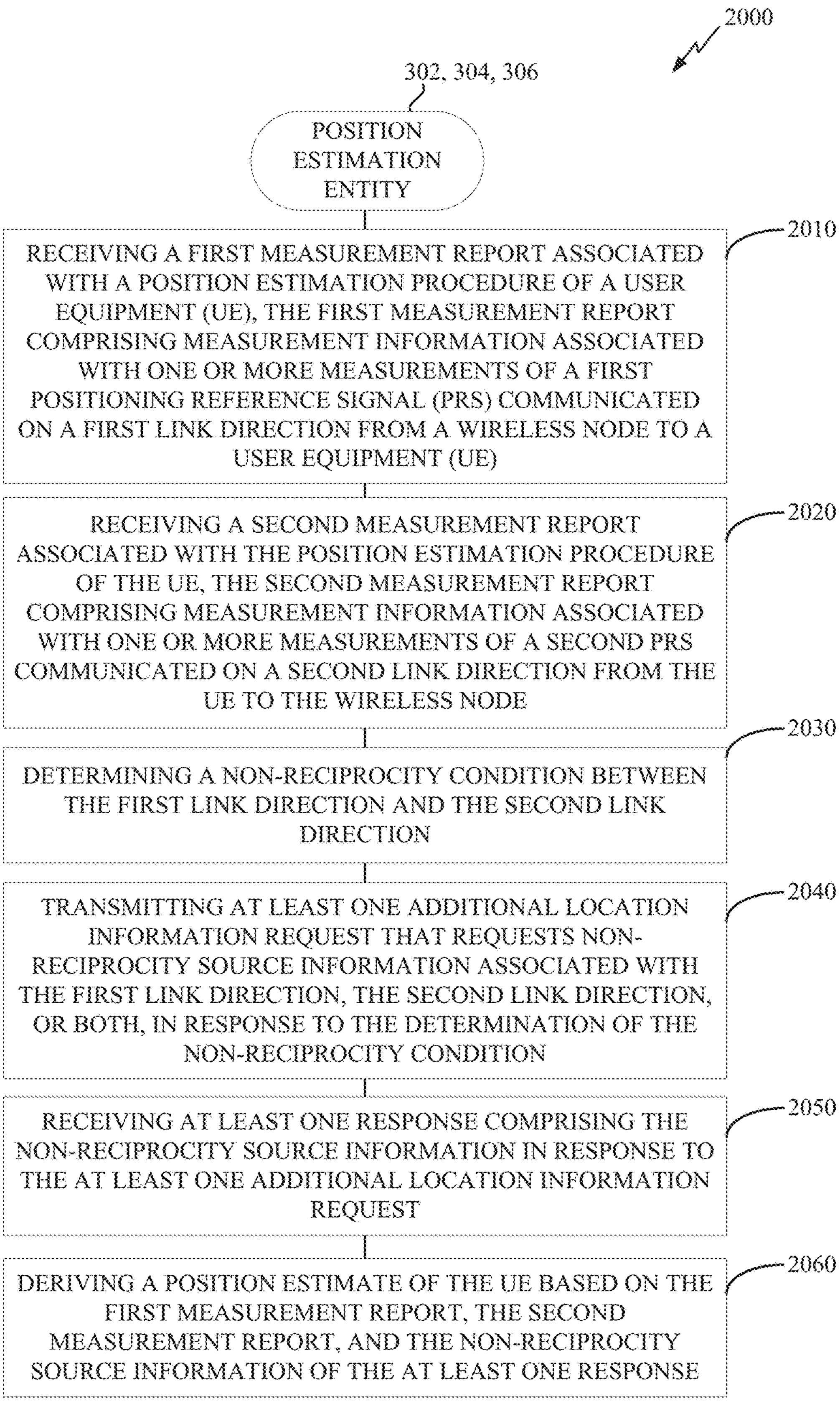
FIG. 20 illustrates an exemplary process of communications according to an aspect of the disclosure.

FIG. 20 illustrates an exemplary process 2000 of communications according to an aspect of the disclosure. The process 2000 of FIG. 20 is performed by a position estimation entity. In some designs, the position estimation entity may correspond to a network component (e.g., an LMF integrated at gNB/BS 304 or O-RAN component or a remote location server such as network entity 306, etc.). In other designs, the position estimation entity may correspond to another UE (e.g., sidelink anchor UE or sidelink server UE) or to the target UE itself. In scenarios where the position estimation entity is integrated with another device (e.g., UE, gNB, location server, etc.), reference to any Rx/Tx operations between the position estimation entity and that device in which the position estimation entity is integrated may correspond to transfer of information between different logical components of the device over a data bus, etc.

Referring to FIG. 20, at 2010, the position estimation entity (e.g., receiver 312 or 322 or 352 or 362, network transceiver(s) 380 or 390, data bus 308 or 382, etc.) receives a first measurement report associated with a position estimation procedure of a user equipment (UE), the first measurement report comprising measurement information associated with one or more measurements of a first positioning reference signal (PRS) communicated on a first link direction from a wireless node to a user equipment (UE). In some designs, a means for performing the reception of 2010 includes receiver 312 or 322 or 352 or 362, network transceiver(s) 380 or 390, data bus 308 or 382, etc., of FIGS. 3A-3C.

Referring to FIG. 20, at 2020, the position estimation entity (e.g., receiver 312 or 322 or 352 or 362, network transceiver(s) 380 or 390, data bus 308 or 382, etc.) receives a second measurement report associated with the position estimation procedure of the UE, the second measurement report comprising measurement information associated with one or more measurements of a second PRS communicated on a second link direction from the UE to the wireless node. In some designs, a means for performing the reception of 2020 includes receiver 312 or 322 or 352 or 362, network transceiver(s) 380 or 390, data bus 308 or 382, etc., of FIGS. 3A-3C.

Referring to FIG. 20, at 2030, the position estimation entity (e.g., processor(s) 342 or 384 or 394, non-reciprocal source component 348 or 388 or 398, etc.) determines a non-reciprocity condition between the first link direction and the second link direction. In some designs, a means for performing the determination of 2030 includes processor(s) 342 or 384 or 394, non-reciprocal source component 348 or 388 or 398, etc., of FIGS. 3A-3C.

Referring to FIG. 20, at 2040, the position estimation entity (e.g., transmitter 314 or 324 or 354 or 364, network transceiver(s) 380 or 390, data bus 308 or 382, etc.) transmits at least one additional location information request that requests non-reciprocity source information associated with the first link direction, the second link direction, or both, in response to the determination of the non-reciprocity condition. In some designs, a means for performing the transmission of 2040 includes transmitter 314 or 324 or 354 or 364, network transceiver(s) 380 or 390, data bus 308 or 382, etc., of FIGS. 3A-3C.

Referring to FIG. 20, at 2050, the position estimation entity (e.g., receiver 312 or 322 or 352 or 362, network transceiver(s) 380 or 390, data bus 308 or 382, etc.) receives at least one response comprising the non-reciprocity source information in response to the at least one additional location information request. In some designs, a means for performing the reception of 2050 includes receiver 312 or 322 or 352 or 362, network transceiver(s) 380 or 390, data bus 308 or 382, etc., of FIGS. 3A-3C.

Referring to FIG. 20, at 2060, the position estimation entity (e.g., processor(s) 342 or 384 or 394, non-reciprocal source component 348 or 388 or 398, etc.) derives a position estimate of the UE based on the first measurement report, the second measurement report, and the non-reciprocity source information of the at least one response. In some designs, a means for performing the derivation of 2060 includes processor(s) 342 or 384 or 394, non-reciprocal source component 348 or 388 or 398, etc., of FIGS. 3A-3C.

Referring to FIG. 20, in some designs, the position estimation procedure is a multi-round trip time (RTT) position estimation procedure.

Referring to FIG. 20, in some designs, the wireless node is a wireless network component, the first link direction is a downlink direction and the second link direction is an uplink direction, or the wireless node is another UE, the first link direction is a first sidelink direction, and the second link direction is a second sidelink direction.

Referring to FIG. 20, in some designs, the determination of the non-reciprocity condition at 2030 is based on:

one or more reconfigurable intelligent devices (RIDs) being camped on a serving cell of the UE, or an explicit indication in the first measurement report that indicates the use of at least one UE-controlled RID associated with the communication of the second PRS, or a measurement differential between the first measurement report and the second measurement report, or a timing differential between a round trip time (RTT) computed based on the first measurement report and the second measurement report and a previous computed timing measurement between the UE and the wireless node, or any combination thereof.

Referring to FIG. 20, in some designs, the at least one additional location information request comprises a first additional location information request that is transmitted to the UE. In an aspect, the first additional location information request is configured to request information on any reconfigurable intelligent device (RID) used for reception of the first PRS, transmission of the second PRS, or both. In an aspect, the at least one response comprises a first response from the UE in response to the first additional location information request, and the at least one response comprises an indication of whether any reconfigurable intelligent device (RID) is used for reception of the first PRS, transmission of the second PRS, or both. In an aspect, the indication indicates that no UE-controlled RID is used for reception of the first PRS, transmission of the second PRS, or both. In an aspect, the indication indicates that at least one RID is used for reception of the first PRS, transmission of the second PRS, or both. In a further aspect, e.g.:

the first response indicates whether the at least one RID is UE-controlled, or wherein the first response indicates at least one identifier associated with the at least one RID, or wherein the first response comprises first information associated with a first ranging or timing estimation procedure between the UE and the at least one RID, or wherein the first response comprises second information associated with a first ranging or timing estimation procedure between the UE and at least one wireless node associated with the position estimation procedure, or any combination thereof.

Referring to FIG. 20, in some designs, the first response comprises the second information, and the second information comprises:

distance information between the at least one RID and the UE, or

RID-specific timing error information, or first RID-specific path loss information for a link direction associated with at least one RID in an active state, or second RID-specific path loss information for a link direction associated with the at least one RID in an inactive state, or first RID-specific reference signal received power (RSRP) information associated with the at least one RID in the active state, or second RID-specific RSRP information associated with the at least one RID in the inactive state, or any combination thereof.

Referring to FIG. 20, in some designs, the position estimation entity further transmits, to the at least one wireless node associated with the position estimation procedure, a request for the at least one wireless node to allocate one or more resources to the UE to determine the first information, the second information, or both. In an aspect, the first information, the second information, or both are included in the first response based on the allocated one or more resources. In a further aspect, the allocated one or more resources are associated with one or more uplink reference signals, one or more downlink reference signals, one or more sidelink reference signals, or any combination thereof.

Referring to FIG. 20, in some designs, the at least one additional location information request comprises a second additional location information request that is transmitted to at least one wireless node associated with the position estimation procedure. In a further aspect, the at least one additional location information request is configured to request:

information on any known RID on the first link direction, the second link direction, or both, or information on one or more UE-controlled RIDs indicated in the first response, or a paging procedure between the UE and the one or more UE-controlled RIDs indicated in the first response, or any combination thereof.

Referring to FIG. 20, in some designs, the first additional location information request comprises a reason field indicating non-reciprocity.

Figure 21:
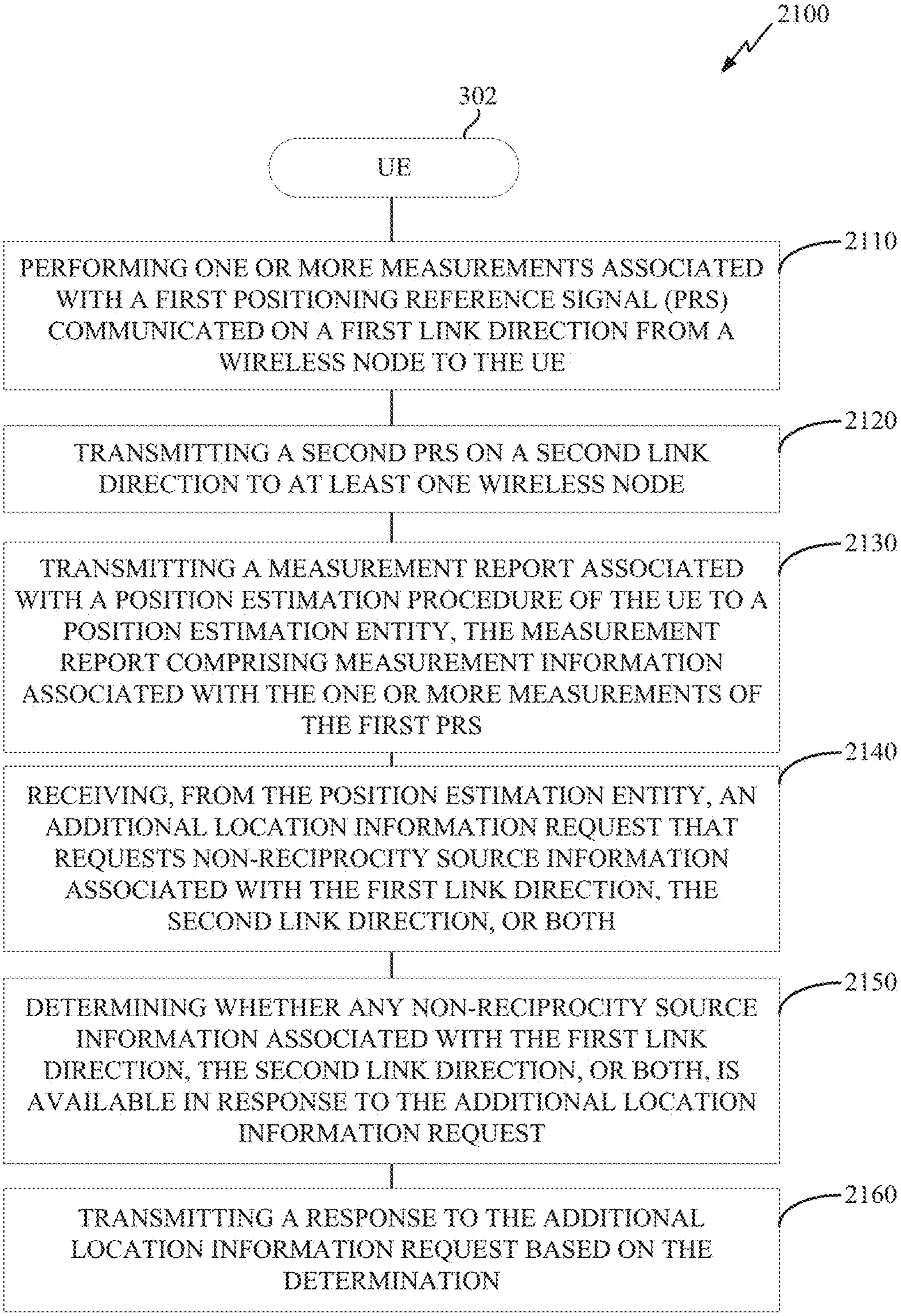
FIG. 21 illustrates an exemplary process of communications according to an aspect of the disclosure.

FIG. 21 illustrates an exemplary process 2100 of communications according to an aspect of the disclosure. The process 2100 of FIG. 21 is performed by a UE, such as UE 302. Note that in some designs, a position estimation entity is deployed separately from the UE (e.g., at a network component such as LMF integrated at gNB/BS 304 or O-RAN component or a remote location server such as network entity 306, etc.). In other designs, the position estimation entity may correspond to another UE (e.g., sidelink anchor UE or sidelink server UE) or to the UE itself. In scenarios where the position estimation entity is integrated with the UE itself, reference to any Rx/Tx operations between the position estimation entity and the UE in which the position estimation entity is integrated may correspond to transfer of information between different logical components of the device over a data bus, etc. Further, the process 2100 of FIG. 21 may be performed in tandem with the process 2000 of FIG. 20, in some designs.

Referring to FIG. 21, at 2110, the UE (e.g., receiver 312 or 322, transmitter 314 or 324, processor(s) 342, non-reciprocal source component 348, etc.) performs one or more measurements associated with a first positioning reference signal (PRS) communicated on a first link direction from a wireless node to the UE. In some designs, a means for performing the measurement(s) of 2110 includes receiver 312 or 322, transmitter 314 or 324, processor(s) 342, non-reciprocal source component 348, etc., of FIG. 3A.

Referring to FIG. 21, at 2120, the UE (e.g., transmitter 314 or 324, etc.) transmits a second PRS on a second link direction to at least one wireless node. In some designs, a means for performing the transmission of 2120 includes transmitter 314 or 324, etc., of FIG. 3A.

Referring to FIG. 21, at 2130, the UE (e.g., transmitter 314 or 324, data bus 308, etc.) transmits a measurement report associated with a position estimation procedure of the UE to a position estimation entity, the measurement report comprising measurement information associated with the one or more measurements of the first PRS.

In some designs, a means for performing the transmission of 2130 includes transmitter 314 or 324, data bus 308, etc., of FIG. 3A.

Referring to FIG. 21, at 2140, the UE (e.g., receiver 312 or 322, data bus 308, etc.) receives, from the position estimation entity, an additional location information request that requests non-reciprocity source information associated with the first link direction, the second link direction, or both. In some designs, a means for performing the reception of 2140 includes receiver 312 or 322, data bus 308, etc., of FIG. 3A.

Referring to FIG. 21, at 2150, the UE (e.g., processor(s) 342, non-reciprocal source component 348, etc.) determines whether any non-reciprocity source information associated with the first link direction, the second link direction, or both, is available in response to the additional location information request. In some designs, a means for performing the determination of 2150 includes processor(s) 342, non-reciprocal source component 348, etc., of FIG. 3A.

Referring to FIG. 21, at 2160, the UE (e.g., transmitter 314 or 324, data bus 308, etc.) transmits a response to the additional location information request based on the determination. In some designs, a means for performing the transmission of 2160 includes transmitter 314 or 324, data bus 308, etc., of FIG. 3A.

Referring to FIG. 21, in some designs, the position estimation procedure is a multi-round trip time (RTT) position estimation procedure.

Referring to FIG. 21, in some designs, the wireless node is a wireless network component, the first link direction is a downlink link direction and the second link direction is an uplink link direction, or the wireless node is another UE, the first link direction is a first sidelink link direction, and the second link direction is a second sidelink link direction.

Referring to FIG. 21, in some designs, the first additional location information request is configured to request information on any reconfigurable intelligent device (RID) used for reception of the first PRS, transmission of the second PRS, or both. In an aspect, the at least one response comprises an indication of whether any reconfigurable intelligent device (RID) is used for reception of the first PRS, transmission of the second PRS, or both.

Referring to FIG. 21, in some designs, the indication indicates that no UE-controlled RID is used for reception of the first PRS, transmission of the second PRS, or both.

Referring to FIG. 21, in some designs, the indication indicates that at least one RID is used for reception of the first PRS, transmission of the second PRS, or both. In a further aspect, e.g.:

- the first response indicates whether the at least one RID is UE-controlled, or
- wherein the first response indicates at least one identifier associated with the at least one RID, or
- wherein the first response comprises first information associated with a first ranging or timing estimation procedure between the UE and the at least one RID, or
- wherein the first response comprises second information associated with a first ranging or timing estimation procedure between the UE and at least one wireless node associated with the position estimation procedure, or
- any combination thereof.

Referring to FIG. 21, in some designs, the first response comprises the second information, and the second information comprises, e.g.:

- distance information between the at least one RID and the UE, or
- RID-specific timing error information, or
- RID-specific path loss information for a link direction, or
- RID-specific reference signal received power (RSRP) information, or
- any combination thereof.

Referring to FIG. 21, in some designs, the additional location information request comprises a reason field indicating non-reciprocity.

Figure 22:
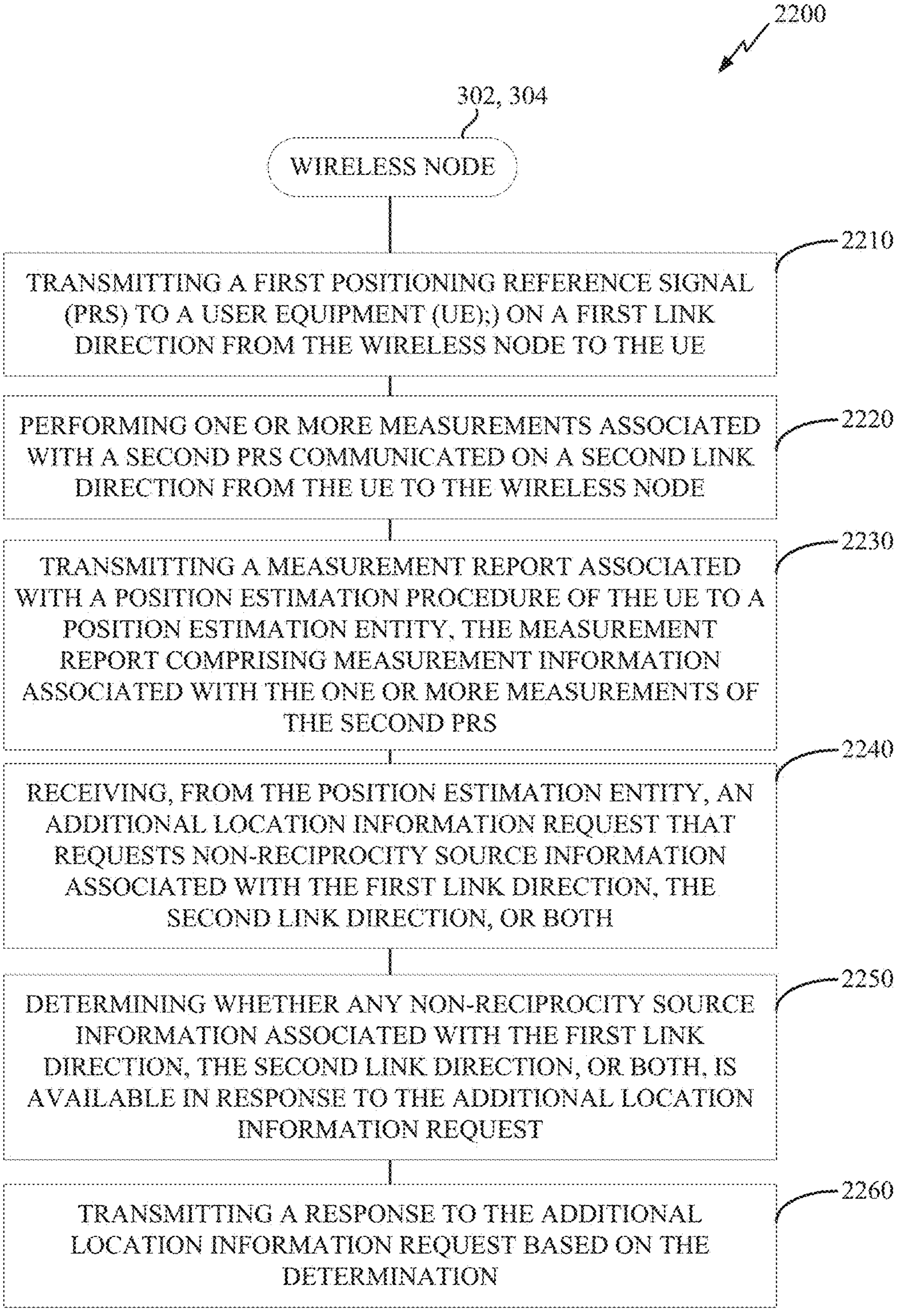
FIG. 22 illustrates an exemplary process of communications according to an aspect of the disclosure.

FIG. 22 illustrates an exemplary process 2200 of communications according to an aspect of the disclosure. The process 2200 of FIG. 22 is performed by a wireless node, such as a UE (e.g., UE 302) or a wireless network component such as gNB/BS 304 or O-RAN component such as RU. Note that in some designs, a position estimation entity is deployed separately from the wireless node (e.g., at another UE or at a network component such as LMF integrated at gNB/BS 304 or O-RAN component or a remote location server such as network entity 306, etc.). In scenarios where the position estimation entity is integrated with the wireless node itself, reference to any Rx/Tx operations between the position estimation entity and the wireless node in which the position estimation entity is integrated may correspond to transfer of information between different logical components of the wireless node over a data bus, etc. Further, the process 2200 of FIG. 22 may be performed in tandem with the process 2000 of FIG. 20 and the process 2100 of FIG. 21, in some designs.

Referring to FIG. 22, at 2210, the wireless node (e.g., transmitter 314 or 324 or 354 or 364, etc.) transmits a first positioning reference signal (PRS) to a user equipment (UE) on a first link direction from the wireless node to the UE. In some designs, a means for performing the transmission of 2210 includes transmitter 314 or 324 or 354 or 364, etc., of FIGS. 3A-3B.

Referring to FIG. 22, at 2220, the wireless node (e.g., receiver 312 or 322 or 352 or 362, transmitter 314 or 324 or 354 or 364, processor(s) 342 or 384, non-reciprocal source component 348 or 388, etc.) performs one or more measurements associated with a second PRS communicated on a second link direction from the UE to the wireless node;

In some designs, a means for performing the measurement(s) of 2220 includes receiver 312 or 322 or 352 or 362, transmitter 314 or 324 or 354 or 364, processor(s) 342 or 384, non-reciprocal source component 348 or 388, etc., of FIGS. 3A-3B.

Referring to FIG. 22, at 2230, the wireless node (e.g., transmitter 314 or 324 or 354 or 364, network transceiver(s) 380, data bus 308 or 382, etc.) transmits a measurement report associated with a position estimation procedure of the UE to a position estimation entity, the measurement report comprising measurement information associated with the one or more measurements of the second PRS. In some designs, a means for performing the transmission of 2230 includes transmitter 314 or 324 or 354 or 364, network transceiver(s) 380, data bus 308 or 382, etc., of FIGS. 3A-3B.

Referring to FIG. 22, at 2240, the wireless node (e.g., receiver 312 or 322 or 352 or 362, network transceiver(s) 380, data bus 308 or 382, etc.) receives, from the position estimation entity, an additional location information request that requests non-reciprocity source information associated with the first link direction, the second link direction. In some designs, a means for performing the reception of 2240 includes receiver 312 or 322 or 352 or 362, network transceiver(s) 380, data bus 308 or 382, etc., of FIGS. 3A-3B.

Referring to FIG. 22, at 2250, the wireless node (e.g., processor(s) 342 or 384, non-reciprocal source component 348 or 388, etc.) determines whether any non-reciprocity source information associated with the first link direction, the second link direction, or both, is available in response to the additional location information request. In some designs, a means for performing the determination of 2250 includes processor(s) 342 or 384, non-reciprocal source component 348 or 388, etc., of FIGS. 3A-3B.

Referring to FIG. 22, at 2260, the wireless node (e.g., transmitter 314 or 324 or 354 or 364, network transceiver(s) 380, data bus 308 or 382, etc.) transmits a response to the additional location information request based on the determination. In some designs, a means for performing the transmission of 2260 includes transmitter 314 or 324 or 354 or 364, network transceiver(s) 380, data bus 308 or 382, etc., of FIGS. 3A-3B.

Referring to FIG. 22, in some designs, the wireless node further, allocates one or more resources to the UE in response to the additional location information request to facilitate:

- a first ranging or timing estimation procedure between the UE and the at least one RID, or
- a first ranging or timing estimation procedure between the UE and the wireless node, or
- a combination thereof.

Referring to FIGS. 20-22, in a specific example, the path delays on the UL and the DL can be different when a UE controlled RID is used for link enhancement. In an aspect, the LMF may benefit from additional information to correct the multi-RTT based position estimate of the target UE. Otherwise, errors in positioning may occur in the range of a few meters or even 10+ meters. In an aspect, the NG-RAN may not have information of the RID(s) causing the non-reciprocity if the RID is UE controlled. In some designs as noted above, the LMF, based on a set of conditions, triggers UL-DL non-reciprocity correction procedures and requests additional information about the UE-controlled RID from the target UE.

Figure 23:
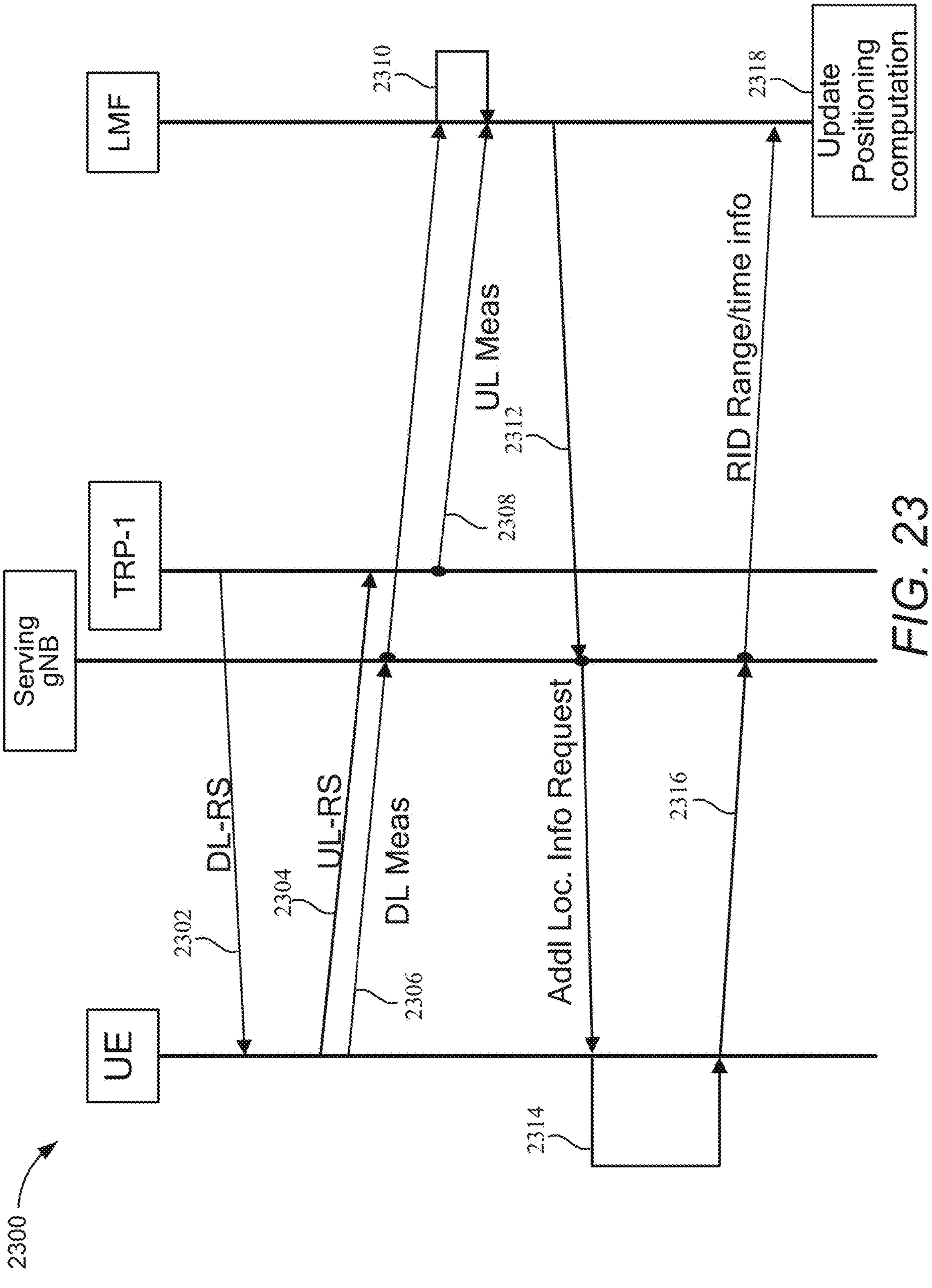
FIG. 23 illustrates an example implementation of the processes of FIGS. 20-22, respectively, in accordance with aspects of the disclosure.

FIG. 23 illustrates an example implementation 2300 of the processes 2000-2200 of FIGS. 20-22, respectively, in accordance with aspects of the disclosure. At 2302, a serving gNB transmits DL-RS (e.g., DL PRS) to UE. At 2304, UE transmits UL-RS (e.g., UL PRS) to TRP-1. At 2306, UE transmits a first measurement report including measurement (s) of the DL-RS from 2302 to the serving gNB, which is forwarded to the LMF. At 2308, TRP-1 transmits a second measurement report including measurement(s) of the UL-RS from 2304 to the LMF. At 2310, the LMF detects non-reciprocity between the first and second measurement reports, and triggers non-reciprocity source discovery procedure. At 2312, the LMF transmits an additional location information request to UE via serving gNB. At 2314, UE determines the requested additional location information (e.g., knowledge of any UE-controlled RID(s), etc.). At 2316, the UE transmits a response to the additional location information request from 2312. At 2318, the LMF updates a position estimation computation based on the response from 2316 (e.g., UE-controlled RID information such as range to RID, RID timing information, etc.).

Referring to FIGS. 20-22, in a specific example as noted above, LMF may trigger UL-DL non-reciprocity correction procedure for RTT-based measurement based on, e.g.:

- the network (NW) knowledge on one or more UE controlled RIDs camped in the cell of the target UE, or
- an explicit indication in the positioning information from the UE to the LMF indicating the use of one or more UE controlled RIDs, or
- the difference in UL and DL RSRP or pathloss estimates associated with the UL and DL reference signals as measured at the NG-RAN node (TRP-1) and the UE respectively. For example, $$|PL_{DL}^{1} - PL_{UL}^{1}| \geq \gamma_{thresh}$$

for some (pre)configured value $\gamma_{thresh}$, where the threshold may factor in the transmit powers at the TRP and the UE, or

- the difference in the RTT computed and a previous measurement of TRP-to-target UE timing using a different positioning process, e.g., $$\frac{T_{RTT}(t)}{2} - \frac{d_{ECID}(t - T_0)}{c} > T_{thresh},$$

where $d_{ECID}(t-T_0)$ is the distance measured using ECID based positioning at time $t-T_0$ and c is the speed of light.

In an aspect, LMF may use one or more of the above conditions to trigger non-reciprocity measurements for position estimation derivation.

Referring to FIGS. 20-22, in a specific example, LMF may send an additional location information request to the target UE through its serving gNB. In an aspect, the additional location information contains an IE indicating the reason for the request as "link non-reciprocity." In an aspect, where the request may contain a command for the UE to notify the LMF is one or more UE controlled RIDs are used for on the UL and/or the DL connection with TRP-1 (where TRP-1 may not be a TRP associated with the serving gNB). In an aspect, a further indication to share with the LMF ranging and/or timing information associated with the UE-controlled RID. In an aspect, the LMF instructs the serving gNB to provide resources to the UE for the ranging or timing estimation operations. In one case, these resources may be additional UL or DL reference signals. In another case, these may be sidelink grants for SL based ranging.

Referring to FIGS. 20-22, in a specific example, the UE on receiving the additional location info request from the LMF, e.g.:

- Sends an indication to the LMF that one or more RID-s are being used for the UL and/or DL connection with the indicated TRP (TRP-1)
- Sends an additional IE indicating if the RIDs used are UE-controlled
- Sends another IE indicating unique ID-s associated with the UE controlled RID-controller (e.g., IMSI, C-RNTI, etc.)

Referring to FIGS. 20-22, in a specific example, if the UE has not performed previous ranging and/or timing calibration with the RID, the UE performs ranging and/or timing calibration with the RID over the Uu or the sidelink channel based in part on the grants provided by the gNB (except if the UR to RID-controller link is using sidelink in out of coverage mode).

Referring to FIGS. 20-22, in a specific example, based on ranging and/or timing calibration results for each link (UL/DL) associated with this TRP, e.g.:

In one case, the UE indicates the distance between the RID(s) and itself to the LMF (based on ranging results)

In one case, the UE indicates additional timing errors due to RID operation as a separate timing error groups (TEG) associated with the reference signals (based on timing calibration results).

In one case, the UE may indicate the path loss reference or RSRP measurement available (based on past measurements) with and without the RID in the link.

Referring to FIGS. 20-22, in a specific example, the LMF on receiving the additional location information from the UE may, e.g.:

In one case, may determine that the non-reciprocity is not due to one or more UE-controlled RIDs In one case, LMF sends addition location information request to the serving gNB of the target UE requesting information on potential RIDs in the path between the UE and the indicated TRP.

In another case, the LMF may send the additional location information to the gNB associated with the TRP with which the measurements are conducted.

In one case, if the non-reciprocity is due to one or more UE controlled RID, the LMF may determine that it can benefit from additional information about the UE controlled RID. The LMF may request the serving gNB or the gNB associated with the TRP on which the non-reciprocal measurement is performed to provide additional information on the UE controlled RID indicated by the target UE (based on the unique ID associated with the RID). In another case, the LMF may request the gNB (serving or non-serving) to page the UE controlling the RID(s) and obtain positioning and/or channel measurements.

Referring to FIGS. 20-22, in a specific example, a serving gNB, if instructed by the LMF, provides additional resources to the target UE for ranging and/or timing calibration. If further requested by the LMF, a gNB may page a UE controlling a RID and obtain link measurements and/or positioning estimates.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a position estimation entity, comprising: receiving a first measurement report associated with a position estimation procedure of a user equipment (UE), the first measurement report comprising measurement information associated with one or more measurements of a first positioning reference signal (PRS) communicated on a first link direction from a wireless node to a user equipment (UE); receiving a second measurement report associated with the position estimation procedure of the UE, the second measurement report comprising measurement information associated with one or more measurements of a second PRS communicated on a second link direction from the UE to the wireless node; determining a non-reciprocity condition between the first link direction and the second link direction; transmitting at least one additional location information request that requests non-reciprocity source information associated with the first link direction, the second link direction, or both, in response to the determination of the non-reciprocity condition; receiving at least one response comprising the non-reciprocity source information in response to the at least one additional location information request; and deriving a position estimate of the UE based on the first measurement report, the second measurement report, and the non-reciprocity source information of the at least one response.

Clause 2. The method of clause 1, wherein the position estimation procedure is a multi-round trip time (RTT) position estimation procedure.

Clause 3. The method of any of clauses 1 to 2, wherein the wireless node is a wireless network component, the first link direction is a downlink direction and the second link direction is an uplink direction, or wherein the wireless node is another UE, the first link direction is a first sidelink direction, and the second link direction is a second sidelink direction.

Clause 4. The method of any of clauses 1 to 3, wherein the determination of the non-reciprocity condition is based on: one or more reconfigurable intelligent devices (RIDs) being camped on a serving cell of the UE, or an explicit indication in the first measurement report that indicates the use of at least one UE-controlled RID associated with the communication of the second PRS, or a measurement differential between the first measurement report and the second measurement report, or a timing differential between a round trip time (RTT) computed based on the first measurement report and the second measurement report and a previous computed timing measurement between the UE and the wireless node, or any combination thereof.

Clause 5. The method of any of clauses 1 to 4, wherein the at least one additional location information request comprises a first additional location information request that is transmitted to the UE.

Clause 6. The method of clause 5, wherein the first additional location information request is configured to request information on any reconfigurable intelligent device (RID) used for reception of the first PRS, transmission of the second PRS, or both.

Clause 7. The method of any of clauses 5 to 6, wherein the at least one response comprises a first response from the UE in response to the first additional location information request, and wherein the at least one response comprises an indication of whether any reconfigurable intelligent device (RID) is used for reception of the first PRS, transmission of the second PRS, or both.

Clause 8. The method of clause 7, wherein the indication indicates that no UE-controlled RID is used for reception of the first PRS, transmission of the second PRS, or both.

Clause 9. The method of any of clauses 7 to 8, wherein the indication indicates that at least one RID is used for reception of the first PRS, transmission of the second PRS, or both.

Clause 10. The method of clause 9, wherein the first response indicates whether the at least one RID is UE-controlled, or wherein the first response indicates at least one identifier associated with the at least one RID, or wherein the first response comprises first information associated with a first ranging or timing estimation procedure between the UE and the at least one RID, or wherein the first response comprises second information associated with a first ranging or timing estimation procedure between the UE and at least one wireless node associated with the position estimation procedure, or any combination thereof.

Clause 11. The method of clause 10, wherein the first response comprises the second information, and wherein the second information comprises: distance information between the at least one RID and the UE, or RID-specific timing error information, or first RID-specific path loss information for a link direction associated with at least one RID in an active state, or second RID-specific link path loss information for a link direction associated with the at least one RID in an inactive state, or first RID-specific reference signal received power (RSRP) information associated with the at least one RID in the active state, or second RID-specific RSRP information associated with the at least one RID in the inactive state, or any combination thereof.

Clause 12. The method of any of clauses 10 to 11, further comprising: transmitting, to the at least one wireless node associated with the position estimation procedure, a request for the at least one wireless node to allocate one or more resources to the UE to determine the first information, the second information, or both, wherein the first information, the second information, or both are included in the first response based on the allocated one or more resources.

Clause 13. The method of clause 12, wherein the allocated one or more resources are associated with one or more uplink reference signals, one or more downlink reference signals, one or more sidelink reference signals, or any combination thereof.

Clause 14. The method of any of clauses 7 to 13, wherein the at least one additional location information request comprises a second additional location information request that is transmitted to at least one wireless node associated with the position estimation procedure.

Clause 15. The method of clause 14, wherein the at least one additional location information request is configured to request: information on any known RID on the first link direction, the second link direction, or both, or information on one or more UE-controlled RIDs indicated in the first response, or a paging procedure between the UE and the one or more UE-controlled RIDs indicated in the first response, or any combination thereof.

Clause 16. The method of any of clauses 5 to 15, wherein the first additional location information request comprises a reason field indicating non-reciprocity.

Clause 17. A method of operating a user equipment (UE), comprising: performing one or more measurements associated with a first positioning reference signal (PRS) communicated on a first link direction from a wireless node to the UE; transmitting a second PRS on a second link direction to at least one wireless node; transmitting a measurement report associated with a position estimation procedure of the UE to a position estimation entity, the measurement report comprising measurement information associated with the one or more measurements of the first PRS; receiving, from the position estimation entity, an additional location information request that requests non-reciprocity source information associated with the first link direction, the second link direction, or both; determining whether any non-reciprocity source information associated with the first link direction, the second link direction, or both, is available in response to the additional location information request; and transmitting a response to the additional location information request based on the determination.

Clause 18. The method of clause 17, wherein the position estimation procedure is a multi-round trip time (RTT) position estimation procedure.

Clause 19. The method of any of clauses 17 to 18, wherein the wireless node is a wireless network component, the first link direction is a downlink link direction and the second link direction is an uplink link direction, or wherein the wireless node is another UE, the first link direction is a first sidelink link direction, and the second link direction is a second sidelink link direction.

Clause 20. The method of any of clauses 17 to 19, wherein the first additional location information request is configured to request information on any reconfigurable intelligent device (RID) used for reception of the first PRS, transmission of the second PRS, or both.

Clause 21. The method of any of clauses 19 to 20, wherein response comprises an indication of whether any reconfigurable intelligent device (RID) is used for reception of the first PRS, transmission of the second PRS, or both.

Clause 22. The method of clause 21, wherein the indication indicates that no UE-controlled RID is used for reception of the first PRS, transmission of the second PRS, or both.

Clause 23. The method of any of clauses 21 to 22, wherein the indication indicates that at least one RID is used for reception of the first PRS, transmission of the second PRS, or both.

Clause 24. The method of clause 23, wherein the response indicates whether the at least one RID is UE-controlled, or wherein the response indicates at least one identifier associated with the at least one RID, or wherein the response comprises first information associated with a first ranging or timing estimation procedure between the UE and the at least one RID, or wherein the response comprises second information associated with a first ranging or timing estimation procedure between the UE and at least one wireless node associated with the position estimation procedure, or any combination thereof.

Clause 25. The method of clause 24, wherein the response comprises the second information, and wherein the second information comprises: distance information between the at least one RID and the UE, or RID-specific timing error information, or RID-specific path loss information for a link direction, or RID-specific reference signal received power (RSRP) information, or any combination thereof.

Clause 26. The method of any of clauses 17 to 25, wherein the additional location information request comprises a reason field indicating non-reciprocity.

Clause 27. A method of operating a wireless node, comprising: transmitting a first positioning reference signal (PRS) to a user equipment (UE) on a first link direction from the wireless node to the UE; performing one or more measurements associated with a second PRS communicated on a second link direction from the UE to the wireless node; transmitting a measurement report associated with a position estimation procedure of the UE to a position estimation entity, the measurement report comprising measurement information associated with the one or more measurements of the second PRS; receiving, from the position estimation entity, an additional location information request that requests non-reciprocity source information associated with the first link direction, the second link direction, or both; determining whether any non-reciprocity source information associated with the first link direction, the second link direction, or both, is available in response to the additional location information request; and transmitting a response to the additional location information request based on the determination.

Clause 28. The method of clause 27, further comprising: allocating one or more resources to the UE in response to the additional location information request to facilitate: a first ranging or timing estimation procedure between the UE and the at least one RID, or a first ranging or timing estimation procedure between the UE and the wireless node, or a combination thereof.

Clause 29. A position estimation entity, comprising: one or more memories; one or more transceivers; and one or more processors communicatively coupled to the one or more memories and the one or more transceivers, the one or more processors, either alone or in combination, configured to: receive, via the one or more transceivers, a first measurement report associated with a position estimation procedure of a user equipment (UE), the first measurement report comprising measurement information associated with one or more measurements of a first positioning reference signal (PRS) communicated on a first link direction from a wireless node to a user equipment (UE); receive, via the one or more transceivers, a second measurement report associated with the position estimation procedure of the UE, the second measurement report comprising measurement information associated with one or more measurements of a second PRS communicated on a second link direction from the UE to the wireless node; determine a non-reciprocity condition between the first link direction and the second link direction; transmit, via the one or more transceivers, at least one additional location information request that requests non-reciprocity source information associated with the first link direction, the second link direction, or both, in response to the determination of the non-reciprocity condition; receive, via the one or more transceivers, at least one response comprising the non-reciprocity source information in response to the at least one additional location information request; and derive a position estimate of the UE based on the first measurement report, the second measurement report, and the non-reciprocity source information of the at least one response.

Clause 30. The position estimation entity of clause 29, wherein the position estimation procedure is a multi-round trip time (RTT) position estimation procedure.

Clause 31. The position estimation entity of any of clauses 29 to 30, wherein the wireless node is a wireless network component, the first link direction is a downlink direction and the second link direction is an uplink direction, or wherein the wireless node is another UE, the first link direction is a first sidelink direction, and the second link direction is a second sidelink direction.

Clause 32. The position estimation entity of any of clauses 29 to 31, wherein the determination of the non-reciprocity condition is based on: one or more reconfigurable intelligent devices (RIDs) being camped on a serving cell of the UE, or an explicit indication in the first measurement report that indicates the use of at least one UE-controlled RID associated with the communication of the second PRS, or a measurement differential between the first measurement report and the second measurement report, or a timing differential between a round trip time (RTT) computed based on the first measurement report and the second measurement report and a previous computed timing measurement between the UE and the wireless node, or any combination thereof.

Clause 33. The position estimation entity of any of clauses 29 to 32, wherein the at least one additional location information request comprises a first additional location information request that is transmitted to the UE.

Clause 34. The position estimation entity of clause 33, wherein the first additional location information request is configured to request information on any reconfigurable intelligent device (RID) used for reception of the first PRS, transmission of the second PRS, or both.

Clause 35. The position estimation entity of any of clauses 33 to 34, wherein the at least one response comprises a first response from the UE in response to the first additional location information request, and wherein the at least one response comprises an indication of whether any reconfigurable intelligent device (RID) is used for reception of the first PRS, transmission of the second PRS, or both.

Clause 36. The position estimation entity of clause 35, wherein the indication indicates that no UE-controlled RID is used for reception of the first PRS, transmission of the second PRS, or both.

Clause 37. The position estimation entity of any of clauses 35 to 36, wherein the indication indicates that at least one RID is used for reception of the first PRS, transmission of the second PRS, or both.

Clause 38. The position estimation entity of clause 37, wherein the first response indicates whether the at least one RID is UE-controlled, or wherein the first response indicates at least one identifier associated with the at least one RID, or wherein the first response comprises first information associated with a first ranging or timing estimation procedure between the UE and the at least one RID, or wherein the first response comprises second information associated with a first ranging or timing estimation procedure between the UE and at least one wireless node associated with the position estimation procedure, or any combination thereof.

Clause 39. The position estimation entity of clause 38, wherein the first response comprises the second information, and wherein the second information comprises: distance information between the at least one RID and the UE, or RID-specific timing error information, or first RID-specific path loss information for a link direction associated with at least one RID in an active state, or second RID-specific link path loss information for a link direction associated with the at least one RID in an inactive state, or first RID-specific reference signal received power (RSRP) information associated with the at least one RID in the active state, or second RID-specific RSRP information associated with the at least one RID in the inactive state, or any combination thereof.

Clause 40. The position estimation entity of any of clauses 38 to 39, wherein the one or more processors, either alone or in combination, are further configured to: transmit, via the one or more transceivers, to the at least one wireless node associated with the position estimation procedure, a request for the at least one wireless node to allocate one or more resources to the UE to determine the first information, the second information, or both, wherein the first information, the second information, or both are included in the first response based on the allocated one or more resources.

Clause 41. The position estimation entity of clause 40, wherein the allocated one or more resources are associated with one or more uplink reference signals, one or more downlink reference signals, one or more sidelink reference signals, or any combination thereof.

Clause 42. The position estimation entity of any of clauses 35 to 41, wherein the at least one additional location information request comprises a second additional location information request that is transmitted to at least one wireless node associated with the position estimation procedure.

Clause 43. The position estimation entity of clause 42, wherein the at least one additional location information request is configured to request: information on any known RID on the first link direction, the second link direction, or both, or information on one or more UE-controlled RIDs indicated in the first response, or a paging procedure between the UE and the one or more UE-controlled RIDs indicated in the first response, or any combination thereof.

Clause 44. The position estimation entity of any of clauses 33 to 43, wherein the first additional location information request comprises a reason field indicating non-reciprocity.

Clause 45. A user equipment (UE), comprising: one or more memories; one or more transceivers; and one or more processors communicatively coupled to the one or more memories and the one or more transceivers, the one or more processors, either alone or in combination, configured to: perform one or more measurements associated with a first positioning reference signal (PRS) communicated on a first link direction from a wireless node to the UE; transmit, via the one or more transceivers, a second PRS on a second link direction to at least one wireless node; transmit, via the one or more transceivers, a measurement report associated with a position estimation procedure of the UE to a position estimation entity, the measurement report comprising measurement information associated with the one or more measurements of the first PRS; receive, via the one or more transceivers, from the position estimation entity, an additional location information request that requests non-reciprocity source information associated with the first link direction, the second link direction, or both; determine whether any non-reciprocity source information associated with the first link direction, the second link direction, or both, is available in response to the additional location information request; and transmit, via the one or more transceivers, a response to the additional location information request based on the determination.

Clause 46. The UE of clause 45, wherein the position estimation procedure is a multi-round trip time (RTT) position estimation procedure.

Clause 47. The UE of any of clauses 45 to 46, wherein the wireless node is a wireless network component, the first link direction is a downlink link direction and the second link direction is an uplink link direction, or wherein the wireless node is another UE, the first link direction is a first sidelink link direction, and the second link direction is a second sidelink link direction.

Clause 48. The UE of any of clauses 45 to 47, wherein the first additional location information request is configured to request information on any reconfigurable intelligent device (RID) used for reception of the first PRS, transmission of the second PRS, or both.

Clause 49. The UE of any of clauses 47 to 48, wherein, the one or more processors, either alone or in combination, are configured to transmit an indication of whether any reconfigurable intelligent device (RID) is used for reception of the first PRS, transmission of the second PRS, or both.

Clause 50. The UE of clause 49, wherein the indication indicates that no UE-controlled RID is used for reception of the first PRS, transmission of the second PRS, or both.

Clause 51. The UE of any of clauses 49 to 50, wherein the indication indicates that at least one RID is used for reception of the first PRS, transmission of the second PRS, or both.

Clause 52. The UE of clause 51, wherein the response indicates whether the at least one RID is UE-controlled, or wherein the response indicates at least one identifier associated with the at least one RID, or wherein the response comprises first information associated with a first ranging or timing estimation procedure between the UE and the at least one RID, or wherein the response comprises second information associated with a first ranging or timing estimation procedure between the UE and at least one wireless node associated with the position estimation procedure, or any combination thereof.

Clause 53. The UE of clause 52, wherein the response comprises the second information, and wherein the second information comprises: distance information between the at least one RID and the UE, or RID-specific timing error information, or RID-specific path loss information for a link direction, or RID-specific reference signal received power (RSRP) information, or any combination thereof.

Clause 54. The UE of any of clauses 45 to 53, wherein the additional location information request comprises a reason field indicating non-reciprocity.

Clause 55. A wireless node, comprising: one or more memories; one or more transceivers; and one or more processors communicatively coupled to the one or more memories and the one or more transceivers, the one or more processors, either alone or in combination, configured to: transmit, via the one or more transceivers, a first positioning reference signal (PRS) to a user equipment (UE) on a first link direction from the wireless node to the UE; perform one or more measurements associated with a second PRS communicated on a second link direction from the UE to the wireless node; transmit, via the one or more transceivers, a measurement report associated with a position estimation procedure of the UE to a position estimation entity, the measurement report comprising measurement information associated with the one or more measurements of the second PRS; receive, via the one or more transceivers, from the position estimation entity, an additional location information request that requests non-reciprocity source information associated with the first link direction, the second link direction, or both; determine whether any non-reciprocity source information associated with the first link direction, the second link direction, or both, is available in response to the additional location information request; and transmit, via the one or more transceivers, a response to the additional location information request based on the determination.

Clause 56. The wireless node of clause 55, wherein the one or more processors, either alone or in combination, are further configured to: allocate one or more resources to the UE in response to the additional location information request to facilitate: a first ranging or timing estimation procedure between the UE and the at least one RID, or a first ranging or timing estimation procedure between the UE and the wireless node, or a combination thereof.

Clause 57. A position estimation entity, comprising: means for receiving a first measurement report associated with a position estimation procedure of a user equipment (UE), the first measurement report comprising measurement information associated with one or more measurements of a first positioning reference signal (PRS) communicated on a first link direction from a wireless node to a user equipment (UE); means for receiving a second measurement report associated with the position estimation procedure of the UE, the second measurement report comprising measurement information associated with one or more measurements of a second PRS communicated on a second link direction from the UE to the wireless node; means for determining a non-reciprocity condition between the first link direction and the second link direction; means for transmitting at least one additional location information request that requests non-reciprocity source information associated with the first link direction, the second link direction, or both, in response to the determination of the non-reciprocity condition; means for receiving at least one response comprising the non-reciprocity source information in response to the at least one additional location information request; and means for deriving a position estimate of the UE based on the first measurement report, the second measurement report, and the non-reciprocity source information of the at least one response.

Clause 58. The position estimation entity of clause 57, wherein the position estimation procedure is a multi-round trip time (RTT) position estimation procedure.

Clause 59. The position estimation entity of any of clauses 57 to 58, wherein the wireless node is a wireless network component, the first link direction is a downlink direction and the second link direction is an uplink direction, or wherein the wireless node is another UE, the first link direction is a first sidelink direction, and the second link direction is a second sidelink direction.

Clause 60. The position estimation entity of any of clauses 57 to 59, wherein the determination of the non-reciprocity condition is based on: one or more reconfigurable intelligent devices (RIDs) being camped on a serving cell of the UE, or an explicit indication in the first measurement report that indicates the use of at least one UE-controlled RID associated with the communication of the second PRS, or a measurement differential between the first measurement report and the second measurement report, or a timing differential between a round trip time (RTT) computed based on the first measurement report and the second measurement report and a previous computed timing measurement between the UE and the wireless node, or any combination thereof.

Clause 61. The position estimation entity of any of clauses 57 to 60, wherein the at least one additional location information request comprises a first additional location information request that is transmitted to the UE.

Clause 62. The position estimation entity of clause 61, wherein the first additional location information request is configured to request information on any reconfigurable intelligent device (RID) used for reception of the first PRS, transmission of the second PRS, or both.

Clause 63. The position estimation entity of any of clauses 61 to 62, wherein the at least one response comprises a first response from the UE in response to the first additional location information request, and wherein the at least one response comprises an indication of whether any reconfigurable intelligent device (RID) is used for reception of the first PRS, transmission of the second PRS, or both.

Clause 64. The position estimation entity of clause 63, wherein the indication indicates that no UE-controlled RID is used for reception of the first PRS, transmission of the second PRS, or both.

Clause 65. The position estimation entity of any of clauses 63 to 64, wherein the indication indicates that at least one RID is used for reception of the first PRS, transmission of the second PRS, or both.

Clause 66. The position estimation entity of clause 65, wherein the first response indicates whether the at least one RID is UE-controlled, or wherein the first response indicates at least one identifier associated with the at least one RID, or wherein the first response comprises first information associated with a first ranging or timing estimation procedure between the UE and the at least one RID, or wherein the first response comprises second information associated with a first ranging or timing estimation procedure between the UE and at least one wireless node associated with the position estimation procedure, or any combination thereof.

Clause 67. The position estimation entity of clause 66, wherein the first response comprises the second information, and wherein the second information comprises: distance information between the at least one RID and the UE, or RID-specific timing error information, or first RID-specific path loss information for a link direction associated with at least one RID in an active state, or second RID-specific link path loss information for a link direction associated with the at least one RID in an inactive state, or first RID-specific reference signal received power (RSRP) information associated with the at least one RID in the active state, or second RID-specific RSRP information associated with the at least one RID in the inactive state, or any combination thereof.

Clause 68. The position estimation entity of any of clauses 66 to 67, further comprising: means for transmitting, to the at least one wireless node associated with the position estimation procedure, a request for the at least one wireless node to allocate one or more resources to the UE to determine the first information, the second information, or both, wherein the first information, the second information, or both are included in the first response based on the allocated one or more resources.

Clause 69. The position estimation entity of clause 68, wherein the allocated one or more resources are associated with one or more uplink reference signals, one or more downlink reference signals, one or more sidelink reference signals, or any combination thereof.

Clause 70. The position estimation entity of any of clauses 63 to 69, wherein the at least one additional location information request comprises a second additional location information request that is transmitted to at least one wireless node associated with the position estimation procedure.

Clause 71. The position estimation entity of clause 70, wherein the at least one additional location information request is configured to request: information on any known RID on the first link direction, the second link direction, or both, or information on one or more UE-controlled RIDs indicated in the first response, or a paging procedure between the UE and the one or more UE-controlled RIDs indicated in the first response, or any combination thereof.

Clause 72. The position estimation entity of any of clauses 61 to 71, wherein the first additional location information request comprises a reason field indicating non-reciprocity.

Clause 73. A user equipment (UE), comprising: means for performing one or more measurements associated with a first positioning reference signal (PRS) communicated on a first link direction from a wireless node to the UE; means for transmitting a second PRS on a second link direction to at least one wireless node; means for transmitting a measurement report associated with a position estimation procedure of the UE to a position estimation entity, the measurement report comprising measurement information associated with the one or more measurements of the first PRS; means for receiving, from the position estimation entity, an additional location information request that requests non-reciprocity source information associated with the first link direction, the second link direction, or both; means for determining whether any non-reciprocity source information associated with the first link direction, the second link direction, or both, is available in response to the additional location information request; and means for transmitting a response to the additional location information request based on the determination.

Clause 74. The UE of clause 73, wherein the position estimation procedure is a multi-round trip time (RTT) position estimation procedure.

Clause 75. The UE of any of clauses 73 to 74, wherein the wireless node is a wireless network component, the first link direction is a downlink link direction and the second link direction is an uplink link direction, or wherein the wireless node is another UE, the first link direction is a first sidelink link direction, and the second link direction is a second sidelink link direction.

Clause 76. The UE of any of clauses 73 to 75, wherein the first additional location information request is configured to request information on any reconfigurable intelligent device (RID) used for reception of the first PRS, transmission of the second PRS, or both.

Clause 77. The UE of any of clauses 75 to 76, wherein the means for response comprises means for an indication of whether any reconfigurable intelligent device (RID) is used for reception of the first PRS, transmission of the second PRS, or both.

Clause 78. The UE of clause 77, wherein the indication indicates that no UE-controlled RID is used for reception of the first PRS, transmission of the second PRS, or both.

Clause 79. The UE of any of clauses 77 to 78, wherein the indication indicates that at least one RID is used for reception of the first PRS, transmission of the second PRS, or both.

Clause 80. The UE of clause 79, wherein the response indicates whether the at least one RID is UE-controlled, or wherein the response indicates at least one identifier associated with the at least one RID, or wherein the response comprises first information associated with a first ranging or timing estimation procedure between the UE and the at least one RID, or wherein the response comprises second information associated with a first ranging or timing estimation procedure between the UE and at least one wireless node associated with the position estimation procedure, or any combination thereof.

Clause 81. The UE of clause 80, wherein the response comprises the second information, and wherein the second information comprises: distance information between the at least one RID and the UE, or RID-specific timing error information, or RID-specific path loss information for a link direction, or RID-specific reference signal received power (RSRP) information, or any combination thereof.

Clause 82. The UE of any of clauses 73 to 81, wherein the additional location information request comprises a reason field indicating non-reciprocity.

Clause 83. A wireless node, comprising: means for transmitting a first positioning reference signal (PRS) to a user equipment (UE) on a first link direction from the wireless node to the UE; means for performing one or more measurements associated with a second PRS communicated on a second link direction from the UE to the wireless node; means for transmitting a measurement report associated with a position estimation procedure of the UE to a position estimation entity, the measurement report comprising measurement information associated with the one or more measurements of the second PRS; means for receiving, from the position estimation entity, an additional location information request that requests non-reciprocity source information associated with the first link direction, the second link direction, or both; means for determining whether any non-reciprocity source information associated with the first link direction, the second link direction, or both, is available in response to the additional location information request; and means for transmitting a response to the additional location information request based on the determination.

Clause 84. The wireless node of clause 83, further comprising: means for allocating one or more resources to the UE in response to the additional location information request to facilitate: a first ranging or timing estimation procedure between the UE and the at least one RID, or a first ranging or timing estimation procedure between the UE and the wireless node, or a combination thereof.

Clause 85. A non-transitory computer-readable medium storing computer-executable instructions that, when executed by a position estimation entity, cause the position estimation entity to: receive a first measurement report associated with a position estimation procedure of a user equipment (UE), the first measurement report comprising measurement information associated with one or more measurements of a first positioning reference signal (PRS) communicated on a first link direction from a wireless node to a user equipment (UE); receive a second measurement report associated with the position estimation procedure of the UE, the second measurement report comprising measurement information associated with one or more measurements of a second PRS communicated on a second link direction from the UE to the wireless node; determine a non-reciprocity condition between the first link direction and the second link direction; transmit at least one additional location information request that requests non-reciprocity source information associated with the first link direction, the second link direction, or both, in response to the determination of the non-reciprocity condition; receive at least one response comprising the non-reciprocity source information in response to the at least one additional location information request; and derive a position estimate of the UE based on the first measurement report, the second measurement report, and the non-reciprocity source information of the at least one response.

Clause 86. The non-transitory computer-readable medium of clause 85, wherein the position estimation procedure is a multi-round trip time (RTT) position estimation procedure.

Clause 87. The non-transitory computer-readable medium of any of clauses 85 to 86, wherein the wireless node is a wireless network component, the first link direction is a downlink direction and the second link direction is an uplink direction, or wherein the wireless node is another UE, the first link direction is a first sidelink direction, and the second link direction is a second sidelink direction.

Clause 88. The non-transitory computer-readable medium of any of clauses 85 to 87, wherein the determination of the non-reciprocity condition is based on: one or more reconfigurable intelligent devices (RIDs) being camped on a serving cell of the UE, or an explicit indication in the first measurement report that indicates the use of at least one UE-controlled RID associated with the communication of the second PRS, or a measurement differential between the first measurement report and the second measurement report, or a timing differential between a round trip time (RTT) computed based on the first measurement report and the second measurement report and a previous computed timing measurement between the UE and the wireless node, or any combination thereof.

Clause 89. The non-transitory computer-readable medium of any of clauses 85 to 88, wherein the at least one additional location information request comprises a first additional location information request that is transmitted to the UE.

Clause 90. The non-transitory computer-readable medium of clause 89, wherein the first additional location information request is configured to request information on any reconfigurable intelligent device (RID) used for reception of the first PRS, transmission of the second PRS, or both.

Clause 91. The non-transitory computer-readable medium of any of clauses 89 to 90, wherein the at least one response comprises a first response from the UE in response to the first additional location information request, and wherein the at least one response comprises an indication of whether any reconfigurable intelligent device (RID) is used for reception of the first PRS, transmission of the second PRS, or both.

Clause 92. The non-transitory computer-readable medium of clause 91, wherein the indication indicates that no UE-controlled RID is used for reception of the first PRS, transmission of the second PRS, or both.

Clause 93. The non-transitory computer-readable medium of any of clauses 91 to 92, wherein the indication indicates that at least one RID is used for reception of the first PRS, transmission of the second PRS, or both.

Clause 94. The non-transitory computer-readable medium of clause 93, wherein the first response indicates whether the at least one RID is UE-controlled, or wherein the first response indicates at least one identifier associated with the at least one RID, or wherein the first response comprises first information associated with a first ranging or timing estimation procedure between the UE and the at least one RID, or wherein the first response comprises second information associated with a first ranging or timing estimation procedure between the UE and at least one wireless node associated with the position estimation procedure, or any combination thereof.

Clause 95. The non-transitory computer-readable medium of clause 94, wherein the first response comprises the second information, and wherein the second information comprises: distance information between the at least one RID and the UE, or RID-specific timing error information, or first RID-specific path loss information for a link direction associated with at least one RID in an active state, or second RID-specific link path loss information for a link direction associated with the at least one RID in an inactive state, or first RID-specific reference signal received power (RSRP) information associated with the at least one RID in the active state, or second RID-specific RSRP information associated with the at least one RID in the inactive state, or any combination thereof.

Clause 96. The non-transitory computer-readable medium of any of clauses 94 to 95, further comprising computer-executable instructions that, when executed by the position estimation entity, cause the position estimation entity to: transmit, to the at least one wireless node associated with the position estimation procedure, a request for the at least one wireless node to allocate one or more resources to the UE to determine the first information, the second information, or both, wherein the first information, the second information, or both are included in the first response based on the allocated one or more resources.

Clause 97. The non-transitory computer-readable medium of clause 96, wherein the allocated one or more resources are associated with one or more uplink reference signals, one or more downlink reference signals, one or more sidelink reference signals, or any combination thereof.

Clause 98. The non-transitory computer-readable medium of any of clauses 91 to 97, wherein the at least one additional location information request comprises a second additional location information request that is transmitted to at least one wireless node associated with the position estimation procedure.

Clause 99. The non-transitory computer-readable medium of clause 98, wherein the at least one additional location information request is configured to request: information on any known RID on the first link direction, the second link direction, or both, or information on one or more UE-controlled RIDs indicated in the first response, or a paging procedure between the UE and the one or more UE-controlled RIDs indicated in the first response, or any combination thereof.

Clause 100. The non-transitory computer-readable medium of any of clauses 89 to 99, wherein the first additional location information request comprises a reason field indicating non-reciprocity.

Clause 101. A non-transitory computer-readable medium storing computer-executable instructions that, when executed by a user equipment (UE), cause the UE to: perform one or more measurements associated with a first positioning reference signal (PRS) communicated on a first link direction from a wireless node to the UE; transmit a second PRS on a second link direction to at least one wireless node; transmit a measurement report associated with a position estimation procedure of the UE to a position estimation entity, the measurement report comprising measurement information associated with the one or more measurements of the first PRS; receive, from the position estimation entity, an additional location information request that requests non-reciprocity source information associated with the first link direction, the second link direction, or both; determine whether any non-reciprocity source information associated with the first link direction, the second link direction, or both, is available in response to the additional location information request; and transmit a response to the additional location information request based on the determination.

Clause 102. The non-transitory computer-readable medium of clause 101, wherein the position estimation procedure is a multi-round trip time (RTT) position estimation procedure.

Clause 103. The non-transitory computer-readable medium of any of clauses 101 to 102, wherein the wireless node is a wireless network component, the first link direction is a downlink link direction and the second link direction is an uplink link direction, or wherein the wireless node is another UE, the first link direction is a first sidelink link direction, and the second link direction is a second sidelink link direction.

Clause 104. The non-transitory computer-readable medium of any of clauses 101 to 103, wherein the first additional location information request is configured to request information on any reconfigurable intelligent device (RID) used for reception of the first PRS, transmission of the second PRS, or both.

Clause 105. The non-transitory computer-readable medium of any of clauses 103 to 104, wherein the computer-executable instructions that, when executed by the UE, cause the UE to transmit an indication of whether any reconfigurable intelligent device (RID) is used for reception of the first PRS, transmission of the second PRS, or both.

Clause 106. The non-transitory computer-readable medium of clause 105, wherein the indication indicates that no UE-controlled RID is used for reception of the first PRS, transmission of the second PRS, or both.

Clause 107. The non-transitory computer-readable medium of any of clauses 105 to 106, wherein the indication indicates that at least one RID is used for reception of the first PRS, transmission of the second PRS, or both.

Clause 108. The non-transitory computer-readable medium of clause 107, wherein the response indicates whether the at least one RID is UE-controlled, or wherein the response indicates at least one identifier associated with the at least one RID, or wherein the response comprises first information associated with a first ranging or timing estimation procedure between the UE and the at least one RID, or wherein the response comprises second information associated with a first ranging or timing estimation procedure between the UE and at least one wireless node associated with the position estimation procedure, or any combination thereof.

Clause 109. The non-transitory computer-readable medium of clause 108, wherein the response comprises the second information, and wherein the second information comprises: distance information between the at least one RID and the UE, or RID-specific timing error information, or RID-specific path loss information for a link direction, or RID-specific reference signal received power (RSRP) information, or any combination thereof.

Clause 110. The non-transitory computer-readable medium of any of clauses 101 to 109, wherein the additional location information request comprises a reason field indicating non-reciprocity.

Clause 111. A non-transitory computer-readable medium storing computer-executable instructions that, when executed by a wireless node, cause the wireless node to: transmit a first positioning reference signal (PRS) to a user equipment (UE) on a first link direction from the wireless node to the UE; perform one or more measurements associated with a second PRS communicated on a second link direction from the UE to the wireless node; transmit a measurement report associated with a position estimation procedure of the UE to a position estimation entity, the measurement report comprising measurement information associated with the one or more measurements of the second PRS; receive, from the position estimation entity, an additional location information request that requests non-reciprocity source information associated with the first link direction, the second link direction, or both; determine whether any non-reciprocity source information associated with the first link direction, the second link direction, or both, is available in response to the additional location information request; and transmit a response to the additional location information request based on the determination.

Clause 112. The non-transitory computer-readable medium of clause 111, further comprising computer-executable instructions that, when executed by the wireless node, cause the wireless node to: allocate one or more resources to the UE in response to the additional location information request to facilitate: a first ranging or timing estimation procedure between the UE and the at least one RID, or a first ranging or timing estimation procedure between the UE and the wireless node, or a combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of operating a position estimation entity, comprising:

receiving a first measurement report associated with a position estimation procedure of a user equipment (UE), the first measurement report comprising measurement information associated with one or more measurements of a first positioning reference signal (PRS) communicated on a first link direction from a wireless node to a user equipment (UE);

receiving a second measurement report associated with the position estimation procedure of the UE, the second measurement report comprising measurement information associated with one or more measurements of a second PRS communicated on a second link direction from the UE to the wireless node;

determining a non-reciprocity condition between the first link direction and the second link direction;

transmitting at least one additional location information request that requests non-reciprocity source information associated with the first link direction, the second link direction, or both, in response to the determination of the non-reciprocity condition;

receiving at least one response comprising the non-reciprocity source information in response to the at least one additional location information request; and deriving a position estimate of the UE based on the first measurement report, the second measurement report, and the non-reciprocity source information of the at least one response.

2. The method of claim 1, wherein the position estimation procedure is a multi-round trip time (RTT) position estimation procedure.

3. The method of claim 1, wherein the wireless node is a wireless network component, the first link direction is a downlink direction and the second link direction is an uplink direction, or wherein the wireless node is another UE, the first link direction is a first sidelink direction, and the second link direction is a second sidelink direction.

4. The method of claim 1, wherein the determination of the non-reciprocity condition is based on:

one or more reconfigurable intelligent devices (RIDs) being camped on a serving cell of the UE, or an explicit indication in the first measurement report that indicates the use of at least one UE-controlled RID associated with the communication of the second PRS, or a measurement differential between the first measurement report and the second measurement report, or a timing differential between a round trip time (RTT) computed based on the first measurement report and the second measurement report and a previous computed timing measurement between the UE and the wireless node, or any combination thereof.

5. The method of claim 1, wherein the at least one additional location information request comprises a first additional location information request that is transmitted to the UE.

6. The method of claim 5, wherein the first additional location information request is configured to request information on any reconfigurable intelligent device (RID) used for reception of the first PRS, transmission of the second PRS, or both, or wherein the at least one response comprises a first response from the UE in response to the first additional location information request, and the at least one response comprises an indication of whether any reconfigurable intelligent device (RID) is used for reception of the first PRS, transmission of the second PRS, or both.

7. The method of claim 6, wherein the indication indicates that no UE-controlled RID is used for reception of the first PRS, transmission of the second PRS, or both, or wherein the indication indicates that at least one RID is used for reception of the first PRS, transmission of the second PRS, or both, or wherein the first response indicates whether the at least one RID is UE-controlled, or wherein the first response indicates at least one identifier associated with the at least one RID, or wherein the first response comprises first information associated with a first ranging or timing estimation procedure between the UE and the at least one RID, or wherein the first response comprises second information associated with a first ranging or timing estimation procedure between the UE and at least one wireless node associated with the position estimation procedure, or any combination thereof.

8. The method of claim 7, wherein the first response comprises the second information, and wherein the second information comprises:

distance information between the at least one RID and the UE, or

RID-specific timing error information, or first RID-specific path loss information for a link direction associated with at least one RID in an active state, or second RID-specific link path loss information for a link direction associated with the at least one RID in an inactive state, or first RID-specific reference signal received power (RSRP) information associated with the at least one RID in the active state, or second RID-specific RSRP information associated with the at least one RID in the inactive state, or any combination thereof.

9. The method of claim 8, further comprising:

transmitting, to the at least one wireless node associated with the position estimation procedure, a request for the at least one wireless node to allocate one or more resources to the UE to determine the first information, the second information, or both, wherein the first information, the second information, or both are included in the first response based on the allocated one or more resources.

10. The method of claim 9, wherein the allocated one or more resources are associated with one or more uplink reference signals, one or more downlink reference signals, one or more sidelink reference signals, or any combination thereof.

11. The method of claim 5, wherein the at least one additional location information request comprises a second additional location information request that is transmitted to at least one wireless node associated with the position estimation procedure.

12. The method of claim 11, wherein the at least one additional location information request is configured to request:

information on any known RID on the first link direction, the second link direction, or both, or information on one or more UE-controlled RIDs indicated in the first response, or a paging procedure between the UE and the one or more UE-controlled RIDs indicated in the first response, or any combination thereof.

13. The method of claim 5, wherein the first additional location information request comprises a reason field indicating non-reciprocity.

14. A method of operating a user equipment (UE), comprising:

performing one or more measurements associated with a first positioning reference signal (PRS) communicated on a first link direction from a wireless node to the UE;

transmitting a second PRS on a second link direction to at least one wireless node;

transmitting a measurement report associated with a position estimation procedure of the UE to a position estimation entity, the measurement report comprising measurement information associated with the one or more measurements of the first PRS;

receiving, from the position estimation entity, an additional location information request that requests non-reciprocity source information associated with the first link direction, the second link direction, or both;

determining whether any non-reciprocity source information associated with the first link direction, the second link direction, or both, is available in response to the additional location information request; and transmitting a response to the additional location information request based on the determination.

15. The method of claim 14, wherein the position estimation procedure is a multi-round trip time (RTT) position estimation procedure, or wherein the wireless node is a wireless network component, the first link direction is a downlink link direction and the second link direction is an uplink link direction, or wherein the wireless node is another UE, the first link direction is a first sidelink link direction, and the second link direction is a second sidelink link direction, or wherein the first additional location information request is configured to request information on any reconfigurable intelligent device (RID) used for reception of the first PRS, transmission of the second PRS, or both.

16. The method of claim 15, wherein response comprises an indication of whether any reconfigurable intelligent device (RID) is used for reception of the first PRS, transmission of the second PRS, or both, or wherein the indication indicates that no UE-controlled RID is used for reception of the first PRS, transmission of the second PRS, or both, or wherein the indication indicates that at least one RID is used for reception of the first PRS, transmission of the second PRS, or both, or wherein the response indicates whether the at least one RID is UE-controlled, or wherein the response indicates at least one identifier associated with the at least one RID, or wherein the response comprises first information associated with a first ranging or timing estimation procedure between the UE and the at least one RID, or wherein the response comprises second information associated with a first ranging or timing estimation procedure between the UE and at least one wireless node associated with the position estimation procedure, or any combination thereof.

17. The method of claim 16, wherein the response comprises the second information, and wherein the second information comprises:

distance information between the at least one RID and the UE, or

RID-specific timing error information, or

RID-specific path loss information for a link direction, or

RID-specific reference signal received power (RSRP) information, or any combination thereof.

18. The method of claim 14, wherein the additional location information request comprises a reason field indicating non-reciprocity.

19. A method of operating a wireless node, comprising:

transmitting a first positioning reference signal (PRS) to a user equipment (UE) on a first link direction from the wireless node to the UE;

performing one or more measurements associated with a second PRS communicated on a second link direction from the UE to the wireless node;

transmitting a measurement report associated with a position estimation procedure of the UE to a position estimation entity, the measurement report comprising measurement information associated with the one or more measurements of the second PRS;

receiving, from the position estimation entity, an additional location information request that requests non-reciprocity source information associated with the first link direction, the second link direction, or both;

determining whether any non-reciprocity source information associated with the first link direction, the second link direction, or both, is available in response to the additional location information request; and transmitting a response to the additional location information request based on the determination.

20. The method of claim 19, further comprising:

allocating one or more resources to the UE in response to the additional location information request to facilitate:

a first ranging or timing estimation procedure between the UE and the at least one RID, or a first ranging or timing estimation procedure between the UE and the wireless node, or a combination thereof.

21. A position estimation entity, comprising:

one or more memories;

one or more transceivers; and one or more processors communicatively coupled to the one or more memories and the one or more transceivers, the one or more processors, either alone or in combination, configured to:

receive, via the one or more transceivers, a first measurement report associated with a position estimation procedure of a user equipment (UE), the first measurement report comprising measurement information associated with one or more measurements of a first positioning reference signal (PRS) communicated on a first link direction from a wireless node to a user equipment (UE);

receive, via the one or more transceivers, a second measurement report associated with the position estimation procedure of the UE, the second measurement report comprising measurement information associated with one or more measurements of a second PRS communicated on a second link direction from the UE to the wireless node;

determine a non-reciprocity condition between the first link direction and the second link direction;

transmit, via the one or more transceivers, at least one additional location information request that requests non-reciprocity source information associated with the first link direction, the second link direction, or both, in response to the determination of the non-reciprocity condition;

receive, via the one or more transceivers, at least one response comprising the non-reciprocity source information in response to the at least one additional location information request; and derive a position estimate of the UE based on the first measurement report, the second measurement report, and the non-reciprocity source information of the at least one response.

22. The position estimation entity of claim 21, wherein the position estimation procedure is a multi-round trip time (RTT) position estimation procedure.

23. The position estimation entity of claim 21, wherein the wireless node is a wireless network component, the first link direction is a downlink direction and the second link direction is an uplink direction, or wherein the wireless node is another UE, the first link direction is a first sidelink direction, and the second link direction is a second sidelink direction.

24. The position estimation entity of claim 21, wherein the determination of the non-reciprocity condition is based on:

one or more reconfigurable intelligent devices (RIDs) being camped on a serving cell of the UE, or an explicit indication in the first measurement report that indicates the use of at least one UE-controlled RID associated with the communication of the second PRS, or a measurement differential between the first measurement report and the second measurement report, or a timing differential between a round trip time (RTT) computed based on the first measurement report and the second measurement report and a previous computed timing measurement between the UE and the wireless node, or any combination thereof.

25. The position estimation entity of claim 21, wherein the at least one additional location information request comprises a first additional location information request that is transmitted to the UE.

26. The position estimation entity of claim 25, wherein the first additional location information request is configured to request information on any reconfigurable intelligent device (RID) used for reception of the first PRS, transmission of the second PRS, or both, or wherein the at least one response comprises a first response from the UE in response to the first additional location information request, and the at least one response comprises an indication of whether any reconfigurable intelligent device (RID) is used for reception of the first PRS, transmission of the second PRS, or both.

27. The position estimation entity of claim 26, wherein the indication indicates that no UE-controlled RID is used for reception of the first PRS, transmission of the second PRS, or both, or wherein the indication indicates that at least one RID is used for reception of the first PRS, transmission of the second PRS, or both, or wherein the first response indicates whether the at least one RID is UE-controlled, or wherein the first response indicates at least one identifier associated with the at least one RID, or wherein the first response comprises first information associated with a first ranging or timing estimation procedure between the UE and the at least one RID, or wherein the first response comprises second information associated with a first ranging or timing estimation procedure between the UE and at least one wireless node associated with the position estimation procedure, or any combination thereof.

28. The position estimation entity of claim 27, wherein the first response comprises the second information, and wherein the second information comprises:

distance information between the at least one RID and the UE, or

RID-specific timing error information, or first RID-specific path loss information for a link direction associated with at least one RID in an active state, or second RID-specific link path loss information for a link direction associated with the at least one RID in an inactive state, or first RID-specific reference signal received power (RSRP) information associated with the at least one RID in the active state, or second RID-specific RSRP information associated with the at least one RID in the inactive state, or any combination thereof.

29. The position estimation entity of claim 28, wherein the one or more processors, either alone or in combination, are further configured to:

transmit, via the one or more transceivers, to the at least one wireless node associated with the position estimation procedure, a request for the at least one wireless node to allocate one or more resources to the UE to determine the first information, the second information, or both, wherein the first information, the second information, or both are included in the first response based on the allocated one or more resources.

30. The position estimation entity of claim 29, wherein the allocated one or more resources are associated with one or more uplink reference signals, one or more downlink reference signals, one or more sidelink reference signals, or any combination thereof.

31. The position estimation entity of claim 25, wherein the at least one additional location information request comprises a second additional location information request that is transmitted to at least one wireless node associated with the position estimation procedure.

32. The position estimation entity of claim 31, wherein the at least one additional location information request is configured to request:

information on any known RID on the first link direction, the second link direction, or both, or information on one or more UE-controlled RIDs indicated in the first response, or a paging procedure between the UE and the one or more UE-controlled RIDs indicated in the first response, or any combination thereof.

33. The position estimation entity of claim 25, wherein the first additional location information request comprises a reason field indicating non-reciprocity.

34. A user equipment (UE), comprising:

one or more memories;

one or more transceivers; and one or more processors communicatively coupled to the one or more memories and the one or more transceivers, the one or more processors, either alone or in combination, configured to:

perform one or more measurements associated with a first positioning reference signal (PRS) communicated on a first link direction from a wireless node to the UE;

transmit, via the one or more transceivers, a second PRS on a second link direction to at least one wireless node;

transmit, via the one or more transceivers, a measurement report associated with a position estimation procedure of the UE to a position estimation entity, the measurement report comprising measurement information associated with the one or more measurements of the first PRS;

receive, via the one or more transceivers, from the position estimation entity, an additional location information request that requests non-reciprocity source information associated with the first link direction, the second link direction, or both;

determine whether any non-reciprocity source information associated with the first link direction, the second link direction, or both, is available in response to the additional location information request; and transmit, via the one or more transceivers, a response to the additional location information request based on the determination.

35. The UE of claim 34, wherein the position estimation procedure is a multi-round trip time (RTT) position estimation procedure, or wherein the wireless node is a wireless network component, the first link direction is a downlink link direction and the second link direction is an uplink link direction, or wherein the wireless node is another UE, the first link direction is a first sidelink link direction, and the second link direction is a second sidelink link direction, or wherein the first additional location information request is configured to request information on any reconfigurable intelligent device (RID) used for reception of the first PRS, transmission of the second PRS, or both.

36. The UE of claim 35, wherein, the one or more processors, either alone or in combination, are configured to transmit an indication of whether any reconfigurable intelligent device (RID) is used for reception of the first PRS, transmission of the second PRS, or both, or wherein the indication indicates that no UE-controlled RID is used for reception of the first PRS, transmission of the second PRS, or both, or wherein the indication indicates that at least one RID is used for reception of the first PRS, transmission of the second PRS, or both, or wherein the response indicates whether the at least one RID is UE-controlled, or wherein the response indicates at least one identifier associated with the at least one RID, or wherein the response comprises first information associated with a first ranging or timing estimation procedure between the UE and the at least one RID, or wherein the response comprises second information associated with a first ranging or timing estimation procedure between the UE and at least one wireless node associated with the position estimation procedure, or any combination thereof.

37. The UE of claim 36, wherein the response comprises the second information, and wherein the second information comprises:

distance information between the at least one RID and the UE, or

RID-specific timing error information, or

RID-specific path loss information for a link direction, or

RID-specific reference signal received power (RSRP) information, or any combination thereof.

38. The UE of claim 34, wherein the additional location information request comprises a reason field indicating non-reciprocity.

39. A wireless node, comprising:

one or more memories;

one or more transceivers; and one or more processors communicatively coupled to the one or more memories and the one or more transceivers, the one or more processors, either alone or in combination, configured to:

transmit, via the one or more transceivers, a first positioning reference signal (PRS) to a user equipment (UE) on a first link direction from the wireless node to the UE;

perform one or more measurements associated with a second PRS communicated on a second link direction from the UE to the wireless node;

transmit, via the one or more transceivers, a measurement report associated with a position estimation procedure of the UE to a position estimation entity, the measurement report comprising measurement information associated with the one or more measurements of the second PRS;

receive, via the one or more transceivers, from the position estimation entity, an additional location information request that requests non-reciprocity source information associated with the first link direction, the second link direction, or both;

determine whether any non-reciprocity source information associated with the first link direction, the second link direction, or both, is available in response to the additional location information request; and transmit, via the one or more transceivers, a response to the additional location information request based on the determination.

40. The wireless node of claim 39, wherein the one or more processors, either alone or in combination, are further configured to:

allocate one or more resources to the UE in response to the additional location information request to facilitate:

a first ranging or timing estimation procedure between the UE and the at least one RID, or a first ranging or timing estimation procedure between the UE and the wireless node, or a combination thereof.

* * * * *